US012370656B2

(12) United States Patent
Fortoloczki et al.

(10) Patent No.: US 12,370,656 B2
(45) Date of Patent: Jul. 29, 2025

(54) APPARATUS FOR TIGHTENING THREADED FASTENERS

(71) Applicant: HYTORC Division UNEX Corporation, Mahwah, NJ (US)

(72) Inventors: Peter E. Fortoloczki, Essex Fells, NJ (US); Eric P. Junkers, Mahwah, NJ (US); Thomas F. McLoughlin, Montclair, NJ (US); Randall A. Reagan, Morristown, NJ (US); Michael R. Wood, Randolph, NJ (US)

(73) Assignee: HYTORC Division UNEX Corporation, Mahwah, NJ (US)

(*) Notice: Subject to any disclaimer, the term of this patent is extended or adjusted under 35 U.S.C. 154(b) by 0 days.

(21) Appl. No.: 17/910,690

(22) PCT Filed: Mar. 10, 2021

(86) PCT No.: PCT/US2021/021783
§ 371 (c)(1),
(2) Date: Sep. 9, 2022

(87) PCT Pub. No.: WO2021/183695
PCT Pub. Date: Sep. 16, 2021

(65) Prior Publication Data
US 2023/0148339 A1 May 11, 2023

Related U.S. Application Data

(60) Provisional application No. 62/987,693, filed on Mar. 10, 2020.

(51) Int. Cl.
*B25B 1/00* (2006.01)
*B25B 21/00* (2006.01)
(Continued)

(52) U.S. Cl.
CPC .......... *B25B 21/008* (2013.01); *B25B 23/147* (2013.01); *B25F 5/001* (2013.01); *B23P 19/066* (2013.01)

(58) Field of Classification Search
CPC . B25B 21/008; B25B 23/1425; B25B 23/147; B25B 21/00; B25B 21/002;
(Continued)

(56) References Cited

U.S. PATENT DOCUMENTS 5,062,491 A * 11/1991 Takeshima ............ B25B 23/147
173/1
8,549,932 B1 * 10/2013 Schultz ................. G01L 11/025
73/862.21

(Continued)

*Primary Examiner* — Jacob A Smith
(74) *Attorney, Agent, or Firm* — Justin B. Bender, Esq.

(57) ABSTRACT

A portable torque power tool is disclosed herein and includes: a motor to generate a turning force; a drive to transfer the turning force; a turning force multiplication mechanism assembly to multiply the turning force; a shifter assembly to shift the tool between a lower speed/higher torque (LSHT) mode and a higher speed/lower torque (HSLT) mode; a torque transducer to measure torque output; wherein torque output is controlled by the torque transducer in LSHT mode; and wherein torque output is controlled by motor current in HSLT mode. In one embodiment of the present application, the torque transducer is a wireless torque transducer assembly formed at or near an output of a housing of the turning force multiplication assembly to improve measurement accuracy of torque output. Advantageously, simplified tool and system design and operation; reduced tool and system size; expanded functionality, greater durability and intuitive usability; and increased tool and system portability, efficiency, reliability and repeatability, all at low cost, are achieved. Further disclosed herein is an operation parameter regulation unit for use with a bolting system having a plurality of networked electrically powered torque tools and/or drive portions of torque tools described above for simultaneous tightening of industrial threaded fasteners. The operation parameter regulation unit includes: a processing unit; an output unit connected and/or integrated with the processing unit; an input unit connected and/or integrated with the processing unit; an activation unit connected and/or integrated with the processing unit for activating operation units of the plurality of networked electrically powered torque tools and/or drive portions of torque tools; and a control unit for controlling operation parameters of each of the plurality of networked electrically powered torque tools and/or drive portions of torque tools to maintain a difference between the operation parameters within a predetermined value. Advantageously, innovations disclosed in this application include operation parameter regulation units for bolting systems having a plurality of net- (Continued)

worked electrically powered torque tools and/or drive portions of torque tools for simultaneous tightening of industrial threaded fasteners. Indeed SIMULTORC® is achievable with a plurality of networked electrically powered torque tools and/or drive portions of torque tools, particularly those of the handheld and/or mobile variety.

49 Claims, 20 Drawing Sheets

(51) Int. Cl.
  *B25B 23/147* (2006.01)
  *B25F 5/00* (2006.01)
  *B23P 19/06* (2006.01)
(58) Field of Classification Search
  CPC ............... B25B 21/02; G05B 19/4155; G05B 2219/39438; B23P 19/066
  USPC ... 173/2, 217, 176, 20, 182, 171, 1, 181, 21
  See application file for complete search history.

(56) References Cited

U.S. PATENT DOCUMENTS

| | | | |
|---|---|---|---|
| 2012/0234569 A1* | 9/2012 | Lawton | B25B 23/14 173/181 |
| 2013/0161041 A1* | 6/2013 | Junkers | B25F 5/001 173/176 |

* cited by examiner (HSLT)

(LSHT)

Tool Universal User Interface ("UUI") 100

Tool UUI Menu Structure 200

FIG. 8 — Admin Menu Options by User Level

| Option/Function | L5 | L4 | L3 | L2 | L1 |
|---|---|---|---|---|---|
| Main Menu | | | | | |
| Basic Bolting | ✓ | ✓ | ✓ | ✓ | ✓ |
| Advanced Bolting | ✓ | ✓ | ✓ | C | X |
| Jobs | ✓ | ✓ | ✓ | X | X |
| Settings | ✓ | ✓ | ✓ | ✓ | ✓ |
| Admin | ✓ | ✓ | ✓ | X | X |
| Basic Bolting | | | | | |
| Torque | ✓ | ✓ | ✓ | ✓ | ✓ |
| Snug | ✓ | ✓ | ✓ | C | X |
| Angle | ✓ | ✓ | ✓ | C | X |
| Release | | | | | |
| Fastener | ✓ | ✓ | ✓ | C | X |
| Advanced Bolting | | | | | |
| Turn Angle | ✓ | ✓ | ✓ | C | X |
| Torque Check | ✓ | ✓ | ✓ | X | X |
| Rotations | ✓ | ✓ | ✓ | X | X |
| Torque in Angle | ✓ | ✓ | ✓ | X | X |
| Angle in Torque | ✓ | ✓ | ✓ | X | X |
| 1-N Sequence | ✓ | ✓ | ✓ | X | X |
| PCC1 Sequence | ✓ | ✓ | ✓ | X | X |
| Wheel Sequence | ✓ | ✓ | ✓ | X | X |
| Jobs | | | | | |
| Start Job | ✓ | ✓ | ✓ | ✓ | ✓ |
| End | ✓ | ✓ | ✓ | ✓ | ✓ |
| Create Job ID | ✓ | ✓ | ✓ | ✓ | ✓ |
| Import Job ID(s) | ✓ | ✓ | ✓ | X | X |
| Select Profile | ✓ | ✓ | ✓ | ✓ | ✓ |
| Create Profile | ✓ | ✓ | ✓ | ✓ | ✓ |
| Import Profiles | ✓ | ✓ | ✓ | X | X |
| Import Data | ✓ | ✓ | ✓ | ✓ | ✓ |
| Print Data | ✓ | ✓ | ✓ | ✓ | ✓ |
| Delete Data | ✓ | ✓ | ✓ | X | X |

| Option/Function | L5 | L4 | L3 | L2 | L1 |
|---|---|---|---|---|---|
| Settings | | | | | |
| Units | ✓ | ✓ | ✓ | X | X |
| Clock | ✓ | ✓ | ✓ | X | X |
| Bluetooth | ✓ | ✓ | ✓ | X | X |
| Add Printer | ✓ | ✓ | ✓ | X | X |
| Torque Limits | ✓ | ✓ | ✓ | X | X |
| Angle Limits | ✓ | ✓ | ✓ | X | X |
| Angle Delay | ✓ | ✓ | ✓ | X | X |
| Beeper | ✓ | ✓ | ✓ | X | X |
| Invert Screen | ✓ | ✓ | ✓ | X | X |
| Icons | ✓ | ✓ | ✓ | ✓ | ✓ |
| Progress Bar | ✓ | ✓ | ✓ | X | X |
| Auto-Off | ✓ | ✓ | ✓ | X | X |
| Admin | | | | | |
| Access Level | ✓ | ✓ | ✓ | ✓ | ✓ |
| L2 Flex Options | ✓ | ✓ | X | X | X |
| Shortcut Options | ✓ | ✓ | X | X | X |
| Change Password | ✓ | ✓ | ✓ | ✓ | ✓ |
| Tool Info | ✓ | ✓ | ✓ | X | X |
| Regulatory Info | ✓ | ✓ | X | X | X |
| User ID | ✓ | ✓ | ✓ | ✓ | ✓ |
| Service | | | | | |
| Calibrate Tool | ✓ | ✓ | X | X | X |
| Auto-Calibrate | ✓ | X | X | X | X |
| Setup Tool | ✓ | X | X | X | X |
| Battery Type | ✓ | X | X | X | X |
| Gearbox Type | ✓ | X | X | X | X |
| Voltage Cutoff | ✓ | X | X | X | X |
| Bluetooth On/Off | ✓ | X | X | X | X |
| Bluetooth Cert | ✓ | X | X | X | X |
| Formal NVRAM | ✓ | X | X | X | X |
| Cycle Counter | ✓ | X | X | X | X |
| Regulatory File | ✓ | X | X | X | X |
| Export Log | ✓ | X | X | X | X |

Access Levels
- L1 Jobs User
- L2 Flex User
- L3 Full User
- L4 Admin
- L5 HYTORC Service

Availability of Options
- ✓ Available by Default
- C Configurable
- X Not Available Tool Communication Summary Software Environment

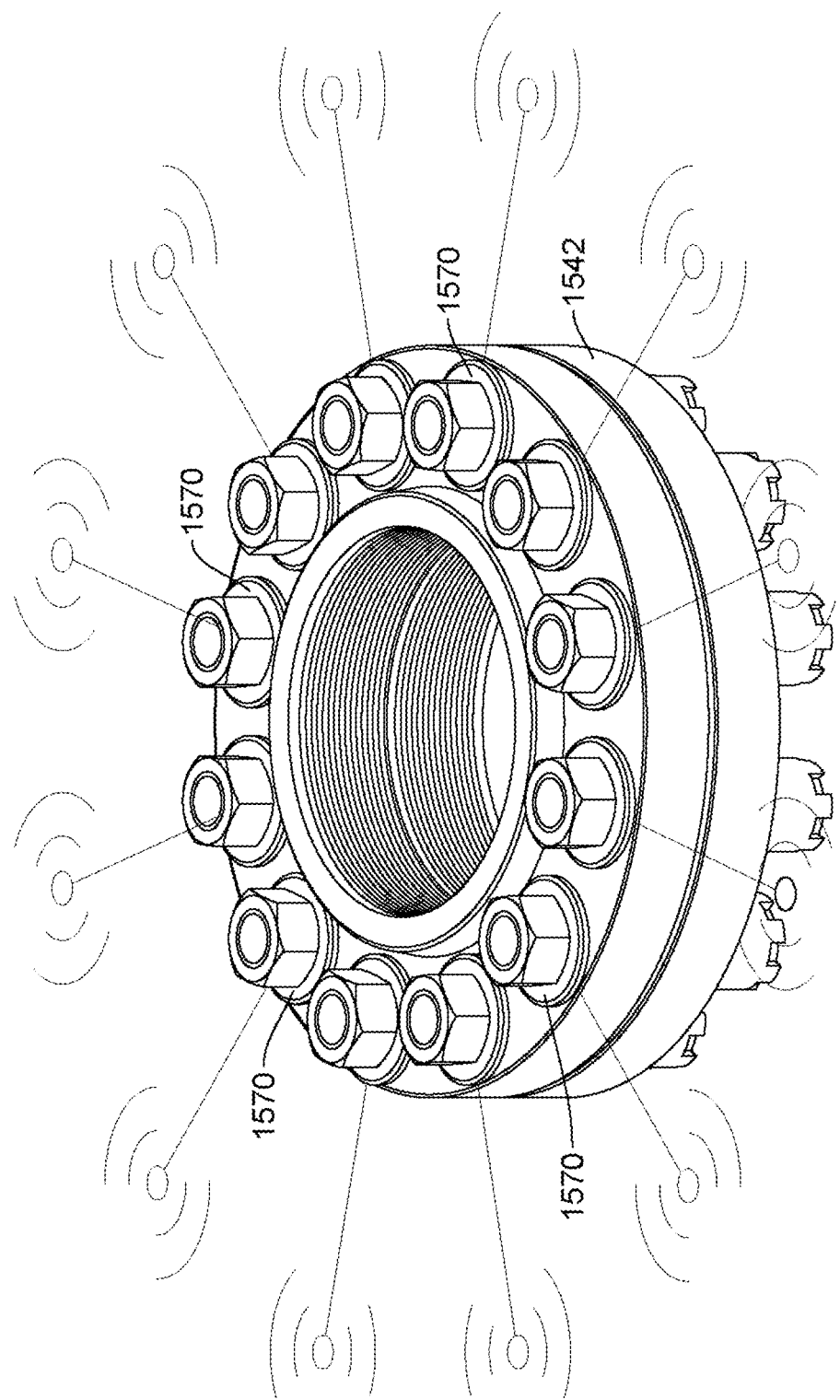

APPARATUS FOR TIGHTENING THREADED FASTENERS

CROSS REFERENCE TO RELATED APPLICATIONS

This application either claims priority to and/or is either a continuation patent application or a continuation-in-part application of the following commonly owned and/or co-pending patent applications, entire copies of which are incorporated herein by reference: U.S. application Ser. No. 15/106,221, having Filing Date of 17 Jun. 2016, entitled "APPARATUS FOR TIGHTENING THREADED FASTENERS"; U.S. application Ser. No. 15/106,247, having Filing Date of 17 Jun. 2016, entitled "APPARATUS FOR TIGHTENING THREADED FASTENERS"; PCT Application Serial No. PCT/US17/45937 (and its US 371 child of U.S. Ser. No. 16/324,792), having Filing Date of 8 Aug. 2017, entitled "APPARATUS FOR TIGHTENING THREADED FASTENERS"; U.S. application Ser. No. 15/570,670, having Filing Date of 30 Oct. 2017, entitled "APPARATUS FOR TIGHTENING THREADED FASTENERS"; U.S. application Ser. No. 15/570,684, having Filing Date of 30 Oct. 2017, entitled "APPARATUS FOR TIGHTENING THREADED FASTENERS"; U.S. application Ser. No. 15/570,743, having Filing Date of 30 Oct. 2017, entitled "APPARATUS FOR TIGHTENING THREADED FASTENERS"; U.S. application Ser. No. 16/081,917, having Filing Date of 2 Sep. 2018, entitled "APPARATUS FOR TIGHTENING THREADED FASTENERS"; PCT Application Serial No. PCT/US18/49293, having Filing Date of 2 Sep. 2018, entitled "APPARATUS FOR TIGHTENING THREADED FASTENERS"; PCT Application Serial No. PCT/US19/64561 (PCT/IB19/001448), having Filing Date of 4 Dec. 2019, entitled "APPARATUS FOR TIGHTENING THREADED FASTENERS"; and U.S. Application Ser. No. 62/987,693, having Filing Date of 10 Mar. 2020, entitled "APPARATUS FOR TIGHTENING THREADED FASTENERS".

BACKGROUND

Threaded fasteners including bolts, studs, nuts and washers are known and used in traditional bolting applications. Maintenance and repair of industrial applications begin with loosening of and end with tightening of these threaded fasteners. Naturally industry seeks to reduce production loss during routine, unforeseen and/or emergency startup, maintenance and/or repair.

High torque values are often required for industrial bolting applications. These high torque values are often generated from relatively small, portable hydraulically, electrically and pneumatically driven tools with relatively large gear reduction ratios. These large gear reduction ratios multiply output torque from a power source of the tool through either one or a plurality of planetary gear stages. The caveat to creating high torque values from small portable tools is the driving speed is quite slow. This slow driving speed makes turning a nut for anything other than final torque arduous and time consuming. Historically, operator needed another device simply to run down and seat a nut on a stud or bolt prior to the final torqueing sequence.

Once the nut is seated on the flange surface the turning degree to tighten or loosen it up is relatively small. Customers desire high turning speeds to quickly run down or up nuts. Known impact wrenches, which provided a high run down and run off speed, had disadvantages of inaccuracy and slow rotation once the nut hit the flange face. Conversely, known handheld torque power tools were torque accurate, but relatively slow in run up and run down of fasteners. Still they were much faster than impact guns once the nut was turned on the flange face.

Applicant applied its thorough understanding and innovation in torque power tools to hand-held pneumatic torque intensifying tools, specifically by creating the HYTORC® jGUN®, HYTORC® FLIP-GUN®, HYTORC® THRILL®, HYTORC® Z®, and HYTORC® FLASH® product lines and drivers and accessories for use therewith. Evolution of these product lines and drivers and accessories for use therewith is disclosed, for example, in Applicant's U.S. Pat. Nos. and U.S. application Nos.: U.S. Pat. Nos. 6,490,952; 6,609,868; 6,929,439; 6,883,401; 6,986,298; 7,003,862; 7,066,053; 7,125,213; 7,188,552; 7,207,760; 7,735,397; 7,641,579; 7,798,038; 7,832,310; 7,950,309; 8,042,434; D608,614; Ser. Nos. 13/577,995; 15/106,221; and Ser. No. 15/106,247, entire copies of which are incorporated herein by reference.

Several of Applicant's tools include a higher speed/lower torque (HSLT) mode for the run up or run down of the nut and a lower speed/higher torque (LSHT) mode for the final torqueing sequence. Applicant's use of a "lock out" stage in HSLT mode for multistage planetary gearboxes, thereby increasing rotation speed by the factor of the ratio being locked out, has proved a highly effective design. Efficient, reliable and repeatable shifting between two modes under extreme conditions during testing and in the field, however, continues to present challenges. Applicant wishes to continue improving its shifting mechanisms.

Further, Applicant's tools have been powered hydraulically, electrically, pneumatically and manually requiring an external power source, which increases size and decreases portability. Tool size and portability continue to present challenges, both during development and in the field. Applicant wishes to incorporate, without sacrifice, its many innovations into a battery-operated, multi-speed, hand-held torque intensifying tool to minimize size and maximize portability.

Further, Applicant wishes to bring to market the next revolution in bolting technology with expanded functionality, greater durability and intuitive usability.

At the end of gearboxes of such tools is a reaction device that is used to absorb the torque. The correct torque output is adjustable via an operation unit by controlling, for example, an electrical input. In this example, upon reaching the correct torque output an electric motor is shut off according to the level that is adjusted by the operator of the tool. Such operation units for controlling electric torque wrenches are sufficiently known from the state of the art.

Known operation units have embodiments which absolve the operating personnel from the responsibility of deciding whether the screwing process was performed properly. However, it is still required that the operating personnel first set the setting parameters in the prescribed manner so that the target parameters or values to be achieved can be achieved. The setting parameters thereby conform to a plurality of screw connection process parameters, which result for example from the operator, the application or screw connection, and the tool in use. Known sources of errors, which lead to a defective screw connection, are for example: incorrect selection of tools; incorrect use of calculation tables; basic calculation errors in the determination of setting parameters; incorrect assignment of screw parameters to the screw connection; incorrect bolt elongation;

failure of the tool or its components; failure of measuring means; incorrect setting of the setting parameters; etc.

These types of issues have been addressed in drive units for driving fluid power operated tools for the generation of a screw pretensioning force, which include for example hydraulically operated torque or other wrenches or expanding cylinders. In PCT/US10/56683, an entire copy of which is incorporated herein by reference, Applicant provided a drive unit that eliminates the risk of an incorrect setting of the setting parameter. Other control and management units and systems for power-operated tools have been disclosed by Applicant in PCT/US10/32139, PCT/US09/48395 and PCT/US12/38402, entire copies of which are incorporated herein by reference.

What is needed is: simplification in tool and system design and operation; reduction in tool and system size; expanded functionality, greater durability and intuitive usability; and increased tool and system portability, efficiency, reliability and repeatability, all at low cost. The present invention(s) has therefore been devised to solve these issues.

SPECIFICATION

A portable torque power tool is disclosed herein and includes: a motor to generate a turning force; a drive to transfer the turning force; a turning force multiplication mechanism assembly to multiply the turning force; a shifter assembly to shift the tool between a lower speed/higher torque (LSHT) mode and a higher speed/lower torque (HSLT) mode; a torque transducer to measure torque output from a portion of the turning force multiplication mechanism assembly; wherein torque output is controlled by the torque transducer in LSHT mode; and wherein torque output is controlled by motor current in HSLT mode. In one embodiment of the present application, the torque transducer is a wireless torque transducer assembly formed at or near an output of a housing of the turning force multiplication assembly to improve measurement accuracy of torque output.

Advantageously, simplified tool and system design and operation; reduced tool and system size; expanded functionality, greater durability and intuitive usability; and increased tool and system portability, efficiency, reliability and repeatability, all at low cost, are achieved.

Further disclosed herein includes an operation parameter regulation unit for use with a bolting system having a plurality of networked electrically powered torque tools and/or drive portions of torque tools, such as, for example, those described directly above, for simultaneous tightening of industrial threaded fasteners, the operation parameter regulation unit including: a processing unit; an output unit connected and/or integrated with the processing unit; an input unit connected and/or integrated with the processing unit; an activation unit connected and/or integrated with the processing unit for activating operation units of the plurality of networked electrically powered torque tools and/or drive portions of torque tools; and a control unit for controlling operation parameters of each of the plurality of networked electrically powered torque tools and/or drive portions of torque tools to maintain a difference between the operation parameters within a predetermined value.

Advantageously, innovations disclosed in this application include operation parameter regulation units for bolting systems having a plurality of networked electrically powered torque tools and/or drive portions of torque tools for simultaneous tightening of industrial threaded fasteners. Indeed SIMULTORC® is achievable with a plurality of networked electrically powered torque tools and/or drive portions of torque tools, particularly those of the handheld and/or mobile variety. SIMULTORC® is a proprietary bolting method of Applicant, to ensure Parallel Joint Closure® and joint integrity, which minimizes risk of operator injury, property damage and/or production loss by joint leakage, joint failure and/or crushing a gasket buffering closure of a flange The invention(s) of the present application may be described, by way of example only, with reference to the accompanying drawings, of which:

FIG. 5B is a block diagram of circuits(s) of Tool A and/or other embodiments of the present application;

FIG. 8 is a summary of available menu options by user level in Tool A and/or other embodiments of the present application;

Figure 14:
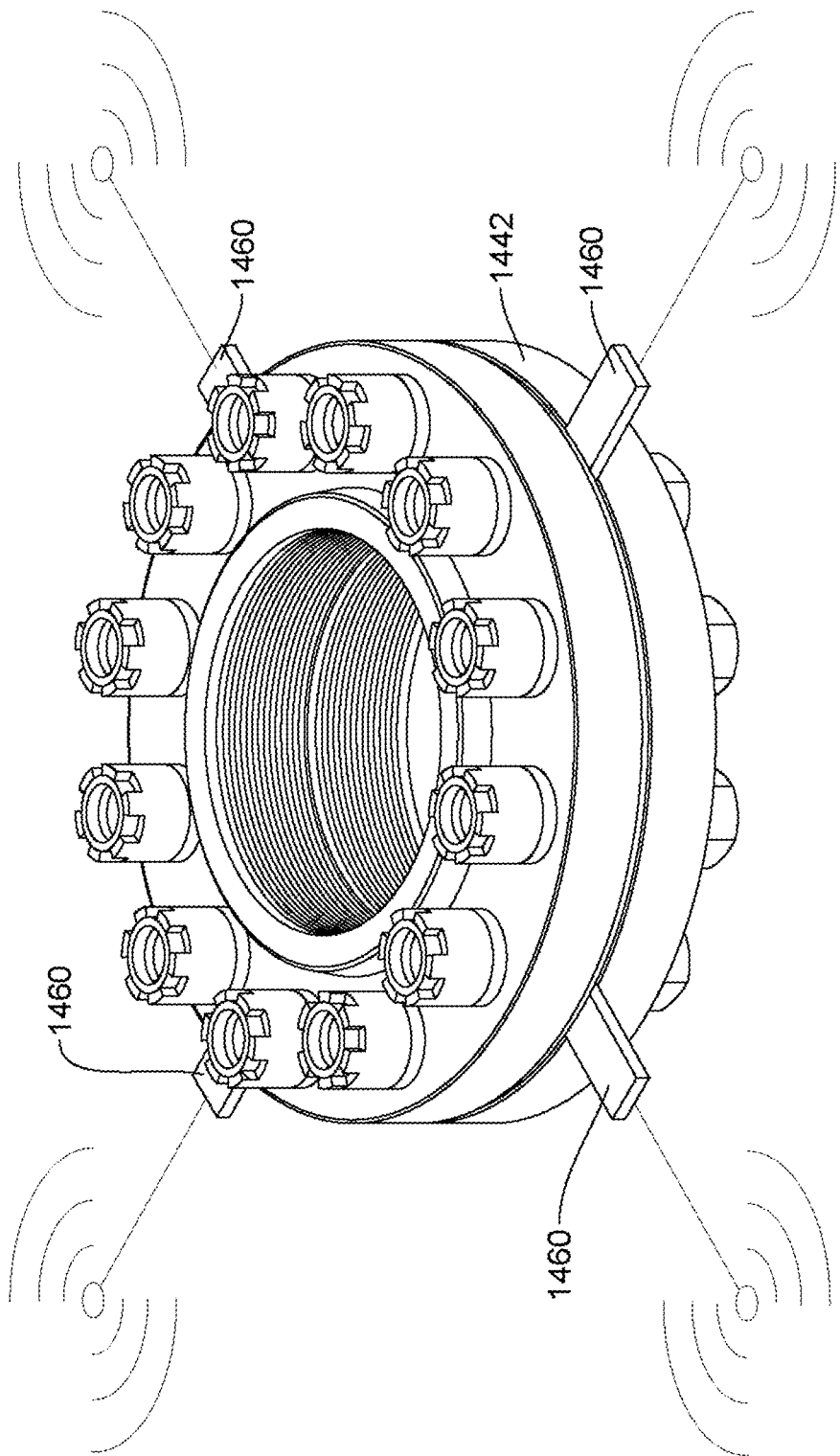

FIG. 14 shows a perspective view of a fastener connection instance 1442 usable with tools A and B and industrial bolting systems 1100, 1200, 1300 and/or variants thereof, including bolting application separation (gap) sensors 1460 arranged equally distantly from one another near the corresponding threaded fasteners; and FIG. 15 shows a perspective view of a fastener connection instance 1542 usable with tools A, tool B, industrial bolting systems 100, 200, 300, and/or variants thereof, including bolting application fastener load cells 1570 arranged adjacent a plurality of threaded fasteners.

Figure 1:
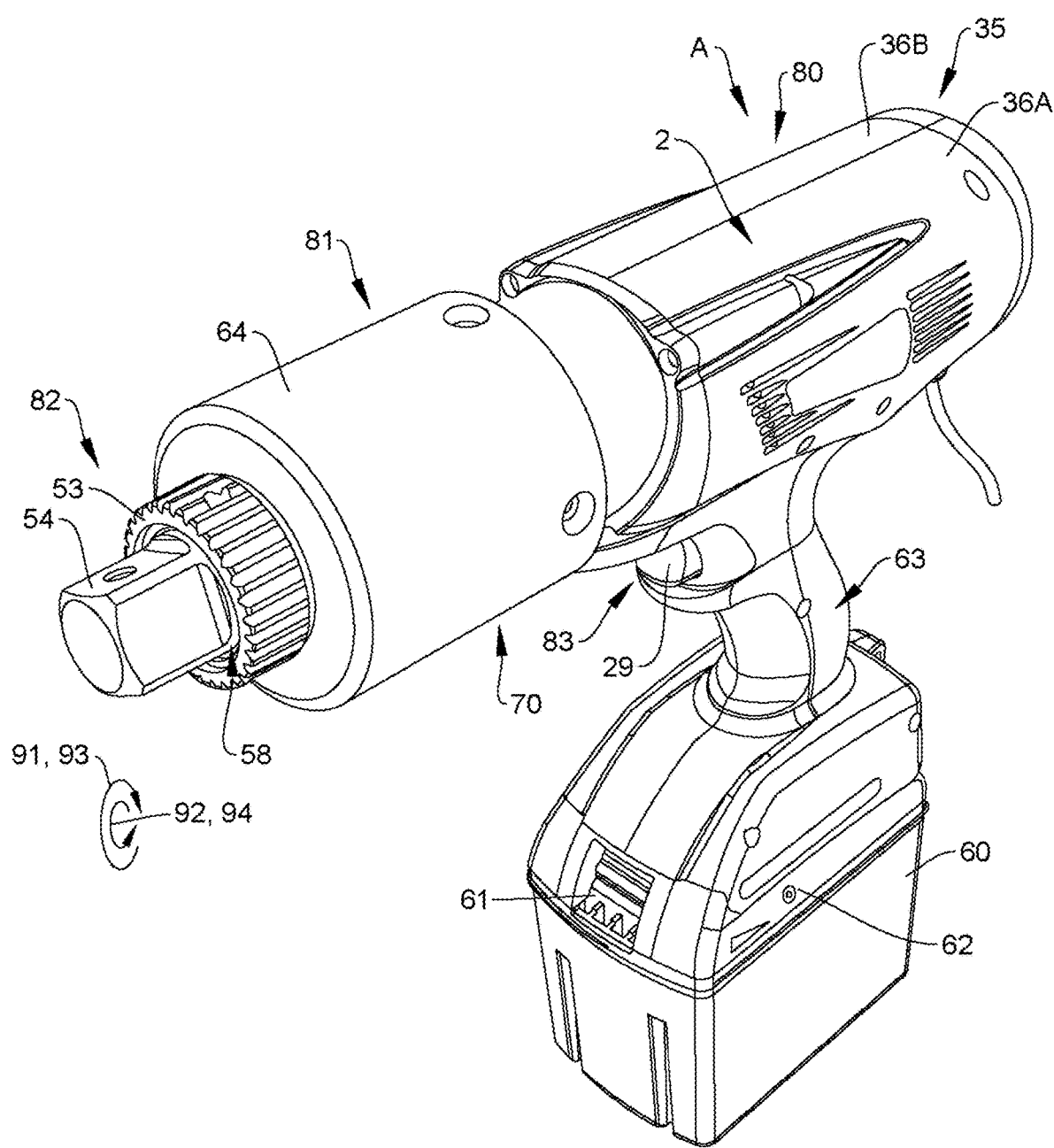
FIG. 1 is a full perspective view of Applicant's HYTORC® LITHIUM SERIES® II Torque Gun Tool A ("Tool A") and/or other embodiments of the present application.
Figure 2:
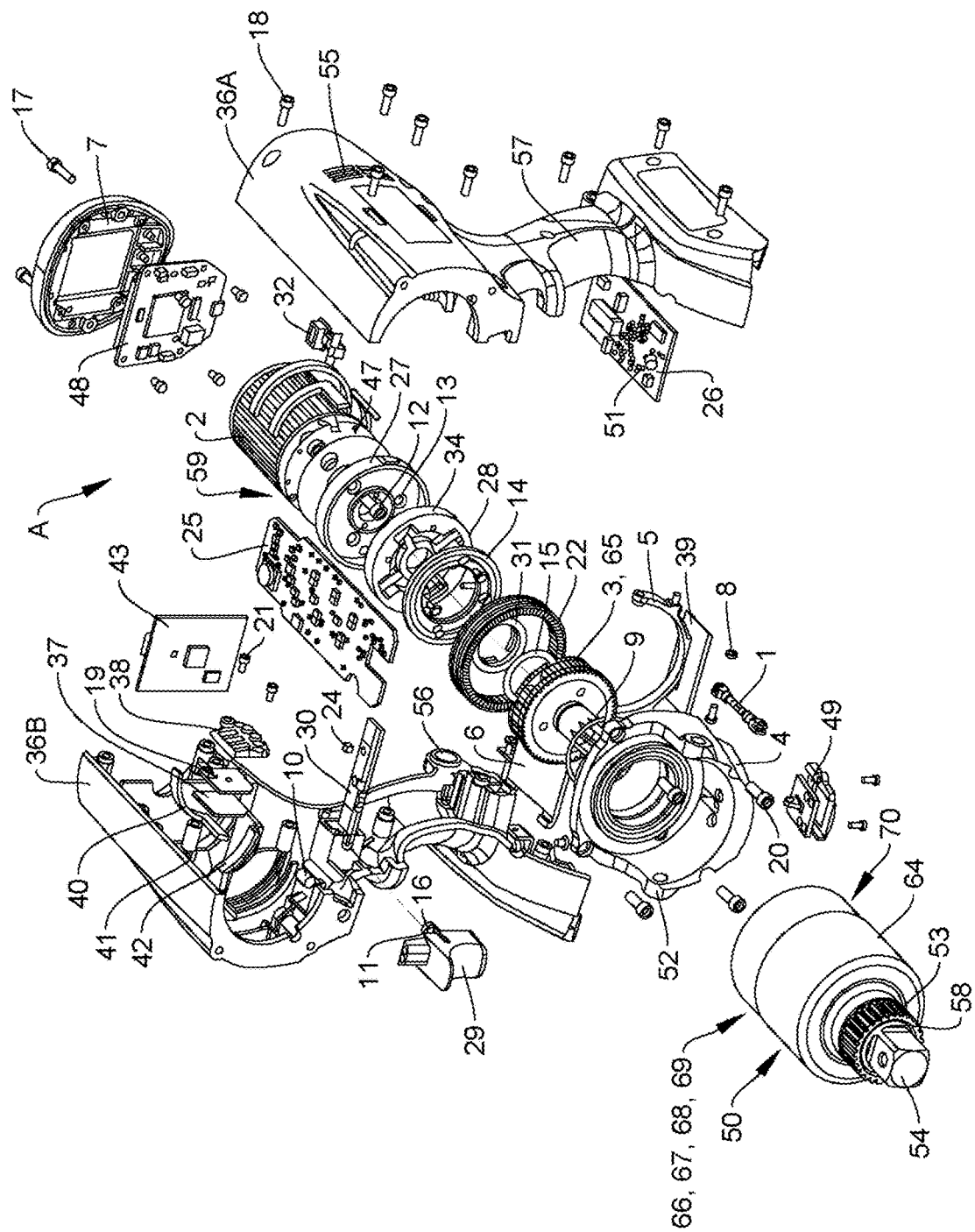
FIG. 2 is an exploded perspective view of Tool A and/or other embodiments of the present application.
Figure 3A:
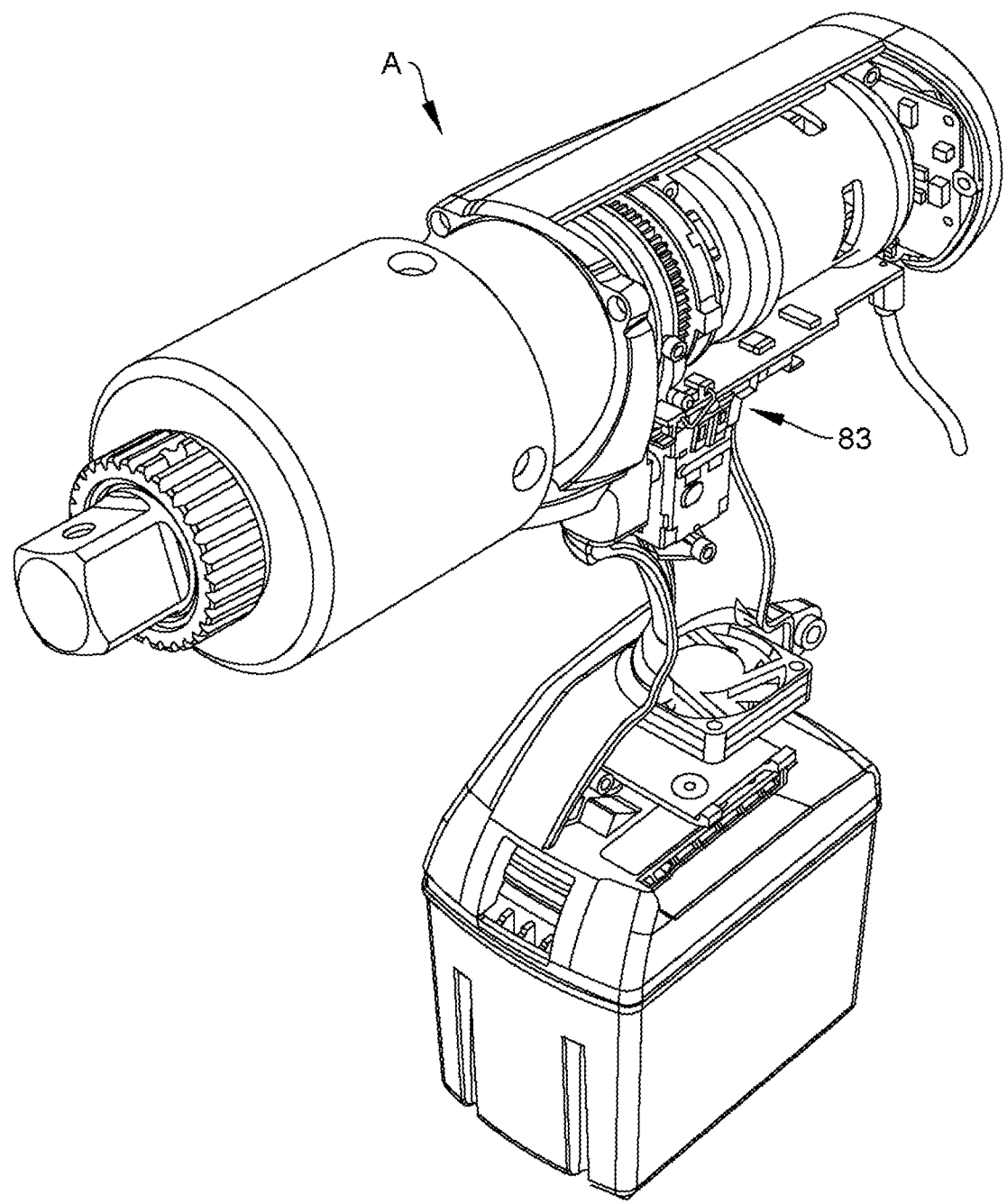
FIGS. 3A, 3B and 3C are downward, upward and side perspective views, respectively, of Tool A, and/or other embodiments of the present application, with a left tool handle housing 36A removed.
Figure 3B:
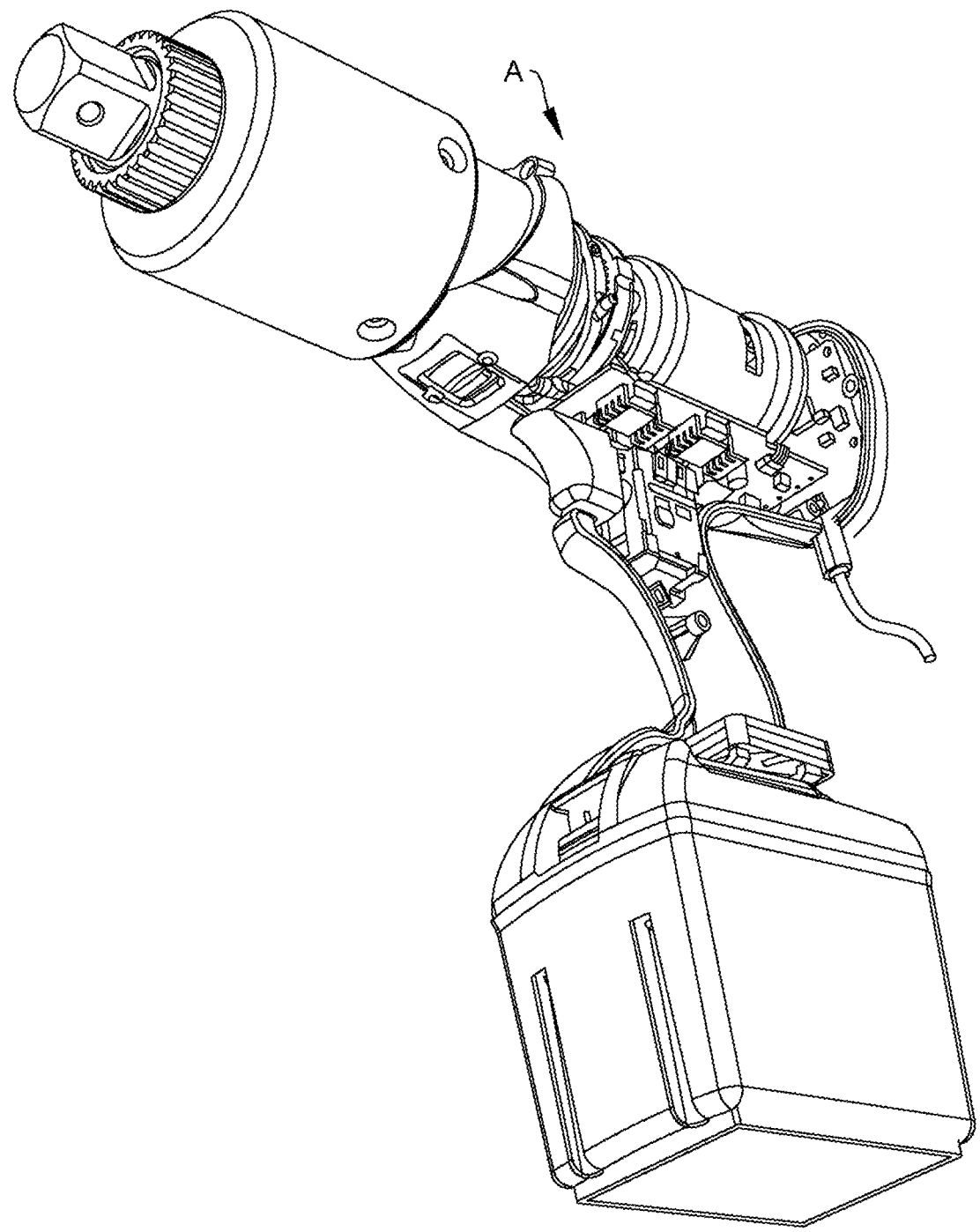
Figure 3C:
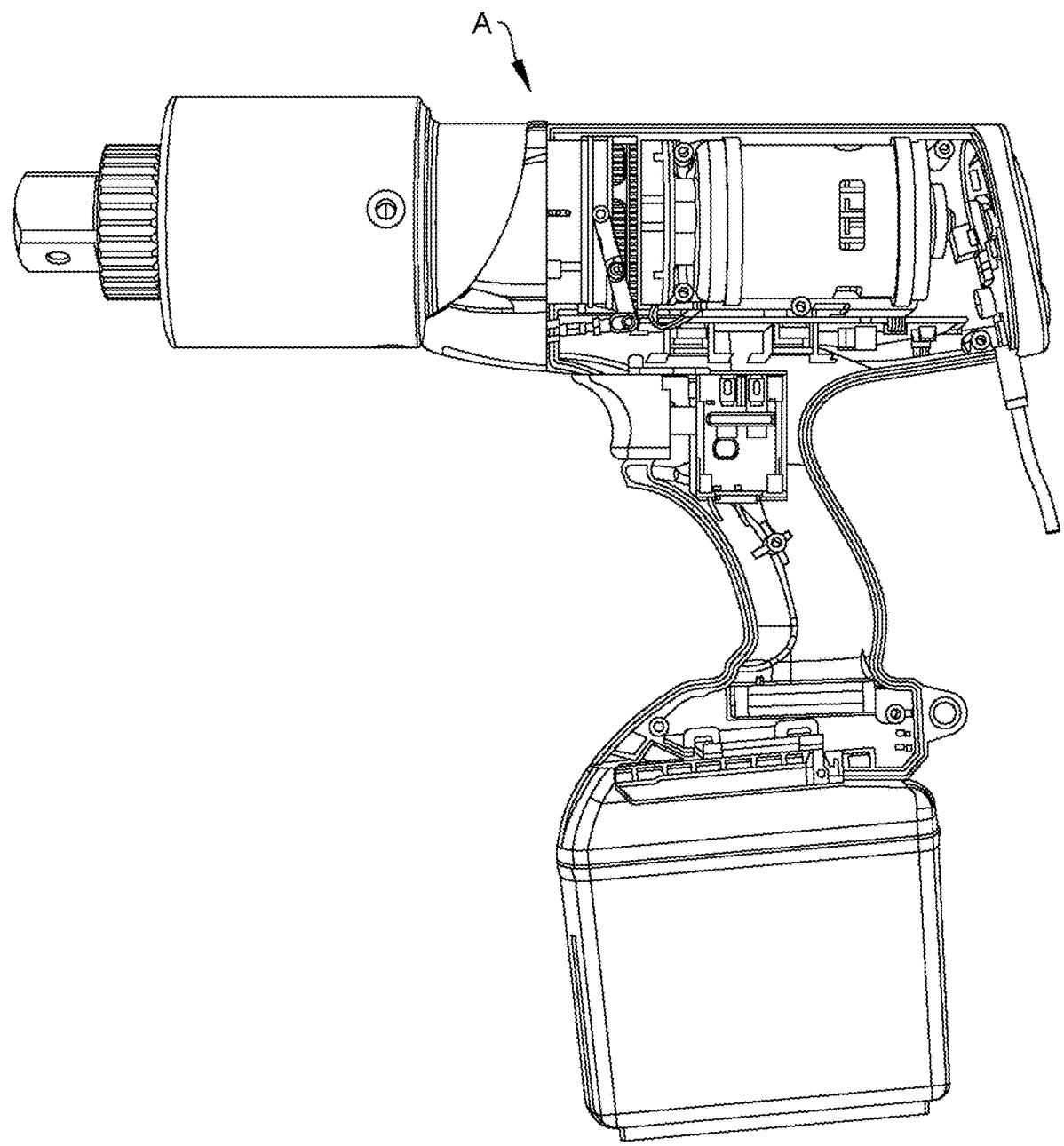
Figure 4A:
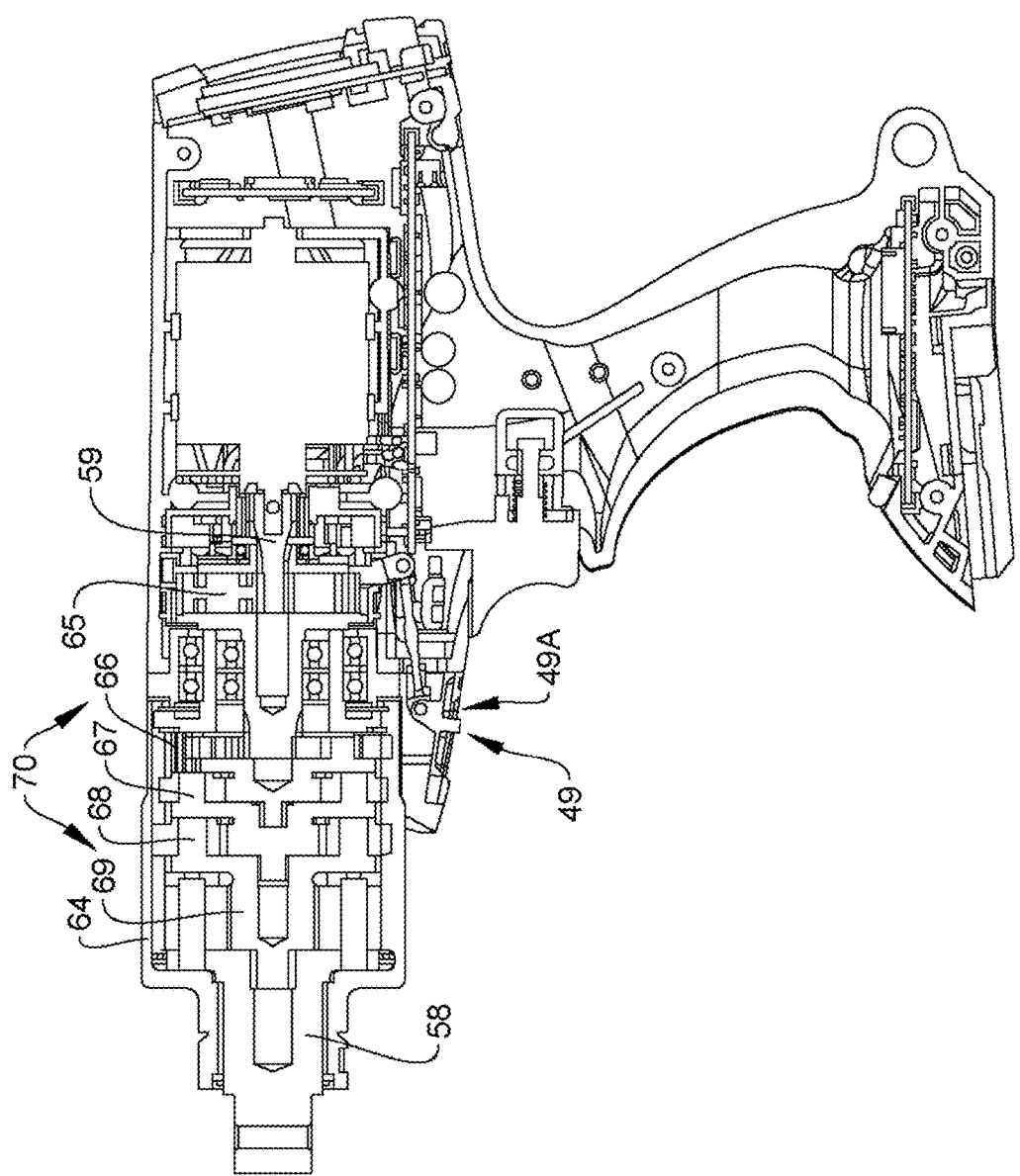
FIGS. 4A and 4B are cross-sectional views of Tool A, and/or other embodiments of the present application, in a higher speed/lower torque ("HSLT") mode and a lower speed/higher torque ("LSHT") mode, respectively.
Figure 4B:
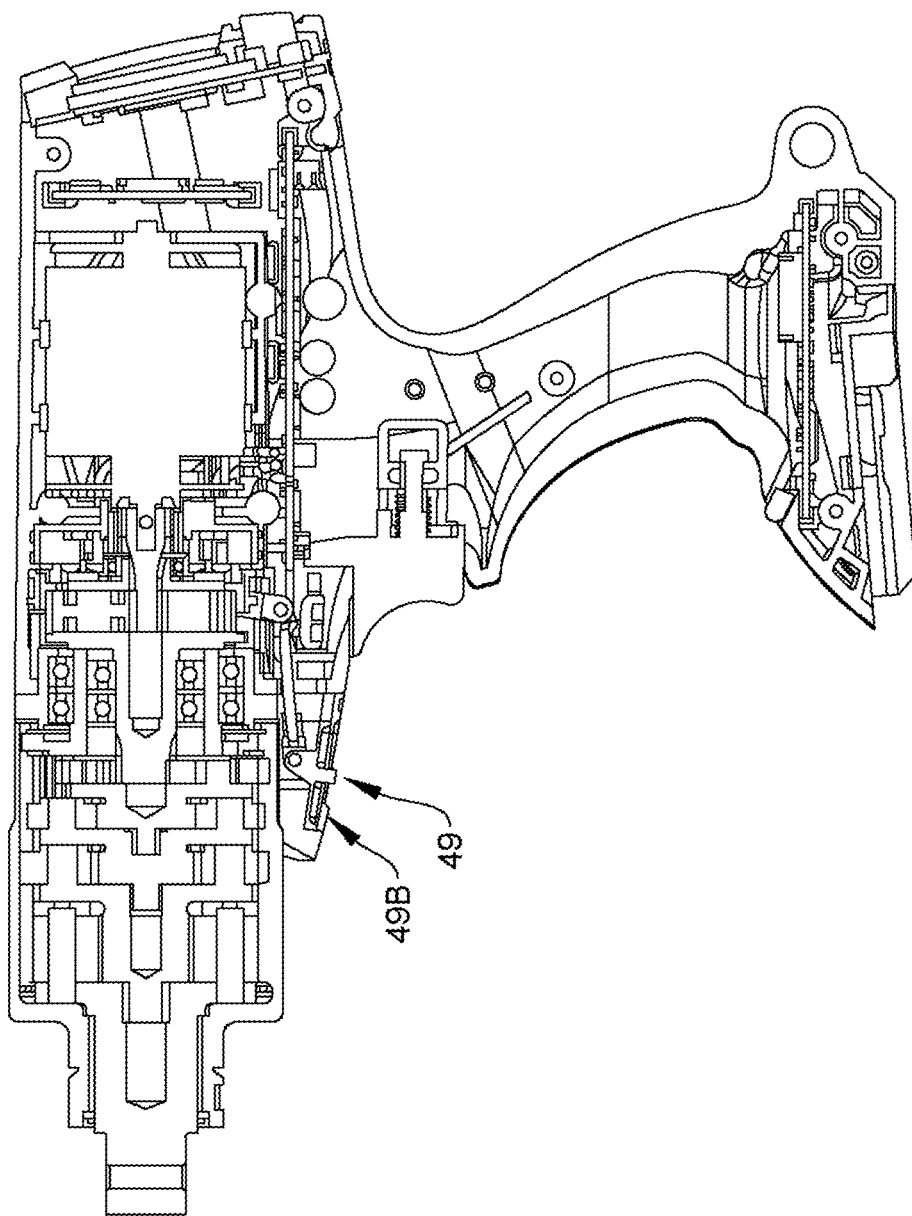
Figure 5A:
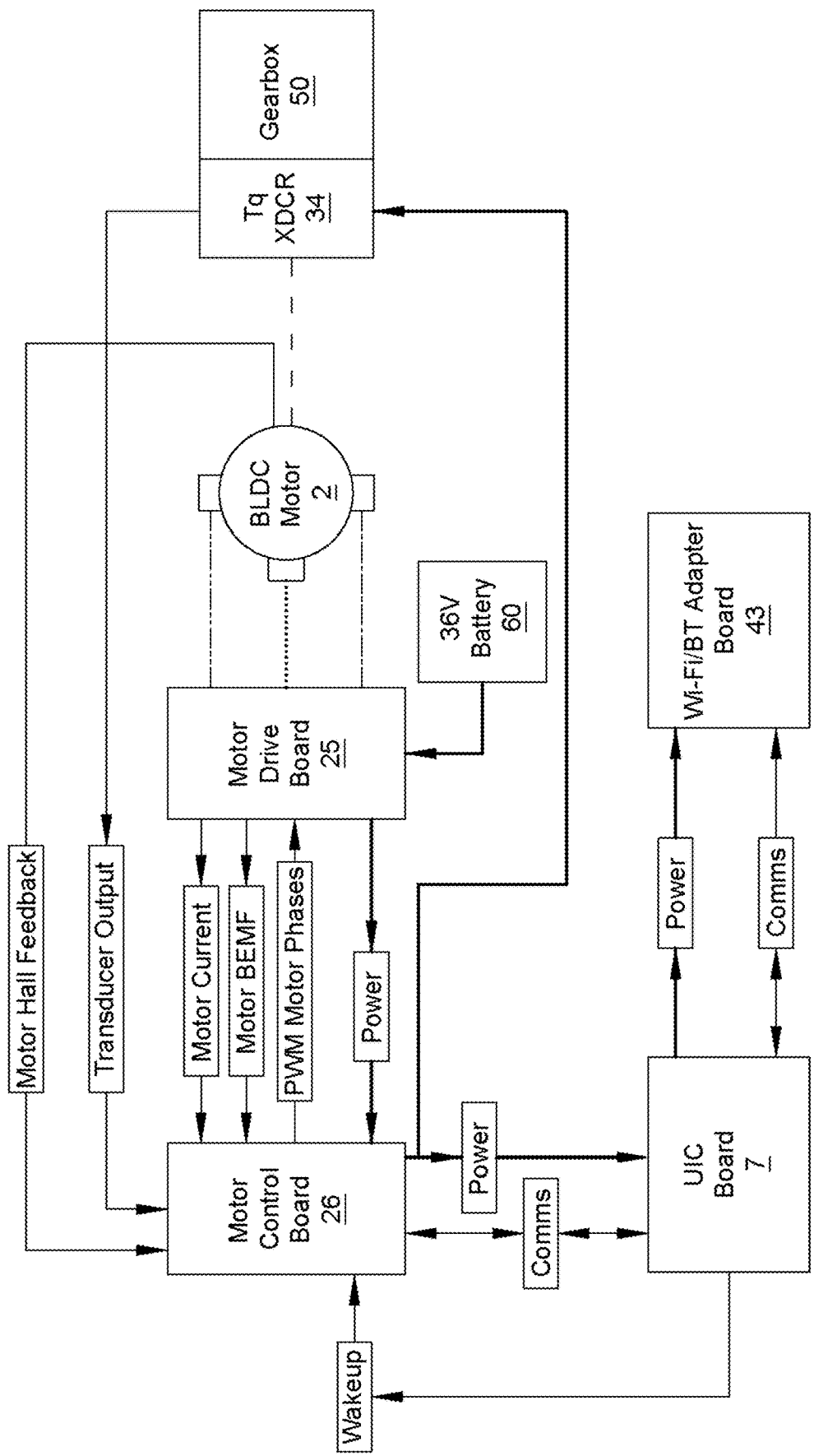
FIGS. 5A and 5B are block diagrams of circuit(s) of Tool A and/or other embodiments of the present application.
Figure 5B:
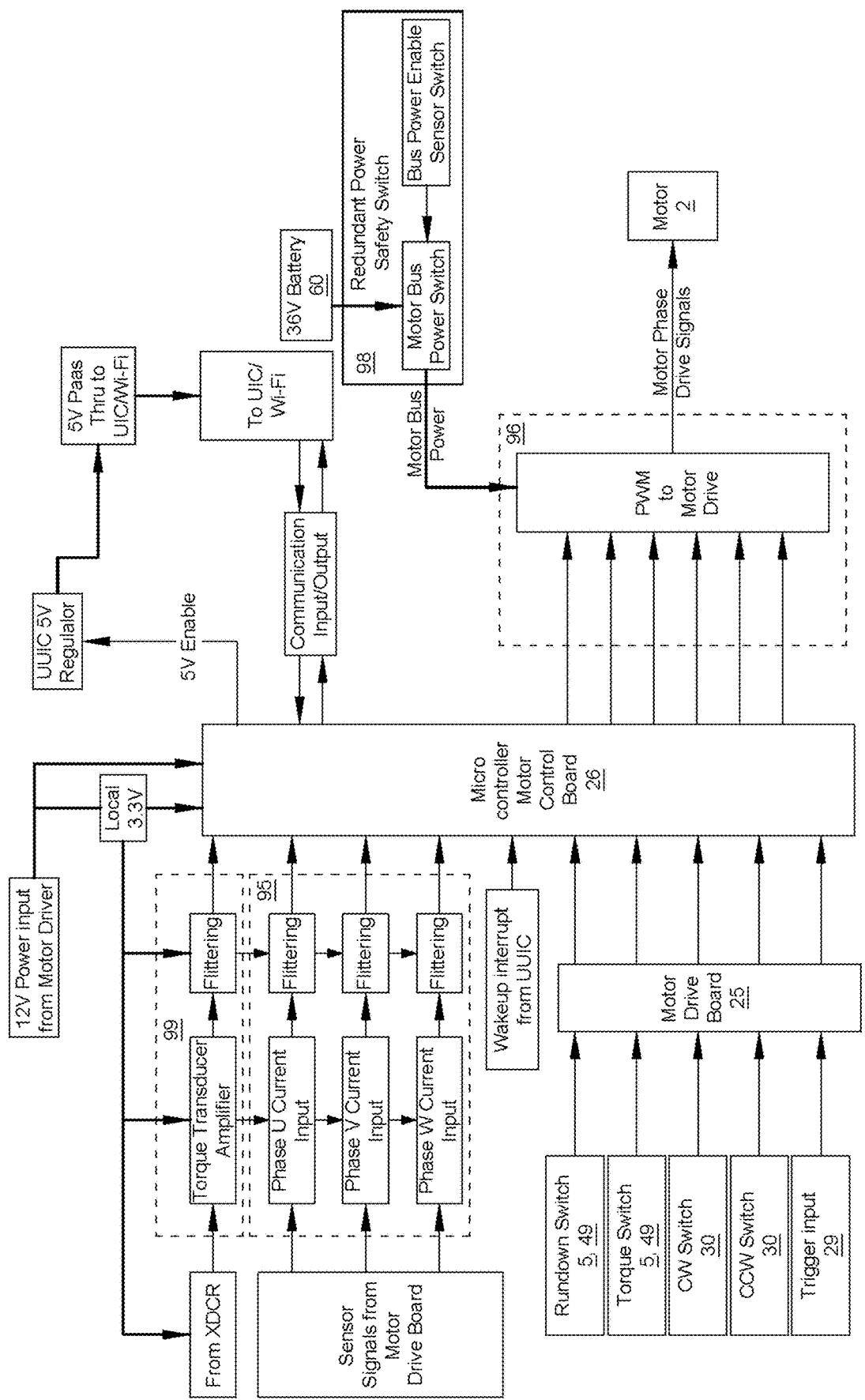

FIGS. 1-5 illustrate an example of Applicant's industrial electric, handheld torque guns in the form of HYTORC® LITHIUM SERIES® II Torque Gun Tool A. FIG. 1 is a full perspective view of Tool A. FIG. 2 is an exploded perspective view of Tool A. FIGS. 3A, 3B and 3C are downward, upward and side perspective views, respectively, of Tool A with a left tool handle housing 36A removed. FIGS. 4A and 4B are cross-sectional views of Tool A in HSLT mode and LSHT mode, respectively. FIGS. 5A and 5B are block diagram of circuit(s) of Tool A.

Inventions disclosed in the commonly owned and co-pending patent application, U.S. application Ser. No. 16/324,792, a US 371 of PCT Application Serial No. PCT/US17/45937, having Filing Date of 8 Aug. 2017, entitled "APPARATUS FOR TIGHTENING THREADED FASTENERS", an entire copy of which is incorporated herein by reference, are further advanced under this patent application.

PCT/US17/45937 discloses, inter alia, a torque power tool for tightening and/or loosening of an industrial threaded fastener including: a motor to generate a turning force; a drive to transfer the turning force; a turning force multiplication mechanism assembly; and a yoke-style shifter assembly to shift the tool into any torque mode from lower and/or higher resistance and/or speed.

Tool A is a second generation version of the torque power tool disclosed PCT/US17/45937. Although the numbering structure of components in PCT/US17/45937 differs from the present application, Tool A includes many correspondingly similar parts.

Tool A may have the following labeled components shown in FIGS. 1-5B, including, but not limited to: a pushrod assembly 1; a motor assembly 2; a $1^{st}$ stage assembly 3 and/or 65; a dual speed bearing housing assembly 4; a shift yoke assembly 5; a battery terminal plate assembly 6; a rear cover assembly 7; a retaining ring 8; a retaining ring 9; a ball plunger 10; a spring 11; socket head cap screws (or the like) ("SHCS") 12, 14, 17, 18, 20, 21; a roll pin 13; a wave spring 15; a split bushing 16; an antenna/communication module 19; a 1st stage ring gear 22; a clevis pin 23; a trigger magnet 24; a motor power drive board 25; a motor control board 26; a motor flange 27; a fixed gear 28; a trigger 29; a switch lever 30; a thrust spacer 31; a USB port plug 32; a 5 pin BSM cable (not shown) 33; a torque transducer 34; a housing 35; a housing (LH) 36A; a housing (RH) 36B; an antenna top cover 37; an antenna mount 38; a grease baffle 39; a front gap pad (RH) 40; a front gap pad (LH) 41; a rear gap pad 42; a BSM board 43; a 24 pin motor drive cable (not shown) 44; a 5 pin control—UIC cable (not shown) 45; a 6 pin motor hall cable (not shown) 46; a motor insulator 47; a UIC board 48; a speed switch 49; a gearbox 50; a work light 51; a handle attachment 52; a reaction spline 53; a square drive 54; cooling vent(s) 55; an eyelet 56; a pistol grip handle portion 57; an output shaft 58; an input shaft 59; a battery 60; a battery release button 61; a battery test button and charge indicator 62; a handle assembly 63; a turning force multiplication housing 64; a $2^{nd}$ gear stage assembly 66; a $3^{rd}$ gear stage assembly 67; a $4^{th}$ gear stage assembly 68; a $5^{th}$ gear stage assembly 69; a turning force multiplication mechanism 70; a drive input and output assembly 80; a turning force multiplication assembly 81; a dual drive output and reaction assembly 82; and a yoke-style shifting assembly 83; a turning force 91 in one direction 93; a reaction force 92 in an opposite direction 94; a current measurement circuit 95; a motor drive circuit 96; a torque measurement circuit 97; and a redundant power safety switch circuit 98.

Tool A, as shown, includes: drive input and output assembly 80; turning force multiplication assembly 81; dual drive output and reaction assembly 82; and yoke-style shifting assembly 83 for any torque mode from lower and/or higher resistance and/or speed. Advantageously, yoke-style shifting assembly 83: improves and simplifies design and operation of shifting; reduces tool size and cost; and increases tool portability, efficiency, reliability and repeatability, all without sacrificing Applicant's many innovations in hand-held, multispeed torque intensifying tools.

Tool A and/or other embodiments of the present application, includes many improvements over the PCT/US17/45937 tool, some of which are described below in general terms.

Tool A may include torque transducer 34 for direct measurement of torque output. Inventively, torque transducer 34 is mounted to motor flange 27 and first stage ring gear 22. Such structure creates a fixed point for the torque to react against allowing rapid feedback from the torqueing operation.

Tool A may include magnetic trigger switch 24 and magnetic rundown switch 49. Tool A does away with mechanical switches in favor of Hall Effect Sensors to improve reliability.

Tool A may include a nickel-plated gearbox 50. The decision to nickel plate the gearboxes came about as a result in our black oxide finished gearboxes rusting in a very short period of time. There was a very limited shelf life of black oxide finish and virtually no corrosion protection from outside elements. To combat these detrimental conditions if rain or other moisture infiltrated environments, it was decided to electroless nickel plate the gearboxes over other alternatives. The electroless nickel in highly corrosion resistant, uniform and appealing in appearance and relatively inexpensive compared to other corrosion resistant coatings. The electroless, or chemically applied nickel is less porous than electroplated nickel, enhancing the corrosion resistance. It's added benefit is that it adds a layer of scratch resistance also.

Tool A may include a metal housing 35 (36A and 36B), namely aluminum. The decision to use a metal housing on a battery tool was as a result of durability issues of a plastic housing. These torque tools are much heavier than commercial drills and as such come under huge shock loads when dropped from even modest heights. These increased shock loads are devastating to plastic enclosures so the change was made to use a metal housing to be able to absorb the increased demands placed upon the tools from the detrimental effects of ever increasing mass and acceleration on tool housings. Additionally, tool A may include a rear cover shock guard for improved impact resistance and screen and button protection.

Figure 9A:
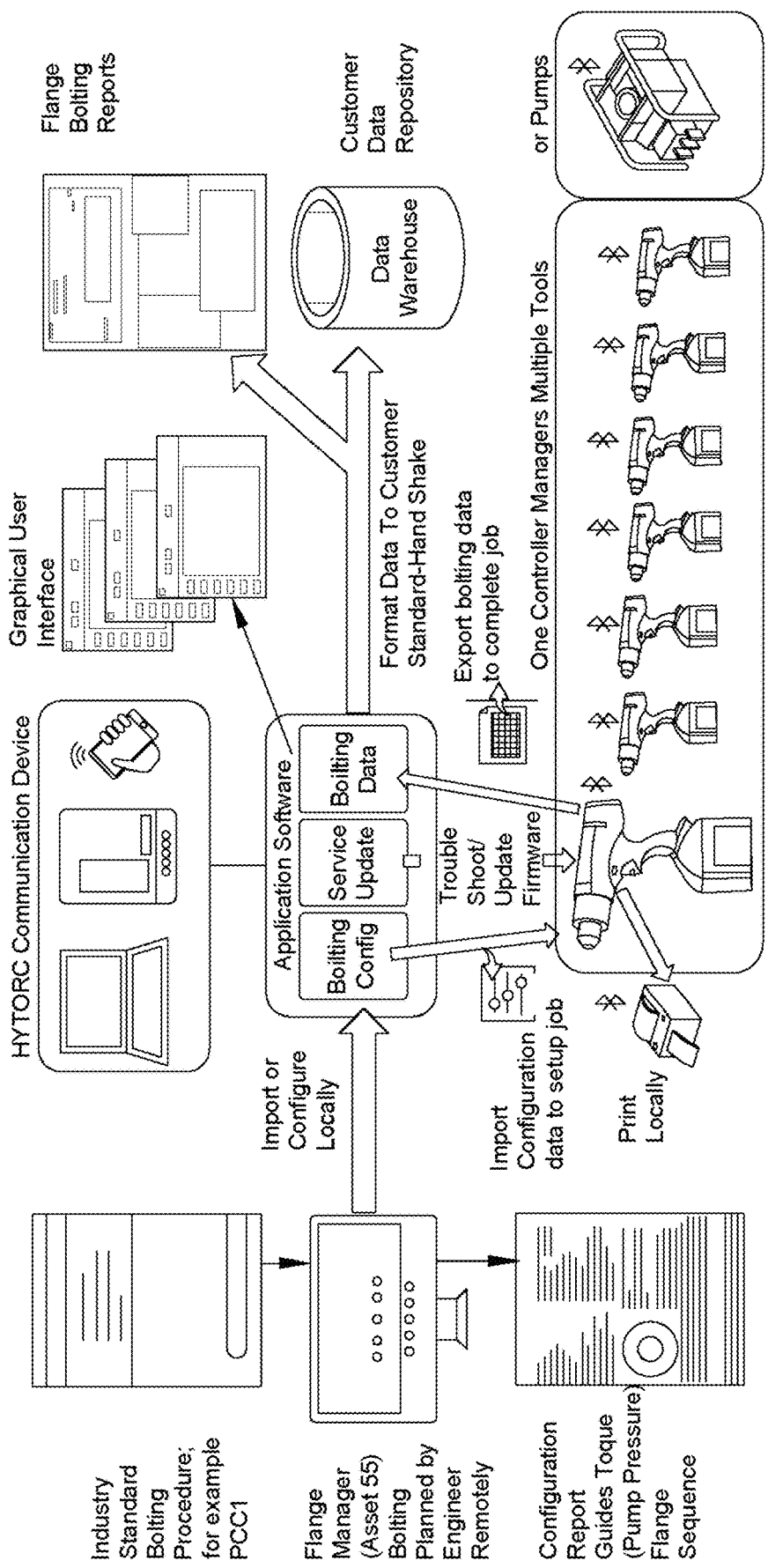
FIGS. 9A and 9B are summaries of available hardware, software and firmware features and environments for Tool A and/or other embodiments of the present application.
Figure 9B:
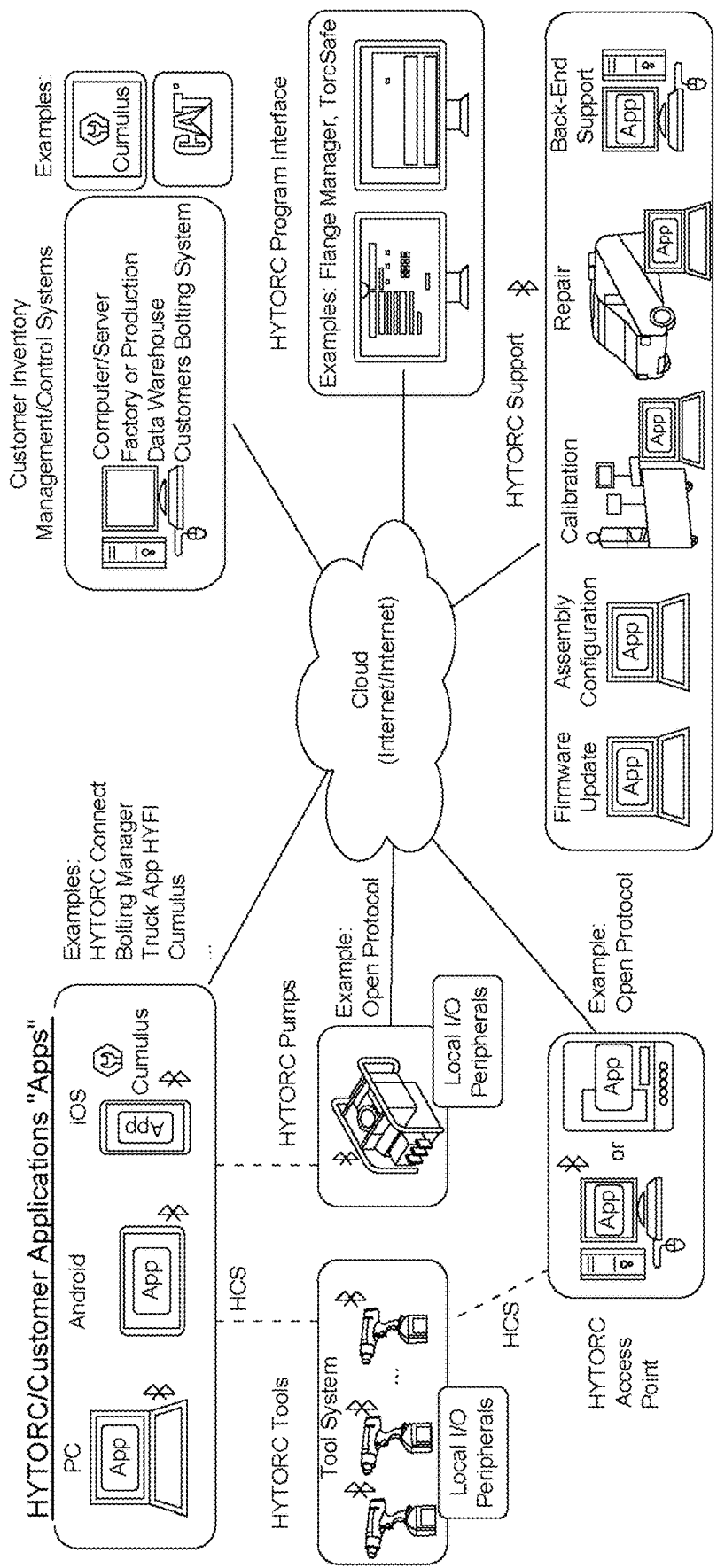

Tool A may include wireless capabilities. Wireless connection with Tool A may be by any suitable means including Satellite, WI-FI, WI-FI Direct, WiMAX, Bluetooth, ZigBee, Microwave, Infrared, and/or Radio. For general field and production bolting purposes, bolting data (from one or more Tools A, pumps), bolting configuration information (from industry standard bolting procedures like PCC1, HYTORC Flange Manager software and/or other proprietary software, reports, guides, etc.), and bolting service (like troubleshooting and firmware updates) can be wirelessly synced between Tool A, PCs, mobile devices, printers, production/planning/scheduling systems, bolting databases, HYTORC and customer access points and data repositories, reports, controllers w/HYTORC Graphical User Interface (GUI), dedicated mobile applications, etc. A user may wirelessly update the firmware in any or all of the three programmable boards in Tool A. Further Tool A, and variations thereof, may be integrated with HYTORC's Wireless SIMULTORC™ bolting regime, disclosed in U.S. Ser. No. 16/081,917. FIGS. 9A and 9B show a summary of many wireless and other connectivity features related to Tool A.

Tool A may have improved modular, functional architecture, with base service module ("BSM") board 43, universal interface controller ("UIC") board 48, motor drive board 25 and/or motor control board 26. For example, UIC board 48 may include: 32-bit processor (replaces 16-bit processor); 1028 MB Flash Memory (previous limit 256 KB or 5000 events); store virtually unlimited number of events; store menus in multiple languages; control higher resolution screen, evaluating 2× resolutions; file management system. BSM board 43 may include: Bluetooth enabled for printer & access point; upload firmware & download data; clock; micro-SD Flash; and 8 GB storage for events.

Tool A may include a new AC/DC converter for corded power connection and charging with the tool and/or battery during use.

Tool A may include a battery and/or tool tether and/or pouch to connect the user, tool and/or battery for improved safety and durability, particularly at elevated bolting heights.

Tool A may include a brushless 36V DC Motor 2, which runs cooler under all temperature conditions and is more efficient, faster with longer tool life.

Tool A may include improved, additional and/or combined basic and/or advanced bolting operations, as described below.

Tool A may include improved heavy-duty gearboxes and come in one or more additional models including: 700 ft.lbs. (min 70, max 700, ¾" square drive); 1000 ft.lbs. (min 120, max 1000, ¾" square drive); 2000 ft.lbs. (min 200, max 2000, 1" square drive); 3000 ft.lbs. (min 300, max 3000, 1" square drive); and 5000 ft.lbs. (min 5000, max 5000, 1½" square drive).

Tool A may include improved and/or additional cycle counting mechanisms for usage, service and/or maintenance alerts, as described below.

Tool A may implement an $I^2t$ algorithm in addition to a physical temperature sensor as a secondary method of tool and motor protection, which would temporarily shut down the motor if it exceeds a certain operating temperature.

Tool A may include a Hall Effect Sensor added to the Yoke-Style Shifter. Incorporated in the design of a selectable gear stage is a shift yoke, which shifts a movable ring gear from a stationary position to a position locking out a planetary gear stage. In normal operation, it is beneficial for the tool processor to know which gearing situation the ring gear is in via the shift yoke. This can be accomplished by an electromechanical switching device, or limit switch situated in two positions, actuated by a device on the yoke shifter. Limit switches are electromechanical devices that are prone to wear and thus have limited cycle lives. They are also bulky and require volume to package the inner workings of the switch and a housing. A Hall effect sensor on a yoke style shifter replaces what would be a mechanical limit switching device. The Hall effect sensor requires very little in terms of volume space to implement, have no moving parts integral to the switching process, and as such, have a theoretically infinite amount of cycles of operation. They require no lubrication and very little energy for operation.

Tool A may include dual speed bearing housing 4 integrated with external side handle attachment 52. With the advent of heavier gearboxes involved with torque tools, it becomes evident that single hand lifting operation of these tools becomes more difficult. The heavy gearboxes pushes the center of gravity out further away from the handle, thus creating a moment loading on the wrist of the operator. This increases operator fatigue and also the risk of accidental drops. To counter this ever increasing weight related effect, it was decided to add a second point of handling closer the tool center of gravity to aid the operator. The bearing housing was chosen as a hard mounting point for another handle being the furthest forward component capable of dealing with the additional stress generated from the increasing masses. The additional side handle was made as to be easily removed to utilize the new mounting points for other tool handling attachments such as lifting eye brackets for overhead hanging lanyards or some other aids in bolting, i.e. additional lighting or cameras etc.

Tool A may include improved design features including the following. Being large, heavy devices, these battery torque tools have increased problem areas related to increases in size and weight. Damage from mishandling and harsh operating environments are always a concern, as well as operator fatigue and safe operation. The tool is designed with features to better address these issues including ergonomics for the operator in the shape of the handle and positioning of operator interface and functional lighting. The rear cover/operator screen is surrounded by a thick rubber jacket in the event of a drop on the rear of the tool, which would be the point to bear the most damage from all the heavy mass of the gearbox. The centerline of operation is positioned high up as to access tight areas such as a pipe flange at the same time positioning the operators hand further away from potential pinch hazards. The gear select switch is located underneath the bearing housing, away from the top, to allow the operator easy access in tight bolting applications. USB connector port 32 is located in an area least likely to possibly get damaged during operation and is covered by an attached, or tethered port plug when not in use, eliminating the chance of the port plug from being lost. There is also cast-in lanyard hard eyelet 56 for tool drop safety.

Tool A may have an integrated high resolution LCD screen of UIC board 48 to display parameters for all bolting operations. The screen is mounted juxtapose with control buttons (currently three) used to increment and decrement parameter values and to navigate through a hierarchical menu system. The screen provides guidance, cues and indicators for which buttons to push to set parameters and input information. The high resolution is used to define pictorially and diagrammatically the bolting functions providing a more intuitive experience for the bolting technician. The user can simply scroll and select parameters needed to initialize the bolting functions and monitor values and results from the bolting operation. The high resolution screen allows the use of high resolution Icons which provide unique and rapid visual definition of bolting functions on the tool menu. Furthermore this screen has been integrated into the molded rubber bumper which protects the screen from damage by impact in the rear of the tool. The control buttons on the rear surface of the tool just below the display screen provide the principal means for the user to interact with the tool's graphical user interface. Three rectangular boxes appear at the bottom of the screen just above the 3 physical buttons corresponding the button actions. The function of each button shall be indicated by the symbol and/or text in the box directly above.

Tool A may have unique user interface ideas, such as the tool operating system provides a unique method for inputting text information. Initially, a left-justified message is displayed in the field in gray font indicating what is to be entered (e.g., "Enter a new Job ID"). When either arrow key is pressed to scroll through the characters, the message is removed and the number 0 shall be displayed in the first character position in bold font. Pressing the up arrow shall scroll up through the character set (1, 2, . . . , 9, -, A, B, . . . , Z, 0) and down arrow shall scroll in the opposite direction (Z, Y, . . . , A, -, 9, . . . , 1, 0). Pressing the center button selects the currently displayed character and move focus to the next character position. As each character is entered, an underline "cursor" (blinking if possible) shall appear one character space to the right. If the maximum number of characters is entered, the underline cursor disappears and no further input will be accepted. All characters remain visible and in bold font. When all desired characters have been successfully entered, the user must press Select one additional time to complete A/N string entry and move to the next screen.

Tool A may include a real-time torque progress indicator. The tool displays a graphical real-time progress indicator as one presentation measuring the actual progress of the torque delivered to the bolt providing users with a method to monitor the progress as torque is gradually applied. This is particularly useful given the low speed of the tool when delivering torque so that the user knows where they are in the torque application process at all times and also provides an indicator of when to stop.

Another implementation of the menu is to allow users to construct their own shortcut menu system which is a benefit in reduction in the number of buttons. Tool administrators can simply select from the menu items used most often to present those menu items on the primary or first menu displayed thus saving the workload of having to navigate into sub-menu layers to find the function they used most often.

Figure 6:
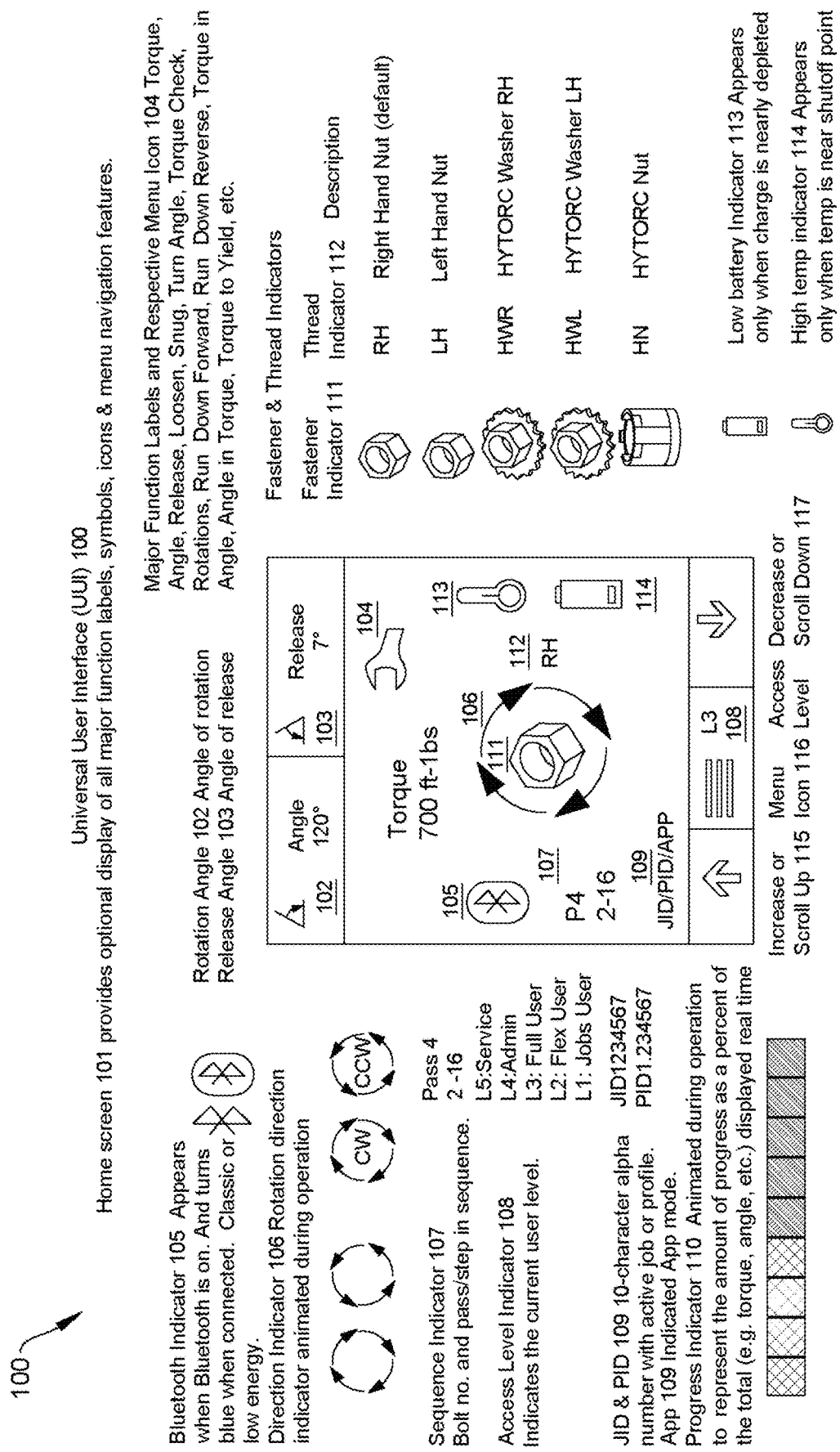
FIG. 6 is a summary of a Universal User Interface ("UUI") 100 of Tool A and/or other embodiments of the present application.

FIG. 6, by way of example, is a summary of UUI 100 of Tool A. UUI 100 includes a home screen 101. Home screen 101 is shown as a special customized layout 101B to present the most operating functions, labels, symbols, icons and menu navigation features. Note that a standard screen layout 101A with fewer such items would be sufficient for many of the major operating functions.

FIG. 6 shows special customized layout 101B of home screen 101, which includes, but is not limited to, the following functions, labels, symbols, icons and menu navigation features with short summaries of each: rotation angle 102; release angle 103; major function labels and respective menu icons 104; Bluetooth® (wireless) indicator 105; direction indicator 106; sequence indicator 107; access level indicator 108; job identification (JID) 109A, profile identification (PID) 109B and/or application identification (APP) 109C; progress indicator 110; fastener indicator 111; thread indicator 112; temperature indicator 113; battery level indicator 114; increase or scroll up icon 115; menu icon 116; and/or decrease or scroll down icon 117.

Figure 7:
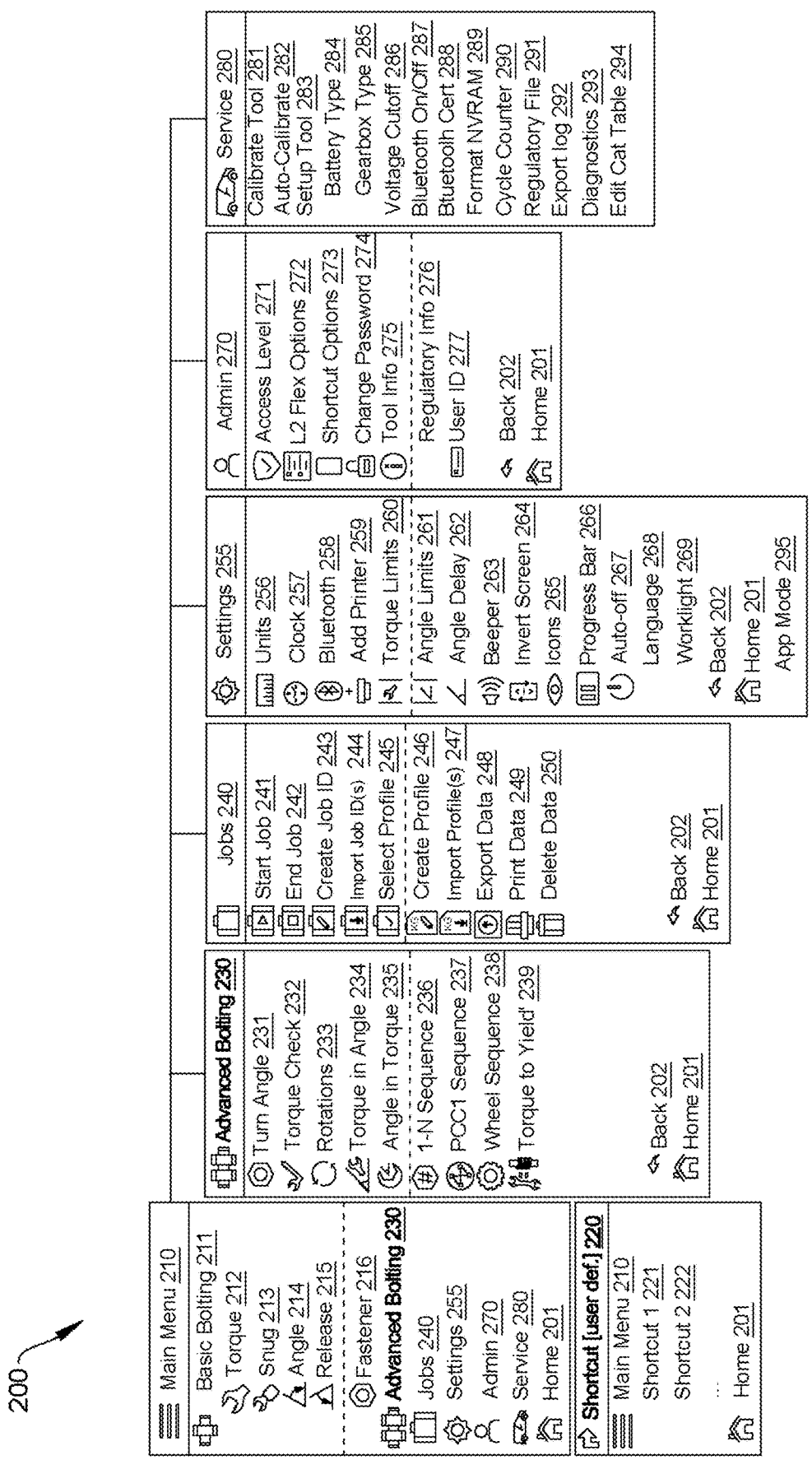
FIG. 7 is a summary of a menu structure 200 of UUI 100 and available features in Tool A and/or other embodiments of the present application.

Per FIG. 7, an overall UUI menu structure 200 provides all functions and options in easily navigable and intuitive groupings. A main menu 210, includes options such as: basic bolting parameters 211 (torque 212, angle 214, release angle 215, fastener type 216, etc.); snug operation 213; customer-accessible submenus such as advanced bolting 230, jobs 240; settings 255; administrative 270 and/or service 280; other bolting functions; and/or any combination thereof. The options appearing on each sub-menu are contingent upon access level, which is designated in menu 271. The fifth submenu, service 280 is intended primarily for service personnel at a high(er) access level. A user-defined shortcut menu 220 allows customers to build and customize their own menus, bolting operations, jobs, settings, etc.

Advanced bolting sub-menu 230 contains bolting options such as: turn angle 231; torque check 232; rotations 233; torque in angle 234; angle in torque 235; 1-n sequence 236; PCC1 sequence 237; wheel sequence 238; torque to yield 239; other bolting sequence operations; and/or any combination thereof. A back option 202 appears on most submenus too.

Job data sub-menu 240 provides the user with job options such as: start and end job data recording 241 and 242; create and import job IDs 243 and 244; select, create and/or load job profiles 245, 246 and/or 24; export, print and and/or delete job data 248, 249 and/or 250; other job operations; and/or any combination thereof.

Settings sub-menu 255 allows the user to change a wide variety of options, such as: units 256; clock 257; Bluetooth® (wireless) 258; add printer 259; torque limits 260; angle limits 261; angle delay 262; beeper (sounds) 263; invert screen 264; icons 265; progress bar 266; auto-off 267; language 268; worklight 269; APP mode 269; other bolting settings; and/or any combination thereof.

Admin sub-menu 270 provides options to manage a wide variety of administrative functions such as: passwords 274; tool access levels 271; menu options available to a Level 2 (Flex) user 272; options available on the shortcut menu 273; tool information 275; regulatory information 276; user ids 277; other admin settings; and/or any combination thereof. It also provides users at all access levels with access to pertinent system information such as firmware versions and updates.

Service sub-menu 280 provides options for service personnel to configure, setup, service, calibrate and/or troubleshoot the tool, such as: calibrate tool 281; auto-calibrate 282; setup tool 283; batter type 284; gearbox type 285; voltage cutoff 286; Bluetooth® (wireless) on/off 287; Bluetooth® (wireless) certification 288; format NVRAM 289; cycle counter 290; regulatory information 291; export log 292; Diagnostics 293; Edit Calibration Table 294; other service settings; and/or any combination thereof.

Note that access to any and/or all of the menu structure 200 and related functions and options can be limited per access levels.

Basic bolting functions 211 include torque 212, snug 213, angle 214, release 215 and fastener 216, which are described below in general terms. Not shown in FIG. 7 is a loosen operation. When tool A is switched to loosen by reversing switch 30 direction, a loosen home screen is displayed showing the maximum breakout strength of tool A. The screen directional arrows switch direction to show loosen direction 106 for selected fastener 111. The user can adjust the loosen torque value down by pressing right button 117 or back up by pressing left button 115. The torque limits set in settings menu 255 may not apply to loosen.

The user can select torque from the primary menu to display the torque home screen. A user operating the tool in any other mode (e.g. Snug, Turn Angle, Torque Check, Rotation, etc.) can return to the torque Home screen by selecting the torque option. The torque value may be adjusted by using the left and right buttons to increase or decrease the torque value to the nearest ft-lb (or other unit selected in the preferences menu). The torque value may be adjusted anywhere from the minimum to the maximum calibrated value of the tool. The torque value is subject to torque limits set in the settings menu which may reduce the torque range available to the operator. The torque operation is often used in series with an angle and/or a release. A release angle is almost always recommended to take the tension off the motor and release the tool from the application. A default release value is displayed and the user can adjust release up and down. During operation with angle and/or release, the torque value is always applied first followed by angle and then release. If the user leaves the torque screen the torque value is saved and displayed again the next time the user returns to the torque screen. While adjusting the torque value, the user may continue to hold the right button after reaching minimum torque value, and the screen changes to the snug function.

The user may select snug operation may be selected from the basic bolting menu or may be displayed when the user reduces the torque value below the lowest calibrated value in the torque function. In the snug function, users select a torque value sufficient to bring two structural surfaces into contact. The word snug is displayed in place of the word torque on the screen. The user can adjust the snug torque value up and down using the left and right buttons to the nearest ft-lb (or other unit selected in the settings menu). When the user enters the snug function through the menu, the value is the minimum snug value. Angle is not used with snug, so the angle value will be set to 0 degrees. A release angle is required, so the default release is displayed and the user can adjust release angle as needed. The snug range is established from the lower limit which is the minimum reliable output of the tool to the upper limit which is the minimum calibrated value for the tool. When the tool is operating in the snug range, the accuracy is less than in the calibrated range. Documentation for each tool will clearly define the snug torque range and accuracy (e.g. torque+/−10%). If the user requires a higher value than the upper limit for snug they will adjust the torque higher and return back to torque function. When finished with the snug operation, the user can press the center button to return to the primary menu to perform other operations.

Selecting the angle option directs the user to the angle input screen where they can scroll up/down to adjust the angle to the nearest degree. The angle selected on this screen is always applied in a "Torque and Angle" sequence within the same trigger event as the torque operation. The angle may be adjusted within the min to max angle limits of the tool which are 0 to 999 degrees. The angle value may also be limited by the angle limits set in the preferences menu which are typically 0 to 360 degrees. The user presses the center button to select the angle and return to the primary menu. The angle value is saved in the tool and will be displayed the next time the user selects the angle option from the menu. When the user returns to the home screen the angle value is labeled and displayed in the box in the upper left of the screen. Just as with torque operations, a release value is usually required following angle. During operation, angle is always applied after torque and before release. The angle always turns the nut in the same direction as torque.

Selecting the release option directs the user to the release input screen where the user can scroll up/down to adjust release angle to the nearest degree. The release angle takes the tension off the motor allowing the tool to be released from the bolt. The release angle is subject to min and max angle limits set in the preferences menu. Release is almost always used so a default value is displayed and the user can adjust as necessary. After selecting release, the user presses the center button to return to the primary menu. When the user returns to the home screen they will see the release angle displayed and labeled in the box in the upper right of the screen. The release angle selected is saved in the tool until changed to another value. Release may be used in conjunction with some other torque function such as Torque, Angle, Snug, Turn-of-Nut, Torque Check and Rotations. Release is applied after the torque function but within the same trigger pull as these operations. The release angle is always applied in the opposite direction to the torque function.

Selecting the fastener option directs the user to a screen containing fastener types including: right hand nut, left hand nut, HYTORC Washer right hand, HYTORC Washer left hand and HYTORC Nut. Upon selection the user is returned to the primary menu. When the user returns to the home screen they will see a graphical representation of the fastener selected in the center of the home screen, the directional arrows indicating the direction of rotation for tightening and the abbreviation of letters to indicate thread direction (RH, LH, HWR, HWL &HN). The fastener is set by default value of RH which is one of the most common uses in practice. When the user selects another fastener, this setting is saved in the tool until changed by the user. The fastener selection is critically important because it determines the fundamental direction of rotation for the operation.

The user may setup the fastener and/or position the tool as described in the following steps.
1. Set Up the Tool—Using the control panel adjust the tool parameters to the desired configuration including Torque and Fastener and optionally Angle and Release.
2. Run Down—Thread the nut either by hand or by using the tool on the stud until positioned tight against the flange. When using the tool to run down the nut set the speed control to "RUN DOWN" and position the tool on the nut—pull the trigger to quickly run down the nut until it touches against the flange. After applying the tool to Run Down set the speed control switch to TORQUE.
3. Position Back Wrench—If needed, apply a back wrench to the back nut on the bolt to prevent the back nut from turning during tightening. If using the HYTORC Back Washer a back wrench is unnecessary.
4. Position Drive/Socket—Place the tool socket on the nut, making sure that the socket has fully engaged the nut. If using an alternate driver such as the HYTORC Washer Driver or HYTORC Nut driver make sure the driver properly engages the fastener including HYTORC washer or nut if installed.
5. Position Reaction Arm—If a reaction arm is used, make sure the reaction arm is firmly abutted against a stationary object (e.g. an adjacent nut, flange, equipment housing etc.).

The user may tighten with torque as described in the following steps.
1. Pull Trigger to Tighten.
2. Press ANY Button—If using a reaction arm and set for RH or LH Fastener, the tool will display "Press any button to start" and will not operate until the user pulls the trigger and presses any button on the rear of the tool—this is a safety feature to ensure that the operator keeps both hands clear of the reaction arm.

3. If the reaction arm has not already been positioned against a firm surface, once the tool starts the reaction arm will move until it is firmly abutted against the reaction surface.
4. CONTINUE to Pull and Hold the Trigger to Apply Torque—While holding the trigger, the tool will apply torque and rotate the nut the specified TORQUE value and then stop. During Torque application the Torque Function is highlighted yellow. Continue holding trigger if applying angle or release.
5. Hold for Angle—Continue holding the trigger if a non-zero ANGLE has been specified and the tool will restart (after specified time delay if set) and then stop again after rotating the nut through the specified ANGLE.
6. Hold for Release—Continue holding the trigger if a non-zero RELEASE has been specified and the tool will restart (after specified angle delay if set) and then stop again after completing the RELEASE angle to allow the tool to be released from the nut. Note, if torque has been applied without a release angle and the tool locks onto the nut, loosen the nut, set a release angle and try tightening again.
7. Monitor Screen & Status LED—The status light is amber during operation. If the operation is successful the status light will illuminate green. If unsuccessful the status light will turn red. The final screen displayed will have a green check mark. If unsuccessful the final screen will have a red X and the operator will need to trouble shoot and/or try again.
8. Release Trigger—Release the trigger after the tool has completed all specified operations (Torque, Angle & Release), the tool stops for the last time and the BEEPER sounds (if activated); then remove the tool socket/drive from the nut.

The user may loosen the bolt as described in the following steps.
1. Setup Tool—Use the menu to specify the fastener type; e.g. LH, RH, HYTORC Washer.
2. Set to Loosen—Press direction switch to change from TORQUE to LOOSEN. The tool automatically sets the Loosen Torque to the maximum calibrated value of the tool. The Loosen value may be adjusted by pressing the right button to decrease the value or the left button to increase the value.
3. Position Back Wrench—If needed, install back wrench to keep the back nut from turning.
4. Position Tool on Nut—Make sure tool socket/driver is properly positioned on the nut.
5. Position Reaction Arm—If a reaction arm is used, make sure the reaction arm is firmly abutted against a stationary object (e.g. an adjacent nut, flange, equipment housing etc.
6. Pull Trigger to Loosen—Pull the trigger to turn the nut in the loosen direction. If a RH or LH fastener has been specified the operator will be asked to push any button to start. Press the button and continue to hold the trigger to carry out the loosening operation.
7. Monitor Status—The status light is green in the loosen mode. Once the trigger is pulled the status light turns amber and stays amber through the operation. A status light turning red indicates an error.
8. Release Trigger—When the bolt is sufficiently loosened release trigger to stop loosening and verify nut is completely loose.

Advanced bolting sub-menu 230 includes turn angle 231, torque check 232, rotations 233, torque in angle 234, angle in torque 235, 1-n sequence 236, PCC1 sequence 237, wheel sequence 238, and torque to yield 239, which are described below in general terms. Some of these advanced functions may require additional training or support beyond the amount of support usually required for basic bolting functions. These and other advanced bolting functions may be specialized for a particular application or industry. New and/or additional bolting functions may be introduced by placing them on the advanced bolting menu.

Selecting the Turn Angle option may direct the user to a sub-menu to choose Normal or Slow speed. If user selects Normal Speed, the Turn Angle version of the Home Screen appears where a user can directly adjust the degree of Angle to turn a fastener in either the tighten or loosen direction, independent of the Torque previously applied. The default Angle value is zero degrees. The angle may be adjusted in the range of the tool (0 to 999 degrees) or to whatever limits have been specified with the Angle Limits option on the Settings menu. This function generally requires a release angle (default=7 degrees). To change Release angle, use must press the center button to return to the Main/Basic Bolting Menu and select Release. Upon selecting a new release angle, user is returned to the Turn Angle operations screen. The value of Turn Angle is retained in the tool and displayed the next time the operator selects the Turn Angle option.

User can control direction of Turn Angle (Tighten or Loosen) using the tool's directional switch. Actual direction (CW or CCW) in which the fastener will turn will also take into account the Fastener Type. For example, with a right-hand fastener, when the directional switch it in the Tighten position, Turn Angle will move the fastener CW. With a LH or HN fastener, and directional switch set to Tighten, the fastener will move CCW.

The objective of the Slow Angle Speed feature is to turn the fastener slowly to allow the operator to properly align the application, after the fastener has been tightened to a specified torque. Slow Angle will enable an operation mode in which the motor will run at 40% PWM duty cycle while executing an Angle operation.

Selecting Slow from the Turn Angle Speed sub-menu will display the Slow Angle version of the Home Screen. Aside from motor speed, the tool behaves exactly as described in for the Turn Angle function at Normal speed. Selecting any other Basic or Advanced Bolting function will turn Slow Angle mode off (i.e., motor will now run at normal speed).

The Turn Angle function allows the user to tighten a fastener by turning a nut through a specific pre-engineered angle independent of the torque that has been previously applied. This function is often used with "Turn-Of-Nut" procedures or combination procedures in many structural applications. These approaches are most often two-step procedures where structural members are first snug-tightened to bring the surfaces into contact and alignment followed by Turn-Of-Nut to apply load to the fastener.

Tool A may be used to snug the fastener using the Snug function. When assembling an array of bolts the entire array is usually snug tightened before moving on to the Turn-Of-Nut procedure. The Snug value is the torque needed to bring the surfaces into firm contact. The value of Snug may be iteratively increased during assembly in order to gradually bring surfaces into firm contact.

The Turn-Of-Nut method is usually verified in the field using approved pre-installation verification techniques that involve verifying the angle on-site with a load testing machine. The Turn-Of-Nut method also may require match marking of the fastener to allow post installation inspection. See specific structural assembly guidelines for the specific job for these procedures.

In Turn-Of-Nut applications the exact torque is not defined but rather the engineer of record calculates the specific angle required to apply the exact load to the fastener. The Turn Angle function is used to complete the Turn-Of-Nut procedure by turning an already snug-tightened nut through the specified angle specified. The Turn Angle function is accessed through the Advanced Bolting menu. The user simply adjusts the angle value and then returns to the Turn Angle screen.

The user may setup for Turn Angle as described in the following steps.

1. Pre-Installation Verification—A verification procedure is completed at the site according to requirements (or code) to confirm suitability of the entire fastener system including lubrication and angle for turn-of-the nut method. All components including the tool should be verified to ensure there is adequate power to easily complete the required turn. Contact the engineer of record for exact procedure required at the site.
2. Run Down Nut—The nut is run down on the stud/bolt until positioned tight against the flange. When using the tool to run down the nut set the speed control to "RUN DOWN" and position the tool on the nut. Pull the trigger to quickly run down the nut until it touches against the flange. After applying Run Down to all nuts, set the speed control switch to TORQUE for the Snug and Turn Angle procedures.
3. Snug Nut—In order to apply the Snug torque the user will switch the tool to Snug and apply necessary torque required to bring the bolting surfaces into firm contact and alignment. All nuts should be snug tight to the point where they can't be loosened by hand.
4. Match Marking—The angle is optionally "matched marked" on the application prior to applying the angle to provide a means of inspecting the angle after the tightening. Consult the local inspection guidelines for the exact match marking required at the application. Since the tool provides a documented data file with verification of the angle turned the electronic data file may sometimes be allowed in place of match marking. Check with the engineer of record to determine if match marking is required.
5. Position Back Wrench—If needed, apply a back wrench to the back nut on the bolt to prevent the back nut from turning during tightening. If using the HYTORC Back Washer a back wrench is unnecessary.
6. Position Drive/Socket—Place the tool socket on the nut, making sure that the socket has fully engaged the nut. If using an alternate driver such as the HYTORC Washer Driver or HYTORC Nut driver make sure the driver properly engages the fastener including HYTORC washer or nut if installed.
7. Position Reaction Arm—If a reaction arm is used, make sure the reaction arm is firmly abutted against a stationary object (e.g. an adjacent nut, flange, equipment housing etc.).

The user may tighten with Turn Angle as described in the following steps.

1. Pull the Trigger—With Turn Angle set on the screen pull and hold the trigger.
2. Press ANY Button Option—When tightening a Right Hand and Left Hand Fastener the tool will display "Press any button to start" and will not operate until the user pulls the trigger and then presses any button on the rear of the tool—this is a safety feature to ensure that the operator keeps both hands clear of the reaction arm. If the reaction arm has not already been positioned against a firm surface, once the tool starts the reaction arm will move until it is firmly abutted against the reaction surface.
3. Turn Angle Tightening—CONTINUE to Pull and Hold the Trigger to apply Turn Angle. The tool will rotate the nut until the tool stops at the specified Angle value. When the trigger is pulled, the Turn Angle Function is highlighted yellow. Continue holding trigger if applying angle or release.
4. Hold for Release—Continue holding the trigger if a non-zero RELEASE angle has been specified and the tool will restart (after specified time angle delay) and then stop again after completing the RELEASE angle to allow the tool to be released from the nut. Note, if torque has been applied without a release angle and the tool may lock onto the nut, loosen the nut, set a release angle and tighten again.
5. Monitor Status—The status light is green in the loosen mode. Once the trigger is pulled the status light turns amber and stays amber through the operation and green again when complete. A status light turning red indicates an error.
6. Release Trigger—Release the trigger after the tool has completed all specified operations (Turn Angle & Release), the tool stalls for the last time and the BEEPER sounds (if activated); then remove the tool socket/drive from the nut.

Selecting the Torque Check option directs the user to a screen that allows the tool to apply torque to a nut to detect if the previously tightened nut still meets the original torque specification. The Torque Check value is adjusted by pressing the left and right button to increase or decrease the torque value to a value slightly below (5% to 10% below) the original torque specification. The user pulls the trigger and monitors the nuts to detect if there is any movement in the nut. If any movement occurs this will usually indicate that some of the nuts do not meet the original specification and that all bolts need to be retightened. This operation generally requires a release angle.

Setup for and tightening with Torque Check is similar to the steps described with Turn Angle above, except that the tool will rotate the nut until the tool motor stops at the specified TORQUE value.

Selecting the Rotations option (for tools with reverse switch) directs the user to a Home Screen where they can scroll up/down to enter the number of rotations to turn the tool under some resistance. Number of rotations will be displayed as a 3-digit decimal value with one decimal place; range: 00.0 to 99.9. For example, a user could specify to turn a valve 10.5 rotations.

The Home Screen also shows the direction of rotation and the corresponding abbreviation CW or CCW. The user can also select a Release Angle through the primary menu. Upon selecting the number of rotations the user can pull the trigger and the tool will turn through the specified number of rotations. The torque may be limited for Rotations with the upper Torque Limit set under the Settings menu.

Setup for and turning through Rotations is similar to the steps described with Turn Angle and Torque Check above, except that the tool will rotate the nut/bolt until the tool stops at the specified number of Rotations.

The Torque in Angle function is used to provide verified Torque within a specified Angle range. The user starts by entering a target torque and a minimum and maximum angle. The user also enters a trigger point from which the angle measurement will be started. When the tool reaches the torque it reports the angle at which the target torque is reached. If the angle falls within the specified range the tool reports a successful operation. If the tool reports an angle outside the specified range this is an unsuccessful operation.

The Angle in Torque function is used to provide verified Angle within a specified Torque range. The user starts by entering a target angle and a minimum and maximum torque.

The simple 1 to N Sequence is essentially a Bolt Counter that guides the operator through a series of repeat operations counting bolts and providing confirmation as the sequence is completed. This is a general Bolt Counter that may be invoked for a variety of operations including (but not limited to) Torque & Angle, Snug, Turn Angle, Torque Check, Rotations, Torque in Angle and Angle in Torque.

The PCC1 Sequence for a single tool includes a Pass and Bolt Counter that guides the operator through the PCC1 flange sequence and confirms progress after each bolt and pass as the operator steps through the sequence. This sequence only applies to Torque operation (with optional Angle and Release Angle).

The Wheel Sequence invokes a standard vehicle wheel bolting sequence and tracks the progress as the user steps through the sequence.

The Torque to Yield function applies a torque to just beyond the yield point of the fastener. The tool employs an algorithm to monitor the ratio of Torque to Angle. When the tool detects a reduction in the ratio (i.e. strain is increasing faster than stress) the bolt has begun yielding. The tool stops turning slightly after the bolt has begun to yield.

Job data sub-menu 240 provides the user with job options including start and end job data recording 241 and 242; create and import job IDs 243 and 244; select, create and/or load job profiles 245, 246 and/or 24; export, print and and/or delete job data 248, 249 and/or 250, which are described below in general terms.

A job is a bolting operation or a sequence of operations carried out on an application. In the context of the tool, a job is a data structure used to identify the bolting application and corresponding the tool parameter values, and to collect bolting data during bolting operations. For data recording purposes, a Job consists of a unique Job ID, plus a Profile, plus the event data associated with each trigger pull.

A Job Identifier (JID) is a label that may be assigned to identify a specific bolting application unit such as a flange, joint, engine, wheel, etc. The JID is an alphanumeric string of up to 10 characters; allowable characters including: A-Z, -, 0-9, and space. A JID can be entered directly via the tool's 3-button user interface or typed on a PC and uploaded to the tool using the Import Job ID(s) option. JID length may be expanded if necessary, for instance to 20 characters but this is really not practical for manual entry or for displaying on the screen. The number of JIDs that can be maintained in the tool is expandable.

The JID may be used to number a sequence of flanges; for example FLANGE-1, FLANGE-2, ... FLANGE-NN. Alternatively the JID may include more information about the customer/application, for example for Pipeline 1; PL1-FL01, PL1-FLO2, ... PL1-FLNN. Optionally the JID may be a set of preassigned serial numbers used in a manufacturing production line. Users preparing to bolt larger applications will develop a labeling strategy that suits their needs.

A Profile is a set of data including identifier (Profile ID), a defining type (Profile Type) and a set of tool parameters saved on the tool for a particular type of bolting application. A Profile can be loaded onto the tool using the Import Profile(s) option or can be entered directly via the tool's 3-button user interface. The number of Profiles that can be maintained on the tool is expandable.

A Profile Identifier (PID) is a label assigned by the user to identify a specific Profile. The PID is an alphanumeric string of up to 10 characters; allowable characters include: A-Z, 0-9, and space. A Profile ID can be entered directly via the tool's 3-button user interface or typed on a PC (or any other similar input device) along with a Profile and uploaded to the tool using the Import Profile option.

A Profile Type (PTYPE) is the field in a Profile that defines the type of bolting operation specified by the Profile, and the specific tool parameters required for that bolting operation. The parameters include tool values such as torque, angle, release and fastener for Basic Bolting and parameters such as rotations, angle range, number of passes, wheel type, etc. for Advanced Bolting. A unique PTYPE is defined for each different bolting operation. The name of each PTYPE is a fixed 3 character alphanumeric string predefined and hard coded in the tool and cannot be edited by users. Any new function created in the tool will include a new PTYPE to define the tool parameters required for that function.

Some currently used PTYPEs and specific parameters required for each such bolting operation include: Torque (TAR)—torque, angle, release, fastener; Snug (SRF)—snug, release, fastener; Turn Angle (RAR)—torque, angle, release, fastener, speed; Torque Check (TCK)—torque, release, fastener; Rotations (ROT)—release, torque limit, fastener, number of rotations in ##.#format; Torque in Angle (TIA)—torque target, torque trigger, angle min, angle max, release, fastener; Angle in Torque (AIT)-torque initial, torque min, torque max, angle, release, fastener; PCC1 Flange Sequence (PCC1)—torque 1 30%-40%, torque 2 60%-70%, torque 3 100%, release, fastener, number of bolts, number of passes; and Wheel Sequence (WHL)—torque, release fastener, lugs.

If no pre-defined Profile is currently selected, the set of parameters loaded on the tool at the current time shall be labeled the Current Working Profile (CWP). The CWP may be default values set in the factory or the values used most recently in the field before the tool was last powered off. In the latter case, the parameter values may be those of the most recently active Profile. For data recording purposed, if no pre-defined profile is active, the string "CWP" shall be written into the PID and PTYPE fields of data records for any trigger events.

The Job Data Structure is an internal representation of the data recorded for each event (trigger pull, etc) for all bolting operations. The data structure has 2 major components, Configuration data and Event data. Configuration data includes all tool parameter settings and any job related data—Job ID (JID), Profile ID (PID), Profile Type (PTYPE) and any tool parameters defined as part of a pre-defined profile.

Event Data includes Event Type, Access Level, User ID, and several parameters measured at the time of the event including date, start time, end time, temperature, voltage, and result of the event. This structure may include tool data such as model #, serial #, and firmware release #s, and several other event types.

Event Data is the tool output data collected at the time of an event (e.g., trigger pull) including date, event start time, event end time, event type, directional switch position (T or L), rundown switch position (Torque or Rundown), bolt number (X of N for Sequence-type events), result (or completion code), access level, and User ID. Other event types and data elements may be used.

Job configuration data includes all tool parameter settings and any pre-defined job and profile data—Job ID (JID), Profile ID (PID), Profile Type (PTYPE) and tool parameters defined as part of a pre-defined profile. For data recording purposes, there are four different types of job configurations characterized by having either predefined values or default values for Job ID and Profile. Job Configurations include ADHOC, PID, JID and Preset Job.

An ADHOC Configuration is one for which no predefined IDs or values are used but rather where the tool records data using the Current Working Profile. The label "ADHOC is written into the JID field of each data record. An Ad-hoc job can be exported, printed and deleted just as any other job by selecting the ADHOC label. For data recording purposes, the Profile Type will be determined by which Bolting function has been selected, with TAR as default.

A Preset JID Configuration allows the user to record data using the Current Working Profile and a uniquely specified JID. The label "CWP" is written in the PID field for each data record and the current tool parameters are used for whatever bolting function is selected. For data recording purposes, the Profile Type will be determined by which Bolting function has been selected, with TAR as default.

A Preset PID Configuration allows the user to record data using a pre-defined Profile to load the tool parameters but without selecting or creating a unique JID. In this case, the label ADHOC is recorded in the JID field for all bolting operations. A Preset Job Configuration is one for which both Job ID and Profile have been preset and selected via the Jobs menu. Note that parameter values can be modified at any time during the job by users at L4, L3 and L2 (if so configured) access levels.

The Job Data File is a customer's time-stamped record of tool activity associated with a specific Job ID. The file contains one row/record corresponding to each event. Each record is comprised of a subset of the data elements that exist in the overall UIC Data Structure. Each row in the file includes a Job ID, all Profile parameters (pre-defined or CWP) and the Event Data associated with each event. The default order of fields in each record includes date, time, JID, PID, profile type, torque, angle, release, fastener, units, event code, event duration, direction, result, access level and user ID. A Job Data file may be exported or printed in CSV or PDF format as the permanent job record for the bolting job. Users have the option to format the Job Data File with data elements that are common across all records in a header section, typically for printed reports only. This header may include other elements from the overall UIC Data Structure; for example, tool model and S/N, firmware rev #s, etc.

The Jobs Menu includes options for Jobs, Profiles and Data, which are described below in general terms. Such options include start and end job data recording 241 and 242; create and import job IDs 243 and 244; select, create and/or load job profiles 245, 246 and/or 24; and export, print and and/or delete job data 248, 249 and/or 250.

Selecting start job 241 allows the user to select a JID and begin recording data under that JID. The Job will use whatever Profile has been previously selected. To use a different Profile, the user can return to the Jobs menu and select a different predefined profile or the CWP. When the user returns to the home screen the JID is displayed on the home screen. The tool may be used to complete the Job according to the preset values and collect event data against that JID until the End selection is made or another job is selected.

Selecting end job 242 ends the Job currently active. Once the user ends a Job they are returned to the Job Data sub-menu where they may start another job if desired. If they return to the Home Screen the JID will no longer be displayed. If a Profile was previously selected, it will stay active and remain displayed on the home page until the user chooses another Profile (or the CWP).

Selecting create job ID 243 leads the user through creation of a JOB ID and optionally a Profile. First the user creates a JID, a 1 to 10 character alpha numeric string, with allowable characters of A-Z and 0-9. In an optional second step, the user chooses a Profile from list of available Profiles or Create a new Profile associated with this JID.

Selecting import job ID(s) 244 provides the ability to load a file consisting of one or more Job IDs from a PC via Bluetooth connection or USB cable. Each row in the file would include a unique Job ID. Tool will look for USB connection first and if connected, use USB. If not, look for BT connectivity, and if on and connected, use BT. If neither is connected, then prompt user to connect using USB or BT. Import and export functions may be initiated from the tool, a PC or other device.

Select profile 245 allows the user to select a profile from a list and load the parameters on the tool. Create profile 246 leads the user through creation of a Profile. First, the user creates a Profile ID, a 1 to 10 character alpha numeric string with allowable characters of A-Z, space and 0-9. Then the user selects a Profile Type from list of available Types and enters parameter values for the Profile Type. Note that parameter values can be modified later (during bolting operation) by users at L4, L3 and L2 (if so configured) access levels.

Import profile 247 provides the ability to load one or more Profiles from a PC (or other device) via Bluetooth (or other wireless) connection or USB cable. The file sould be a comma-separated text file including Profile ID, Profile Type, and all profile parameter values. For example, for a TAR Profile Type, the file would contain Profile ID, TAR, Torque, Angle, Release, and Fastener, i.e. TORQ123ABC, TAR, 700, 10, 7, HW.Å.

Multiple Profiles could be imported in one Import operation. Each row in the Profile file would contain a separate Profile consisting of a Profile ID, Profile Type and a set of parameter values for the particular Profile Type. Profile parameter values would take precedence over default tool Settings. For example, if a Profile created on the tool or imported from a PC specifies an angle of 5 degrees, that value overrides the default angle value of 0 degrees.

For some jobs, operators need to change tool parameter values in the course of a job (for example, when completing a PCC1 Flange sequence). From the Home/Operation screen, a user can attempt to directly change Torque using the arrow keys. If there is not an active job, user can scroll to higher or lower torque values. If there is an active job (Job ID displayed in lower left of screen), a screen appears with two options: (1) change Torque for [active Job ID] or (2) create a new Job. If user selects (1), a menu of parameters for the active job will be displayed (e.g., T, A, R, F for a TAR Job Type). User can select and edit any of these parameter values and return to the job operations screen to continue bolting. This function would not be available to L1 users and only available to L2 users if specifically configured.

Export data 248 allows the user to select a Job ID, generate a CSV or PDF file containing all the records relating to that Job ID, and export the file via Bluetooth connection or USB cable to a PC. Once the file is transferred, the user is returned to the Jobs Menu with the Export Data option highlighted. This option allows the user to export data from multiple jobs (selected from list) or to export all data for all Job IDs with one command sequence. The user can create separate files, groups of files, or one file with informative filename(s). When exporting a single job file, the exported file should be given the same name as the Job ID. If multiple Job IDs are exported in one file, the export file name could include the Job ID from the first job and a suffix "+". If all data from all jobs is exported as a single file, filename could be "All Jobs [date, time]".

Selecting print data 249 allows the user to select a Job ID and print via USB or Bluetooth. This includes an option to print multiple jobs (selected from list) or to print all data for all Job IDs with one command sequence.

Selecting delete data 250 allows the user to delete one, some or all jobs from the tool. This option will actually just delete the string in the JobID field of each such data record. Such deleted data records could be retained for HYTORC diagnostic purposes, but may no longer be accessible to the customer. And the JobIDs will be deleted from all Job ID lists.

Settings sub-menu 255 allows the user to change a wide variety of options, which are described below in general terms. Such settings include units 256; clock 257; Bluetooth® (wireless) 258; add printer 259; torque limits 260; angle limits 261; angle delay 262; beeper (sounds) 263; invert screen 264; icons 265; progress bar 266; auto-off 267; language 268; worklight 269; and APP Mode 295.

When any Settings Menu option is selected, the resulting screen would highlight the current value/setting of the selected option. In the current version, all Settings Menu items are available to users at access level L3 (Full User) and above.

Selecting Units 256 option takes the user to a sub-menu on which they can select units of torque as: ft-lbs, N-m, kgf-m and %. The currently selected units shall be highlighted. Selecting any other units will highlight that option and, when the user presses the center button to select the units, the all torque values will be displayed in the selected units.

Selecting Clock 257 option leads to a series of screens on which the user can set time and date. Selecting Bluetooth 258 option takes the user to a sub-menu on which they can choose to set the tool's Bluetooth capability to On or Off. The current state of Bluetooth is highlighted. User can scroll up or down to highlight On or Off and press center button to select. Enabling Bluetooth, Option 2 would also allow user to pair the tool with a PC, printer or other BT-enabled device. Add printer 259 option provides a procedure for connecting to a printer via a Bluetooth connection.

Selecting Torque Limits 260 option leads to a sub-menu with options to set torque limits for Torque operations or for Angle operations. The user can set separate lower and upper torque limits for Torque and Angle operations. In both cases, the default values are the upper and lower calibrated torque limits for the tool. If a min or max value has been previously set, the previous value will be displayed when the Torque Min or Max screen is displayed.

Selecting Angle Limits 261 option allows the user to set lower and upper angle, the default set as 0 to 360 deg. If a min or max angle value has been previously set, the previous value will be displayed when the Angle Min or Max screen is displayed. Selecting Angle Delay 262 option allows users to adjust the angle delay from a range of 0 to 3000 ms. To ensure accuracy of Torque Limits settings, Angle Delay should be set to zero.

Selecting Beeper 263 option allows users to turn the beeper on or off. Selecting Invert Screen 264 option leads to a menu from which the user can select Normal or Inverted screen orientation. In order to maintain the correct mapping of arrows to buttons, the direction of the arrows are reversed when the screen is inverted.

Selecting Icons 265 option allows the user to Toggle menu icons on/off. FIG. 8 includes a list of HYTORC-created tool icons, the contents of which are copyright © to HYTORC 2018. These icons may be provided for many home screen indications, menu titles and menu options. These icons may serve to help non-English users operate tool A. Each icon design suggests the associated function or bolting operation.

Selecting Progress Indicator 266 option allows the user to turn on or off the progress bar. Selecting Auto-off 267 option allows the user to enable or disable the auto-off feature. The default setting is Enable, which will tell to the tool to turn itself off after 5 min of inactivity (no trigger pulls or button presses). Selecting Language 268 option will display a sub-menu of languages into which the UI has been translated. The currently selected language would be highlighted. Selecting any other language will highlight that option and, when the user presses the center button to select the language, the UUI will be presented in the selected language. Selecting Worklight 269 option provides three possible settings for the worklight: on during trigger pull, always on when the tool is powered or always off. The Worklight Options menu opens with the previously selected option highlighted. User scrolls and highlights the desired option and presses the center button to select. After selecting the option, the user is directed back to the Settings menu. Selecting APP Mode 295 option allows the user to turn on and off APP Mode.

Admin sub-menu 270 provides options to manage a wide variety of administrative functions, which are described below in general terms. Such functions include tool access levels 271; menu options available to a Level 2 (Flex) user 272; options available on the shortcut menu 273; passwords 274; tool information 275; regulatory information 276; and user ids 277. It also provides users at all access levels with access to pertinent system information such as firmware versions and updates.

The tool may be set to operate in any one of multiple levels, currently set at five levels and including Service, Admin, Full User, Flex User and Jobs User. The L5 access level is primarily for HYTORC service personnel. It provides access to the Service sub-menu containing several HYTORC-only tool setup and maintenance tools. The L5 password should never be given to a customer. One Service-level function, Tool Calibration, is available to customers at the L4 (Admin) access level.

The Admin is the highest customer-accessible access level may be referred to as level 4. An Admin-level user is typically the tool owner, supervisor, production manager or storeroom administrator having responsibility for managing the tool assets for the job. The Admin has access to all menu options on all sub-menus, except for Service. The Admin Level is the only level with access to the menu option to configure Flex User options and to configure Shortcut Menu options. The Admin Level is also the only level with access to menu option to change passwords so setting and maintaining passwords is an exclusive function of the Admin.

The Full User (L3) has access to the same functions as an Admin (L4) except for a few Admin menu functions. The Full User is a primary operator of the tool, typically be a fully trained Bolting Specialist, Job Planner, Journeyman, Operator, Technician, Inspector and other fully trained personnel assigned to complete general purpose bolting operations. The Full User may also be the planner configuring jobs for a lower level user in the production environment. The Full User has open access to all Basic Bolting and Advanced Bolting functions. The Full User also has full access to all Jobs and all Settings options on the tool. The only options Full User does not have access to is configuring Flex Options and setting passwords which is done by the Admin level.

The Flex User level (L2) is unique in that the Bolting options are configurable and made available to the Flex User at the discretion of the Admin level user. Per job requirements the Admin may make only those bolting options required for that specific job minimizing the risk that the Flex User will use the wrong function. The Flex User level would be ideal for less trained operators or occasional technicians who do not have the same level of training as a fully trained Full User would. The Flex User level also my be desirable for less experienced operators such as apprentices who may use the tool and gradually be given access to more features as they gain experience. The Flex User options are configured by the Admin on the Admin level. The Flex User may execute preset Jobs or may create and export or print Jobs.

The Jobs User has the lowest administrative privilege and may be referred to as level 1. The Jobs User has access only to the Basic Bolting options and to menu options that allow them to conduct bolting with preset Jobs. The Jobs User may also export and print Jobs.

Users that enter the tool at a lower level can switch to a higher level by entering a password for the desired level. All passwords are set by the Admin level. A password is not required to switch from a higher level to a lower level. A password is never required to set the tool to level 1 Jobs User.

Per FIG. 8, the four (4) customer-accessible access levels have different options/functions available. All levels have access to basic tool switches for power on/off, directional control forward/reverse, run-down and jog. Admin Menu 270 provides options for various administrative functions. Some (selecting Access Level, viewing Tool Info and setting a personal User ID) are available at all access levels. Others (Calibration, configuring FLEX options, changing password configuring a Shortcut Menu) are accessible only at L4 and L5.

User ID 277 function allows a user at any access level to enter their own unique ID into the tool for purpose of traceability of the event record. After done using the tool, the user can access this function again to clear their User ID. User ID does not appear on the display, but is written into the User ID field of each data record.

Access Level 271 option provides the ability to change the current access level of the tool. Changing to a higher level (e.g., from L2 to L3) requires entry of the password for the new, higher level. No password is required to move to a lower level. The L4 Admin can change access level to Full User by selecting Full User from the Access Level menu. The Admin or Full user can change level to Flex User by selecting the Flex User option from Access Level 271 menu. The Admin, Full User or Flex User can change level to Jobs User by selecting Jobs User from Access Level 271 menu.

Change Password 274 option allows an L5 or L4 user to change the password for their level and each lower access level from the default password to a new password. An alpha numeric password is needed to move from one access level to a higher access level. A password could be 1 to 8 alphanumeric characters, with a possible character set of 1-9, space and A-Z. Default passwords set in the firmware may be ADMIN for L4, FULL for L3 and FLEX for L2. No password would be required for L1. In the internal dev/test environment, the L5 password is SERVICE. In production environment, this password will be known only to HYTORC personnel.

Flex Options 272 menu option allows the Admin to configure Bolting options that are active for the Flex User. All configurable Bolting options are available by default to the Flex User. The Admin can use the Flex Options menu to remove some or all of the Bolting functions so that they are not available to the Flex User. Shortcut Options 220 menu option allows the Admin to configure Bolting options that are active for the Shortcut Menu.

Tool Info 275 option provides the user with useful tool information, in particular the versions of hardware and software and the tool's Cycle Count, the total number of trigger pulls that have resulted in successful operations. A separate cycle count for trigger pulls since last HYTORC maintenance may also be displayed. Regulatory Info 276 function will display required regulatory information. This may include ID Numbers and Logos of the regulatory agencies, and any other required data.

Service sub-menu 280 provides options for service personnel to configure, setup, service, calibrate and/or troubleshoot the tool, which are described below in general terms. Service menu 280 contains functions necessary for the manufacturer, typically only available to authorized HYTORC personnel, including calibrate tool 281; auto-calibrate 282; setup tool 283; batter type 284; gearbox type 285; voltage cutoff 286; Bluetooth® (wireless) on/off 287; Bluetooth® (wireless) certification 288; format NVRAM 289; cycle counter 290; regulatory information 291; and/or export log 292.

Calibrate tool 281 option steps the HYTORC service technician or customer through the tool calibration process. The process includes options to specify the number of samples to take at each calibration point and to "loosen after run". This may be the only Service Menu function that is available to customers. The Service Menu with this single item will appear when the tool is at the L4 (Admin) access level.

Auto-Calibrate 282 option will support an automated version of the calibration procedure that is set up by a technician and then runs unattended, with an external device recording the calibration data.

Setup Tool 283 option steps the service technician through a sequence of screens to (1) identify the specific tool being configured, by specifying tool type/battery size 284 and gearbox size 285 and (2) to set battery cutoff voltage 286. The first step in Tool Setup 283 is specifying battery size and "handle" i.e. tool type, such as tool A). With the current set of tools, tool type also determines battery type. The second step in Tool Setup 283 is specifying gearbox size for the tool (250, 700, . . . 7000 ft.lbs.). The final Tool Setup 283 step provides a HYTORC service technician with a process to calibrate the tool so that it will trigger a low battery warning (red icon on home screen and "Charge the battery" message screen upon trigger pull) when battery voltage drops below 35V for a Lithium tool.

Bluetooth On/Off 287 function allows HYTORC to enable BT for tools to be used in countries where we are BT-certified and to disable the capability on tools going to countries where we are not BT-certified. If disabled here in the Service menu, the BT option will not appear in the Settings menu. If the service tech has turned BT on, Bluetooth Cert 288 function allows them to test the tool's Bluetooth communication capability. This capability also exists in the Bluetooth option on the Settings menu. Functionality required for certification testing of the tool's BT capability (radio testing; power levels, etc.) is located in the Operations Manual.

Export log 292 option provides HYTORC with the ability to export the tool's full event log as a csv file to a PC via USB or BT connection. Such export can be restricted by a date range, e.g., by entering a start date and end date. Format NVRAM 289 option provides HYTORC with the ability to format the tool's non-volatile RAM. This action will irretrievably delete all data stored in the tools memory, including job records, profiles, tool setup, calibration data and event log.

Tool A has the ability to count its cycles. A cycle is defined here as a successful trigger pull operation. Two counters may be maintained. The first, referred to as CC1 will count total cycles for a specific motor and gearbox. This counter will be re-set to zero only if/when the tool's motor and/or gearbox has been replaced. The second counter, referred to here as CC2, tracks cycles since the last HYTORC maintenance. The HYTORC service tech may reset the CC2 to zero after performing maintenance. The HYTORC service tech may set the number of CC2 cycles at which a message will be displayed to the customer informing them that they should have their tool serviced by HYTORC, such as a range of 1000 to 99,000 cycles.

Regulatory file 291 option provide the ability to load/update relevant regulatory/certification information onto the tool. This information can be displayed using Regulatory 276 function on Admin menu. This process may also happen automatically as part of tool Setup or when new firmware is loaded.

Note that any combination of features, options, methods, etc. described above with respect to FIGS. 6, 7 and 8 may be included in tools of the present application.

Some operational sequences of tool A are described below in general terms.

Torque and optional Angle and Release operations are combinable in one trigger event. The tool is configured per tool menu and installed on the bolting application. The user pulls the trigger to apply Torque. For RH or LH fasteners, the tool assumes the use of reaction arms and invokes the safety screen to keep the users hands away from the action area. The user must push any button to continue. For the HWR, HWL and HN fasteners this screen is not displayed. The status light turns amber and remains amber during the operation. The arrows animate to indicate the direction of rotation. The progress indicator displays the % torque complete in real time until the tool stops at the calibrated torque and then the progress indicator returns to zero. The user may continue holding the trigger when the torque is complete to automatically begin a sequence of optional angle, release operations and any time delay (angle delay) that has been set in the preferences menu. When the release operation is complete the status light turns green and the beeper sounds if enabled to provide feedback that it is ok to release the trigger. If a release has not been specified or pre-mature trigger release the user may need to set the tool to loosen and then try again with a release angle. Color may be used to highlight the different steps of Torque, Angle and Release.

In conjunction with the Torque application, if the user continues to hold the trigger the tool will execute the optional angle operation and the status light will remain amber. The arrows animate to indicate the direction of rotation. The progress indicator displays the % angle completion in real time. When the angle is complete the tool will automatically stop and the progress indicator will return to zero. The user may continue holding the trigger and the tool will automatically begin the release operation after any time delay (angle delay) that has been set in the preferences menu.

In conjunction with a Torque and optional Angle operation, or Snug, Turn-of-Nut or Rotation operation, the user continues to hold the trigger the tool will complete the optional release operation and any angle delay. The direction arrow reverses briefly to show the direction of release. The progress indicator is not displayed during the release operation because this is usually just a very brief action. When the release operation is complete the status light turns green and the beeper sounds if enabled to provide feedback that it is ok to release the trigger.

In the Loosen operation, the maximum breakout strength of the tool is displayed on the loosen screen by default. The Loosen torque may be adjusted by using the up and down arrows. The screen directional arrows switch direction to show the loosen direction for the selected fastener. The user places the tool on the fastener and pulls the trigger. The tool uses the torque in reverse to break the fastener loose. During the operation the status LED stays amber and the directional arrows rotate in the direction of loosen. The progress indicator may optionally displayed if it matches operating conditions. Upon completion the LED turns green and the beeper sounds once.

Snug and Release operations are combinable with a single trigger event. The user configures the tool menu and positions the tool on the application. The user pulls the trigger and applies a snug amount of torque until the tool stops at the specified value and applies a release angle. During the operation the status LED turns amber, the directional arrows rotate in the direction of rotation and the progress indicator displays the torque building to of completion. Upon completion the status LED turns green and the beeper sounds once. If a release has not been specified or pre-mature trigger release the user may need to set the tool to loosen and then try again.

Turn Angle and Release operations are combinable with a single trigger event. The user configures the tool, selects direction of rotation, and positions the tool on the application. The user pulls the trigger to turn the nut through a specified rotation. The tool will build torque to the initial point where the nut has already been tightened, and subsequently turn the nut through the specified angle and a release angle if specified. Throughout the operation the status LED will turn amber, the direction arrows rotate in the direction of rotation and the progress indicator displays the completed percent of the total target rotation as it builds to completion. Upon completion the status LED turns green and the beeper sounds once.

Torque-Check and Release operations are combinable with a single trigger event. The user configures the tool menu and sets the torque to a value just below the specified torque value for the bolt. The user places the tool on the application and pulls the trigger to apply Torque. The status light turns amber and remains amber during the operation. The arrows animate to indicate the direction of rotation. The progress indicator displays the % torque complete in real time until the tool stops at the calibrated torque and then the progress indicator returns to zero. The user observes if the nut turns during the application of the torque value being checked. The user continues holding the trigger when the torque is complete to automatically begin the release operation and any time delay (angle delay) that has been set in the preferences menu. When the release operation is complete, the status light turns green and the beeper sounds if enabled to provide feedback that it is ok to release the trigger. If a release has not been specified or pre-mature trigger release the user may need to set the tool to loosen and then try again with a release angle. If the nut rotates during this operation, then the bolt is below target torque and should be re-tightened or all bolts may need to be retightened.

Rotation and Release operations are combinable in a single trigger event. The user configures the menu and places the tool on the application. The number of target rotations is entered into the tool on the rotations screen. The user pulls the trigger to turn through a specified number of rotations. The tool will apply nominal torque to overcome resistance during the operations. The number of rotations completed will be displayed along with the total number of rotations required. Throughout the operation the status LED will turn amber, the direction arrows rotate in the direction of rotation and the progress indicator displays the magnitude of the torque as it builds to completion. Upon completion the status LED turns green and the beeper sounds once.

A Rundown function is available for the tool by manipulation of its speed control. The user switches the speed control switch to run down. The Home screen will reflect that the tool is in Run Down. The user configures the menu or directional control switch to Rundown Forward or Rundown Reverse. The user places the tool drive on the nut and pulls the trigger to run the nut down or off the bolt. Throughout the operation the status LED will turn amber, the direction arrows rotate in the direction of rotation for tighten and the progress bar displays the magnitude of the torque. Upon completion the status LED turns green and the beeper sounds once.

A Jog function is used on the dual speed tool in the event the speed switch does not engage fully. When the switch is in between Torque and Rundown, a JOG FORWARD or JOG REVERSE screen will be displayed. The user presses the trigger briefly to synchronize the gears and re-engage the drive mechanism to Run Down or Torque. Throughout the operation the status LED will turn amber, the direction arrows rotate in the direction of rotation. This is a very short duration jog so the progress indicator is not displayed.

Tools of the present application may also include operational sequences for other advanced bolting functions including tighten on torque, tighten on angle and torque to yield. More complete requirements on operational feedback, confirmation and error messaging are in development.

Trigger behavior for some operational sequences of tool A are described below in general terms. The requirements below briefly describe the function of the tool's physical trigger switch and the feedback provided by the UUIC (display, LED and beeper) in response to user interaction with the trigger.

The tool's trigger is used to apply torque as required by the selected bolting function. Assuming the tool is powered on and not in an error state (the LED is green), when the trigger is pulled, the motor will attempt to execute the selected operation. At the same time, the LED shall turn amber and remain amber until successful completion or an error condition is encountered.

If the bolting operation is successfully completed (e.g., required torque is achieved), the motor will stall. At the same time, the LED shall turn green, the beeper shall sound once, and a green check mark (and/or a context-specific "success" message) shall be displayed on the screen for 5 seconds, after which the display shall return to the Home or other Operations screen. During the 5 second display, a user shall be able to dismiss the success indicator by pressing any button.

If an error condition is encountered, the motor will stall. At the same time, the LED shall flash red three times and the beeper (if enabled) shall sound 3 times, after which the LED shall remain on red. A specific error message shall be displayed on the screen describing the error and instructing the user how to proceed. Optionally, a red X may displayed along with the error message.

When the trigger is released after a successful operation, the LED shall remain Green and the success indicator (green check and/or message) shall remain on the screen for 5 seconds. When the trigger is released after an error is encountered, the LED shall remain Red and the error message (and optional red X) shall remain on the screen until the user presses any button to dismiss it.

If the user releases the trigger before the tool has completed the chosen operation, the motor will stall. At the same time, the LED shall flash red three times and the beeper (if enabled) shall sound 3 times, after which the LED shall remain on red. A specific error message shall be displayed on the screen describing the error and instructing the user how to proceed. Optionally, a red X may displayed along with the error message. Such premature trigger release operation may vary when the Slow Angle function has been selected and/or when Loosening.

When the slow angle feature has been selected, users will often want to repeatedly "pulse" the trigger to bring a fastener into alignment with a specific location on a bolt, flange or other component. This will not be considered a Premature Trigger Release. When the Slow Angle function has been selected, if no error has been encountered upon trigger pull (e.g, a FTRTS error), then any subsequent trigger release shall be treated as a successful operation. No "Premature trigger release" error message shall be presented.

Any trigger release while the tool is in Loosen mode shall be considered a successful completion of a Loosen operation.

The features below briefly and generally describe the function of the tool's physical switches (directional and rundown) and the feedback provided by the UUIC (display, LED and beeper) in response to user interaction with the switches.

The Directional Switch is used to choose between the Tighten and Loosen direction of rotation. For all fastener types, when the switch is pushed in on the right (left) side of the tool, the drive will turn in the Tighten (Loosen) direction. The tool's logic takes both switch position and fastener type into account in determining whether to turn the drive in a CW or CCW direction. For example, with RH fasteners, when the switch is pushed in on the right side, the drive will turn CW to tighten the nut. For LH fasteners and the HYTORC Nut, when the switch is pushed in on the right side, the drive will turn CCW to loosen the nut.

The direction of rotation shall always be displayed on the screen during an operation, either by displaying "Tighten" or "Loosen", or by a directional arrow (animated if possible), or both. Actual direction (CW or CCW) in which the drive will turn will also take into account the Fastener Type. For example, with a right-hand fastener, when the directional switch is in the Tighten position, the drive will turn CW. With a LH or HN fastener, and directional switch set to Tighten, the fastener will move CCW.

In tool A, with a dual speed motor, the Rundown switch is used to select either Torque or Rundown mode. When in the Torque position, the motor shall deliver whatever torque is required by the selected bolting operation and the UUIC shall deliver visual/screen and audio feedback as specified above for each specific bolting operation.

When the switch is moved to the Rundown position and the Directional switch is in the Tighten position, the motor control is adjusted accordingly and the screen shall indicate that the tool is in "Rundown" mode. The tool can be switched to "Rundown—Reverse" by changing the position of the Directional Switch to Loosen.

Upon trigger pull and throughout the Rundown operation the status LED shall turn amber, the screen shall display "Rundown" (or "Rundown—Reverse"), and the progress bar shall display the magnitude of torque being applied. Upon trigger release, the LED shall turn green.

FIGS. 9A and 9B show a summary of available hardware, software and firmware features, options and environments for Tool A and/or other embodiments of the present application. In many industrial applications the work activity surrounding bolting is highly manual and labor intensive especially where elaborate multi-bolt sequences and patterns must be followed to achieve acceptable results. The challenges in achieving desired performance and quality span various stages of engineering specifications, application guidelines, job setup, performance monitoring, verification as well as quality records and continuous improvement. Asset owners and constructors in major projects such as petrochemical processing, power plants, mining, construction, transportation and other environments are constantly looking for new and improved tools and methods and tools to achieve desired quality and performance.

An advanced bolting method, associated tools and software applications are introduced to speed the workflow at various stages of the overall bolting process while making major gains in overall control and quality management. The method starts by introducing intelligent processing in the tools themselves, which historically have been heavy, manual, cumbersome and difficult to use. The embedded processing capabilities in the tools allow instructions to be sent remotely from software applications that specialize in engineering setup and design for the bolting application. The configuration software encodes rules and guidelines that enforce best practices and instructions. This includes step-by-step instructions for determining which bolt to tighten in a proper sequence and how far the bolt is to be tightened at each step. The configuration can be remotely configured via any suitable means including Satellite, LAN, WI-FI, cloud network, WI-FI Direct, WiMAX, Bluetooth, ZigBee, Microwave, Infrared, and/or Radio, to the exact location and tool that will be used for bolting.

An operator using the tools and methods disclosed in the present application is guided through the on-bolt operations with instructions provided right on the tool. The instructions may be as simple as which bolt to tighten and how much to tighten. While workers still need to be cognizant of the objectives much of the tedious instructions and thought process is left to the tool and the software. In some cases it is as simple as asking the operator to line up the tool and pull the trigger.

Bolting operations, tools and application software of the present application monitor the bolting performance and progress. The operator is provided with continuous feedback so that they can actively gauge their work and performance. The data is acquired in real-time as the operator completes each operation and can be monitored remotely. In production environments the work scheduling information system provide a steady stream of work instructions to improve productivity. Whereas quality control in the past was conducted by physical inspector the new method deliver data online and remotely to allow a centralized quality control function to monitor and provide feedback to continuously improve all aspects of the process.

High performance tools are still required to handle the workload and these tools are still subject to wear and tear just as other tools. However, advanced tools of the present application have built in diagnostics to monitor themselves and report out their status and health. These tools can monitor the usage and advise the operator and supervisor when it's time to conduct maintenance and calibration. The feedback is very important contribution to the area of pro-active maintenance which has proven major benefits in achieving improved quality and productivity.

As applications become more and more complex there is a need for advanced bolting capabilities. This often means that control software embedded in the tools must be updated to deliver enhanced control over the tightening process. With the advanced tool design, software can be delivered remotely via any suitable means including Satellite, LAN, WI-FI, cloud network, WI-FI Direct, WiMAX, Bluetooth, ZigBee, Microwave, Infrared, and/or Radio, to the exact location and tool that will be used for bolting. The software updates can be scheduled and planned for delivering the capabilities needed when and where they are required.

While tools of the present application are more intelligent, the instructions sequences can become tedious if they need to be entered by buttons on the tool. Advanced bolting software is designed to operate on any device platform including portable PCs, tablets and smart phones. The software allows the configuration to be entered through keyboards, touch-screens and other convenience means rather then entering a long encoded sequence on a small set of buttons. The smart device and App can then act as a companion to the tool allowing the operator and local supervisor to route standardized instructions to the tool or to provide customized application instructions if needed via the App which communicates to the tool.

The App operating in proximity of the tool provides immediate feedback, performance monitoring and an on-site quality control tool. The App guides the user through the bolting setup and sequences using state-of-the-art graphical displays vastly simplifying the understanding of the bolting physics. The instructions eliminate the need for instruction books and written procedures. Through mechanization of the procedures the quality of the overall method is improved.

The data collected verifies bolted joint integrity by confirming the bolting process conforms to requirements and specifications. In many permanent bolting applications the results are needed for certification of the applications. For instance, in permanent steel structures such as buildings and bridges where public safety is the primary consideration, the quality inspection and verification of the bolting results serves as the certifying document. The data can be compiled, analyzed and reported to provide a complete report suitable for certifying bodies such as inspector and government officials. In other applications where periodic service and maintenance are a primary consideration the data collected by the advanced method serves to not only certify the immediate bolted joint but serves as a record that can aid in maintenance. Many bolted joints are assembled and re-assembled on regular intervals such as 1-year, 2-year, 5-year etc. and the data collected can be vaulted on the current job and then retrieved at the next maintenance period to provide insight on any special considerations. The historical data highlights what has not worked in the past and what may work well in the future.

Applicant has built intelligence into tools of the present application to, inter alia, gain insight into the reliability and life service of their tools through advanced software capabilities. The software can be installed at an early stage, while the tools are still in production to guide the process of assembly, calibration and production readiness. The intelligence in these tools can provide diagnostics that detect early life issues allowing those issues to be addressed before they impact job quality. Service personnel have access to the tool diagnostic records so that they can remotely diagnose and troubleshoot the issues with the tool. Service records are maintained online and are available through the various communication methods.

In one example, the Cumulus-HYTORC partnership includes fully Bluetooth®-enabled bolting solutions which allows users to program bolting patterns on a tablet and transmit that information directly to a HYTORC pump. The pump then activates the rest of the connected HYTORC bolting solution to automatically tighten bolts uniformly, achieving a verifiable, even circumferential, and targeted bolt load.

In another example, the HYTORC Connect App enables wireless data exchange between Tool A and/or other embodiments of the present application and a Windows® PC and/or other computing device. The App provides a convenient user interface to configure bolting parameters and send them to the Tool. The App also serves as a repository for bolting results, receiving data from the tool in real-time or batch operation. All initial settings and tool administration can be achieved via the App. Features may include: Bluetooth® Wireless connection between the HYTORC Connect App and the Tool for remote tool use, settings and operation; App provides a user-friendly graphical interface to configure operations; All bolting parameters can be entered on the PC or other device on a keyboard, touchscreen, visual cue and/or sound queue; Single button push to send and load parameters on the Tool; Communicate, display and save bolting results on the App for full job data documentation; Bolting results can be transferred from the tool after job completion for remote tool use; Create, store and manage multiple basic and advanced bolting profiles; Create, transfer and track multiple Job IDs to quickly collect full bolting results and job data; and/or Easily access and configure tool settings and administration functions for complete remote control.

Inventions disclosed in the commonly owned and co-pending patent application, U.S. application Ser. No. 16/081,917, having Filing Date of 2 Sep. 2018, entitled "APPARATUS FOR TIGHTENING THREADED FASTENERS", an entire copy of which is incorporated herein by reference, are further advanced under this patent application.

U.S. Ser. No. 16/081,917 discloses, inter alia, HYTORC's Wireless SIMULTORC™ bolting regime, which includes an operation parameter regulation unit for use with a bolting system having a plurality of networked electrically powered torque tools and/or drive portions of torque tools for simultaneous tightening of industrial threaded fasteners, the operation parameter regulation unit including: a processing unit; an output unit connected and/or integrated with the processing unit; an input unit connected and/or integrated with the processing unit; an activation unit connected and/or integrated with the processing unit for activating operation units of the plurality of networked electrically powered torque tools and/or drive portions of torque tools; and a control unit for controlling operation parameters of each of the plurality of networked electrically powered torque tools and/or drive portions of torque tools to maintain a difference between the operation parameters within a predetermined value. An industrial bolting system for simultaneous tightening of industrial threaded fasteners including such an operation parameter regulation unit is further disclosed in U.S. Ser. No. 16/081,917. Tool A, and variations thereof, work seamlessly with HYTORC's Wireless SIMULTORC™ bolting regime. For example, torque transducer 34 is one sensor unit for direct and/or indirect measurement of the operation parameters of the plurality of networked electrically powered torque tools and/or drive portions of torque tools. These concepts are further discussed with respect to FIGS. 11-15.

Inventions disclosed in the commonly owned and co-pending patent application, PCT Application Serial No. PCT/US17/45937, having Filing Date of 8 Aug. 2017, entitled "APPARATUS FOR TIGHTENING THREADED FASTENERS", an entire copy of which is incorporated herein by reference, are further advanced under this patent application.

PCT/US17/45937 discloses, inter alia, a torque power tool for tightening and/or loosening of an industrial threaded fastener including: a motor to generate a turning force; a drive to transfer the turning force; a turning force multiplication mechanism assembly; and a yoke-style shifter assembly to shift the tool into any torque mode from lower and/or higher resistance and/or speed. Such a torque power tool may be electronically driven and powered by a battery pack. In a HSLT mode, a shifter ring gear of the yoke-style shifter assembly engages an external carrier locking gear of the same pitch and number of teeth that is part of a planetary stage carrier of a first turning force multiplication transmitter of the turning force multiplication mechanism assembly; and in a LSHT mode, the shifter ring gear engages an external mating stationary gear of the same pitch and number of teeth that is grounded to a drive tool housing via a stationary ring gear adaptor. Tool A, and variations thereof, include such a yoke-style shifter assembly and other related components.

Inventions disclosed in the following commonly owned and co-pending patent applications, entire copies of which are incorporated herein by reference, including U.S. application Ser. No. 15/106,221, having Filing Date of 17 Jun. 2016, entitled "APPARATUS FOR TIGHTENING THREADED FASTENERS"; U.S. application Ser. No. 15/106,247, having Filing Date of 17 Jun. 2016, entitled "APPARATUS FOR TIGHTENING THREADED FASTENERS"; U.S. application Ser. No. 15/570,670, having Filing Date of 30 Oct. 2017, entitled "APPARATUS FOR TIGHTENING THREADED FASTENERS"; U.S. application Ser. No. 15/570,684, having Filing Date of 30 Oct. 2017, entitled "APPARATUS FOR TIGHTENING THREADED FASTENERS"; and U.S. application Ser. No. 15/570,743, having Filing Date of 30 Oct. 2017, entitled "APPARATUS FOR TIGHTENING THREADED FASTENERS"; are further advanced under this patent application.

U.S. Ser. No. 15/106,221, U.S. Ser. No. 15/106,247, U.S. Ser. No. 15/570,670, U.S. Ser. No. 15/570,684 and U.S. Ser. No. 15/570,743 disclose, inter alia, Applicant's HYTORC® Z® System which involves: tools having multi-speed/multi-torque modes with torque multiplication and vibration mechanisms without use of external reaction abutments; a force transfer means to yield in-line co-axial action and reaction for use with such tools; driving means and shifting means capable of attaching to washers under the nut for use with such tools and force transfer means; associated washers and fasteners for use with such tools, force transfer means and driving means; and related accessories for use with such tools, force transfer means, driving means, washers and fasteners.

The HYTORC® Z® System includes the following: Z® Washers located under nuts or bolt heads of various types having engageable perimeters of multiple shapes, sizes, geometries and serrations, such as washer/fastener radius engagement differentials, and frictionally biased faces with relatively higher friction against the flange surface and relatively lower friction against the nut, such as friction coefficient increasing treatment means of various types, sizes and locations; HYTORC Z® Guns incorporating a powerful impact mechanism and a precise torque multiplier in the same tool combining rapid run-down with calibrated torque; HYTORC® Z® Sockets with dual drive coaxial action and reaction having outer sleeves to react on Z® Washers and an inner sleeves to turn nuts or bolt heads; HYTORC® Z® Spline Adapters and Reaction Plates for backwards compatibility with HYTORC®'s torque/tension systems including the AVANTI® and ICE® square drive systems, the STEALTH® limited clearance system, the pneumatic jGUN® series, the FLASH® Gun and LITHIUM Series electric multipliers and more; the combination of HYTORC® Z® Washer and the HYTORC® Z® Dual Friction Washer™ including a dual friction-enhanced face washer and/or the HYTORC® Z® Nut/Bolt for counter-torque under a nut or bolt head on the other side of the joint; HYTORC® Z® Dual Drive Offset Links for tight clearances while using HYTORC®'s torque/tension systems; HYTORC® Z® Vibration Mechanisms applied thereof; Z®-Squirter® Washers; HYTORC® Z® Washer and Nut Assemblies; and any combinations thereof. Further disclosures include: Tapered Fastener Assemblies; Tapered Torsional Couplings; Two-Part Tapered Nut Assemblies; and Two-Part Tapered Thread Nut Assemblies. Tool A, and variations thereof, may be used with Applicant's HYTORC® Z® System.

Tool A and/or other embodiments of the present application, may include similar features, components, systems, etc. of tools disclosed in, for example, U.S. Pat. No. 9,281,770, having Issue Date of 8 Mar. 2016, entitled "PRECISION-FASTENING HANDHELD CORDLESS POWER TOOLS", an entire copy of which is incorporated herein by reference. Please refer to U.S. Pat. No. 9,281,770 and others like it for disclosures and discussions of the state of the art pertinent to the present application.

Figure 10A:
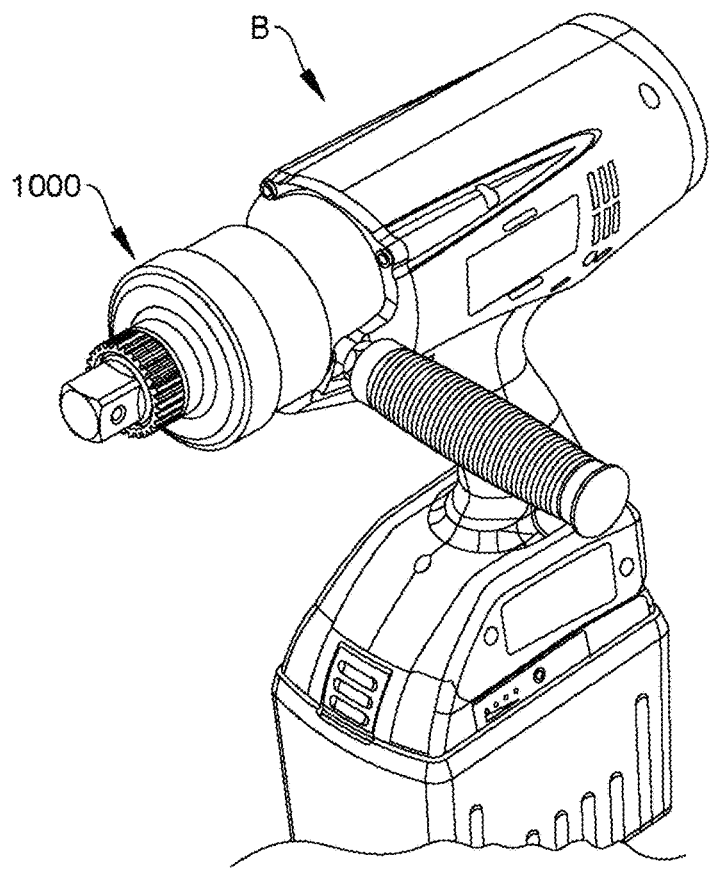
FIG. 10A is a full perspective view of Applicant's HYTORC® LITHIUM SERIES® II Torque Gun Tool B ("Tool B) having a wireless torque transducer assembly and/or other embodiments of the present application.

Another exemplary embodiment of the invention is explained in more detail below with reference to FIGS. 10A and 10B. Previous general discussion and specific discussion related to FIGS. 1-9 applies to the embodiment shown in FIGS. 10A and 10B. Referring to FIG. 10A, it shows a perspective representation as a sketch of a portable torque power tool B according to an embodiment of the present application wherein the torque transducer is formed at or near an output of a housing 64B of a turning force multiplication assembly 81B for improved measurement of torque output for dynamic and responsive control of tool B. Additionally, the torque transducer may be formed as a wireless torque transducer assembly 1000. Torque transducer assembly 1000, like a load cell, includes a metal spring element, or flexure. Strain gauges are applied to the flexure in a Wheatstone bridge configuration. Torque applied to the sensor causes bending or shear strain in the gauged area, generating an output voltage signal proportional to torque.

Figure 10B:
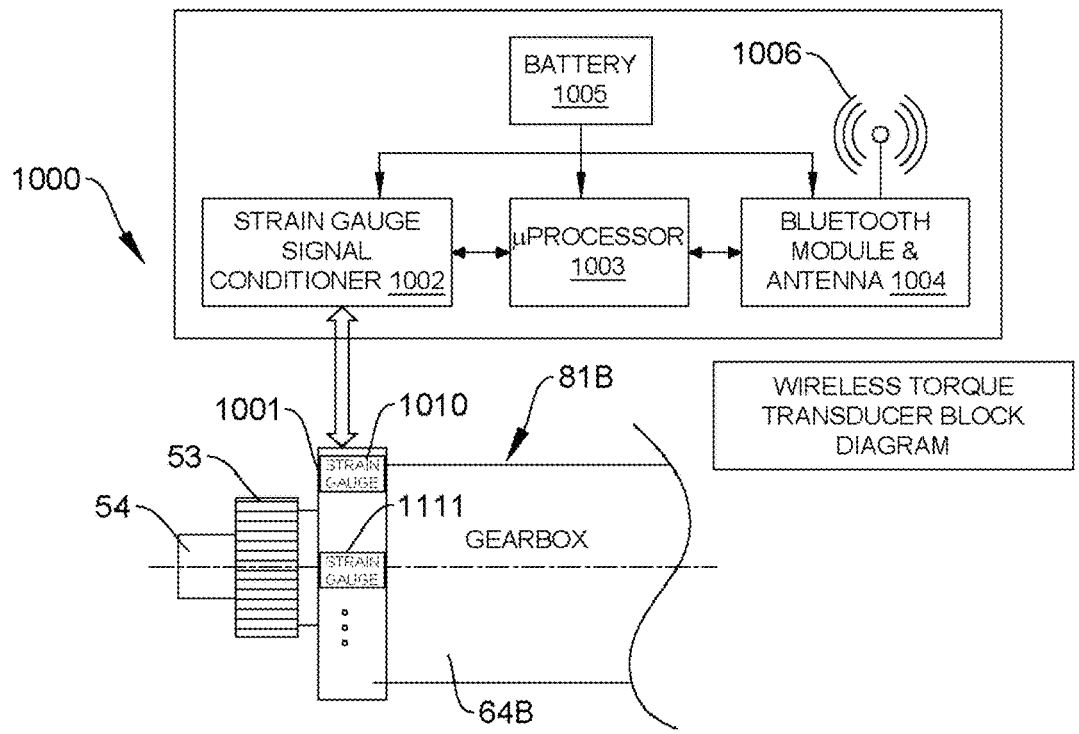
FIG. 10B is a block diagram of the wireless torque transducer assembly of Tool B and/or other embodiments of the present application.

Referring to FIG. 10B, it shows torque transducer assembly 1000 comprising: a battery 1005; a strain gauge 1010 or the like; a signal conditioner 1002; a microprocessor 1003; a wireless module 1004; an antenna 1006; all of which are formed within a housing 1001. Strain gauge 1010 is bonded to housing 64B and, during operation of tool B, measures the bending or shear strain in housing 64B near reaction spline 53 and square drive 54. Strain gauge 1010 is electrically connected to signal conditioner 1002, which amplifies the output voltage signal. The voltage output signal is converted to a proportional torque measurement by microprocessor 1003. Wireless module 1004 sends the torque measurement via antenna 1006 to motor control board 26 for dynamic and responsive control of tool B. While two strain gauges 1010 and 1011 are shown in FIG. 10B, additional strain gauges positioned circumferentially about housing 64B may generate higher torque measurement accuracy.

In summary, a portable torque power tool is disclosed herein and includes: a motor to generate a turning force; a drive to transfer the turning force; a turning force multiplication mechanism assembly to multiply the turning force; a shifter assembly to shift the tool between a lower speed/higher torque (LSHT) mode and a higher speed/lower torque (HSLT) mode; a torque transducer to measure torque output; wherein torque output is controlled by the torque transducer in LSHT mode; and wherein torque output is controlled by motor current in HSLT mode. In one embodiment of the present application, the torque transducer is a wireless torque transducer assembly formed at or near an output of a housing of the turning force multiplication assembly to improve measurement accuracy of torque output.

Advantageously, simplified tool and system design and operation; reduced tool and system size; expanded functionality, greater durability and intuitive usability; and increased tool and system portability, efficiency, reliability and repeatability, all at low cost, are achieved.

In alternative embodiment(s) not shown in the drawings, a sensing portion, such as, for example, the strain gauge(s), of the torque transducer is located at or near either: reaction spline 53; square drive 54; output shaft 58; and/or an output spline.

In alternative embodiment(s) not shown in the drawings, a redundant torque sensing system is included to control torque output should a wired or wireless signal from the torque transducer be lost during operation. In such a case, the tool may continue to increase torque output up to the maximum torque available, which may controlled by a current limit function. This may result in an undesirable outcome where the torque somewhat greater than the max rated torque of the tool. Here the tool may use motor current to control torque output in all modes of operation. Further, if the torque being sensed by the two methods (torque transducer and motor current) vary by an amount greater than an established limit, the tool may be disabled and display an error message.

In alternative embodiment(s) not shown in the drawings, the torque transducer output may be transmitted over wires via a slip-ring assembly.

In alternative embodiment(s) not shown in the drawings, the tool may include two or more of the following torque sensing systems, including an internal torque transducer, an external wired torque transducer, an external wireless torque transducer and a motor current sense system.

Innovations disclosed in this application advance drive unit and control unit technology and solve the object through an operation parameter regulation unit for use with a bolting system having a plurality of networked electrically powered torque tools and/or drive portions of torque tools for simultaneous tightening of industrial threaded fasteners with the characteristics of claims 1-18 and/or others incorporated by reference herein. Electrically powered torque tools including such operation parameter regulation unit are disclosed. Industrial bolting systems for simultaneous tightening of industrial threaded fasteners are also disclosed, including either: such operation parameter regulation units; a plurality of networked electrically powered torque tools controlled by such an electrically powered torque tool; a plurality of networked electrically powered drive portions of torque tools controlled by such electrically powered torque tool; or any combination thereof. Advantageous embodiments of the invention are listed in the dependent claims.

Advantageously, innovations disclosed in this application include operation parameter regulation units for bolting systems having a plurality of networked electrically powered torque tools and/or drive portions of torque tools for simultaneous tightening of industrial threaded fasteners. Indeed SIMULTORC® is achievable with a plurality of networked electrically powered torque tools and/or drive portions of torque tools, particularly those of the handheld and/or mobile variety. SIMULTORC® is a proprietary bolting method of Applicant, to ensure Parallel Joint Closure® and joint integrity, which minimizes risk of operator injury, property damage and/or production loss by joint leakage, joint failure and/or crushing a gasket buffering closure of a flange.

Characteristic of the operation parameter regulation unit according to the invention is that it has a processing unit with an output unit as well as a data capturing unit connected and/or integrated with the processing unit, wherein the processing unit is designed for the output of the value to be set on the operation parameter regulation unit based on fastener connection process parameters determined with the data capturing unit. The data capturing unit of the operation parameter regulation unit according to the invention makes it possible to automatically capture fastener connection process parameters without requiring input from the operating personnel. The fastener connection process parameters include for example data on the operating personnel, data on the tool to be used, e.g. the used electric torque wrench or other tool, data on the fastener connection to be established, information on the fastener connection means and data on the structural elements to be fastened together. The saving of the corresponding fastener connection process parameters in a form in which they can be automatically imported by the data capturing unit permits the error-free capturing of all fastener connection process parameters required for the determination of the setting parameters, based on which the processing unit determines the setting parameters, insofar as they are not saved or do not already result directly from the imported data. The specification, input and/or use of incorrect setting parameters, which could result from incorrect inputs by operating personnel, is prevented by automated data capturing. The setting parameters determined by the processing unit are specified without error via the output unit of the processing unit, so that only a transfer of the specified setting parameters is required. The work process can then be started via activation of the activation, or power, unit via the operation unit of the tool and/or drive portion of the tool and can be ended again after the target values have been reached.

An activation unit connected and/or integrated with the processing unit activates operation units of the plurality of networked electrically powered torque tools and/or drive portions of torque tools. A control unit controls operation parameters of each of the plurality of networked electrically powered torque tools and/or drive portions of torque tools to maintain a difference between the operation parameters within a predetermined value. Note that a plurality of activation units may be connected and/or integrated with the processing unit to activate operation units of the plurality of networked electrically powered torque tools and/or drive portions of torque tools.

The operation parameters include: tool electrical circuit parameters including current, voltage and/or magnetic field; tool torque output values; fastener rotation speeds; fastener pretensioning force; fastener rotation angle; fastener elongation; fastener and/or tool torsion, whether axial or housing flex; reaction fixture side load; fastener frictional resistance; bolting application separation (gap) distance; and/or any combination thereof. The operation parameters may be directly and/or indirectly measured or sensed by various types of sensor units: strain gauges; rotary encoders; torque sensors and transducers; hall effect and similar magnetic and ferromagnetic field sensing units; clutches; load cells; position meters/sensors; gap sensors; etc. Note that other components known in the art may be used. Note that all of such measurement and/or sensing units may interact wirelessly with bolting tools and systems disclosed herein.

During a SIMULTORC® operation if the difference in the operation parameters of the plurality of networked electrically powered torque tools and/or drive portions of torque tools exceeds the predetermined value the control unit regulates the operation parameters of each tool and/or drive portion until the difference in operation parameter(s) returns to within the predetermined value. The control unit either: ceases operation parameter(s) of tool(s) and/or drive portions with increased operation parameter(s); lowers operation parameter(s) of tool(s) and/or drive portions with increased operation parameter(s); raises operation parameter(s) of tool(s) and/or drive portions with decreased operation parameter(s); or performs any one or more of such actions to any one or more such tool(s) and/or drive portions either causally, simultaneously and/or in predetermined order. Note that automatic executing systems and/or computer programs, which are e.g. integrated into the processing unit and that independently start the bolting process and end it after the target values have been reached, can also be used cooperatively and/or separately to perform bolting process(es) of the present invention.

The balancing of the automatically captured specific process parameters to be performed by the processing unit can generally take place in any manner, wherein for example the data required for determining the setting parameters are already saved in the processing unit. However, in accordance with an advantageous further embodiment of the invention, the processing unit is designed for connection with a storage unit. This embodiment of the invention makes it possible to selectively provide the processing unit with the information necessary for determining the required setting parameters via the storage unit. In the case of this further embodiment of the invention, the saving of the relevant data required for determining the setting parameters in the processing unit can be omitted so that it can be designed particularly cost-effectively.

The connection to a storage unit also enables in a simple manner access to current data so that an otherwise potentially complicated updating of the processing unit can be omitted.

The connection option to the storage unit also makes it possible to save process-specific information, e.g. data on the performed bolting processes, on the storage unit. A manual, potentially defective and time- and cost-intensive documentation of the performed bolting processes can be omitted in this case. The establishment of a connection of the processing unit with the storage unit can thereby take place in any form, wherein for example a standardized connection arranged on the processing unit, e.g. a USB connection, enables in a simple manner the connection of the storage unit to the processing unit.

However, according to a particularly advantageous embodiment of the invention, the processing unit is designed for wireless connection with the storage unit. The wireless connection, which can in particular be established via standardized radio protocols, enables a particularly simple and comfortable connection of the processing unit with the storage unit. They can be equipped for example with a GSM module, a Bluetooth module or the like. Note that any suitable means of wireless connection between the processing unit and the storage unit may be used including: Satellite, WI-FI, WiMAX, Bluetooth, ZigBee, Microwave, Infrared, Radio, and/or proximity sensor. This embodiment of the invention also makes it possible to access a central storage unit, e.g. a central database, with correspondingly designed drive units, so that local storage units are not needed. The use of a central database facilitates data management in a special manner since updates only need to be made in one database. Moreover, the wireless connection to the central storage unit makes it possible to save information on the performed bolting processes centrally so that information can be queried from the central database by authorized persons, similar to the tracking of product shipments.

For the determination of setting parameters, it is required that the fastener connection process parameters are saved in a manner comprehendible by the data capturing unit at a suitable location, e.g. in the operation parameter regulation unit itself, in one or more of the plurality of networked electrically powered torque tools and/or drive portions of torque tools, or the fastener connection. The fastener connection process parameters may include, e.g. the operating personnel identification; information about one or more of the plurality of networked electrically powered torque tools and/or drive portions of torque tools which includes e.g. information on the manufacturer, type, size, serial number, characteristics; data on the fastener connection instances can be type, application, description of the fastener connection type, fastener connection parameters (e.g. torque, pretensioning force, rotation angle, elongation, torsion, side load, or frictional resistance, etc.); data on the equipment of the fastener connection which includes e.g. manufacturer, thread, dimensions and yield points); and data on the fastener connection instance, or bolting application; etc. Note that fastener connection process parameters may include other relevant characteristics, data and/or information. These fastener connection process parameters are saved in a manner comprehendible by the data capturing unit on the individual elements. The type of the data saving in a manner comprehendible by the data capturing unit is thereby generally freely selectable. Since e.g. barcodes or RFID units have particularly proven themselves as machine-readable codes, the data capturing unit is designed as a mobile code reader unit and/or RFID receiver and/or write unit according to a particularly advantageous embodiment of the invention. Such data capturing units are characterized by their high reliability and cost-effective design. If applicable, the respective information is saved in a form corresponding to the data capturing units, i.e. in accordance with this advantageous embodiment as machine-readable code or on an RFID unit, so that it can be captured immediately. Note that the data capturing unit may be designed as any suitable means, such as, for example, a mobile code reading device, RFID receiver and/or write unit, etc.

The use of RFID units is thereby characterized in particular in that the capturing can take place in wireless form and over a greater distance, wherein the use of RFID units also makes it possible to save supplementary data on the RFID unit after completion of the bolting processes. Machine-readable code is thereby understood in particular as barcodes or the like, wherein the read devices then have corresponding scanners. The barcodes can be arranged on stickers, which are e.g. attached to the tool and/or the fastener connection.

The connection of the data capturing unit with the processing unit can also generally take place in any manner. However, according to a particularly advantageous embodiment of the invention, the data capturing unit is designed for wireless connection with the processing unit. A corresponding design of the invention, in which the connection is established e.g. via standardized radio procedures, increases ease of use in a supplementary manner since there is no restriction for data capturing via data capturing units due to a cable-bound connection.

The design of the operation parameter regulation unit for determining the setting parameter(s) and/or the operation parameter(s) to be applied by the power unit(s) of each of the plurality of networked electrically powered torque tool(s) and/or drive portion(s) of torque tool(s), e.g. for the establishment of a uniform pretensioning force, to achieve SIMULTORC®, can generally take place in any manner. However, according to a particularly advantageous embodiment of the invention, the operation parameter regulation unit is designed as having e.g. a keypad panel, touch screen, mobile device, etc., for controlling or regulating the target values of the setting parameter(s) and/or the operation parameter(s). Recall that controlling or regulating of the operation parameters (e.g. tool electrical circuit parameters including current, voltage and/or magnetic field; tool torque output values; fastener rotation speeds; fastener pretensioning force; fastener rotation angle; fastener elongation; fastener and/or tool torsion, whether axial or housing flex; reaction fixture side load; fastener frictional resistance; bolting application separation (gap) distance; and/or any combination thereof.) is required to ensure Parallel Joint Closure® and joint integrity for the fastener connection. The operation parameter regulation unit can thereby be set in any manner, in the easiest manner automatically or manually, to the target value(s) specified on the output unit. The start of the bolting process can then take place via activation of the activation unit of the operation parameter regulation unit for activating operation units of the plurality of networked electrically powered torque tools and/or drive portions of torque tools.

Note that the operation parameter regulation unit is designed for wireless connection with the plurality of networked electrically powered torque tools and/or drive portions of torque tools by any suitable means including Satellite, WI-FI, WiMAX, Bluetooth, ZigBee, Microwave, Infrared, Radio, and/or proximity sensor.

In addition to a purely optical output of the setting parameters via the output unit, it is provided according to a further embodiment of the invention, that the output unit is designed for assistance in control and/or regulation of the operation parameter regulation unit. In accordance with this embodiment of the invention, the setting parameter determined by the processing unit is automatically transferred to the operation parameter regulation unit, e.g. an electrically controllable operation parameter regulation unit, after determination of the process parameters via the data capturing unit. This embodiment of the invention guarantees in a supplementary manner that a misadjustment caused by operating personnel and thus a defective screw connection does not result. In a particularly advantageous manner, the output unit is also designed to assist the control unit to check the setting parameters and to make corrections. This ensures in a particularly reliable manner an error-free establishment of the required fastener connections.

The documentation of the performed work processes can generally take place in any manner, for example as listed above, by saving information on a storage unit. However, according to a particularly advantageous embodiment of the invention, the output unit has a printing apparatus, which makes it possible to make available to operating personnel immediately in printed form reports on the realized fastener connections. Alternatively or additionally, it can also be provided according to a further development of the invention that the processing unit is designed for the documentation of the realized fastener connections. Should it be required to procure information on the realized fastener connections, the processing unit can be accessed at a later time and the data saved there can be called.

In accordance with a particularly advantageous embodiment of the invention, the operation parameter regulation unit and/or the processing unit has a time and/or position capturing unit attached and/or integrated with each of the plurality of networked electrically powered torque tools and/or drive portions of torque tools. This data, wherein the position capturing unit can be formed e.g. by a GPS receiver, can also be saved as information on the realized processes so that the quality of the realized and callable documentation can be increased in a supplementary manner. Furthermore, automation enhancements applied to such position capturing units, operation parameter regulation units and/or each of the plurality of networked electrically powered torque tools and/or drive portions of torque tools having such regulation units, such as drone flight capabilities, allow for remote, unsupervised and/or automatic performance of bolting operations.

SIMULTORC® operations are further improved with such automation enhancements because each of the plurality of networked electrically powered torque tools and/or drive portions of torque tools are available to automatically move to locations exhibiting atypical bolting characteristics. Proximity sensors may be used for improved location guidance of tools to the fasteners. Additional fastener connection process parameters would be needed for such an automation enhancement, such as, for example: interactive moving maps; bolting route guidance; fastener approach guidance; dynamic route editing with wind correction, speed, distance, headings and power consumption computation; bolting application elevation and orientation profiles; surroundings/terrain awareness in 2D and 3D; support for internal gyros or external AHRS boxes; displays of speed, altitude, course, etc.; live flight tracking; weight and balance computations; automatic recordation of bolting connections logbook; tool and tool portion movement synchronization; etc.

Further disclosed inventions include: an electrically powered torque tool including such operation parameter regulation unit; a mobile device including such operation parameter regulation unit; and industrial bolting system for simultaneous tightening of industrial threaded fasteners including such operation parameter regulation unit.

Exemplary embodiments of the invention are explained in more detail below with reference to the drawings. Previous discussion applies to the drawings. For ease of explanation tool torque output value(s) is the operation parameter of choice, but any disclosed operation parameter and may be used including: tool electrical circuit parameters including current, voltage and/or magnetic field; tool torque output values; fastener rotation speeds; fastener pretensioning force; fastener rotation angle; fastener elongation; fastener and/or tool torsion, whether axial or housing flex; reaction fixture side load; fastener frictional resistance; and/or any combination thereof.

Figure 11:
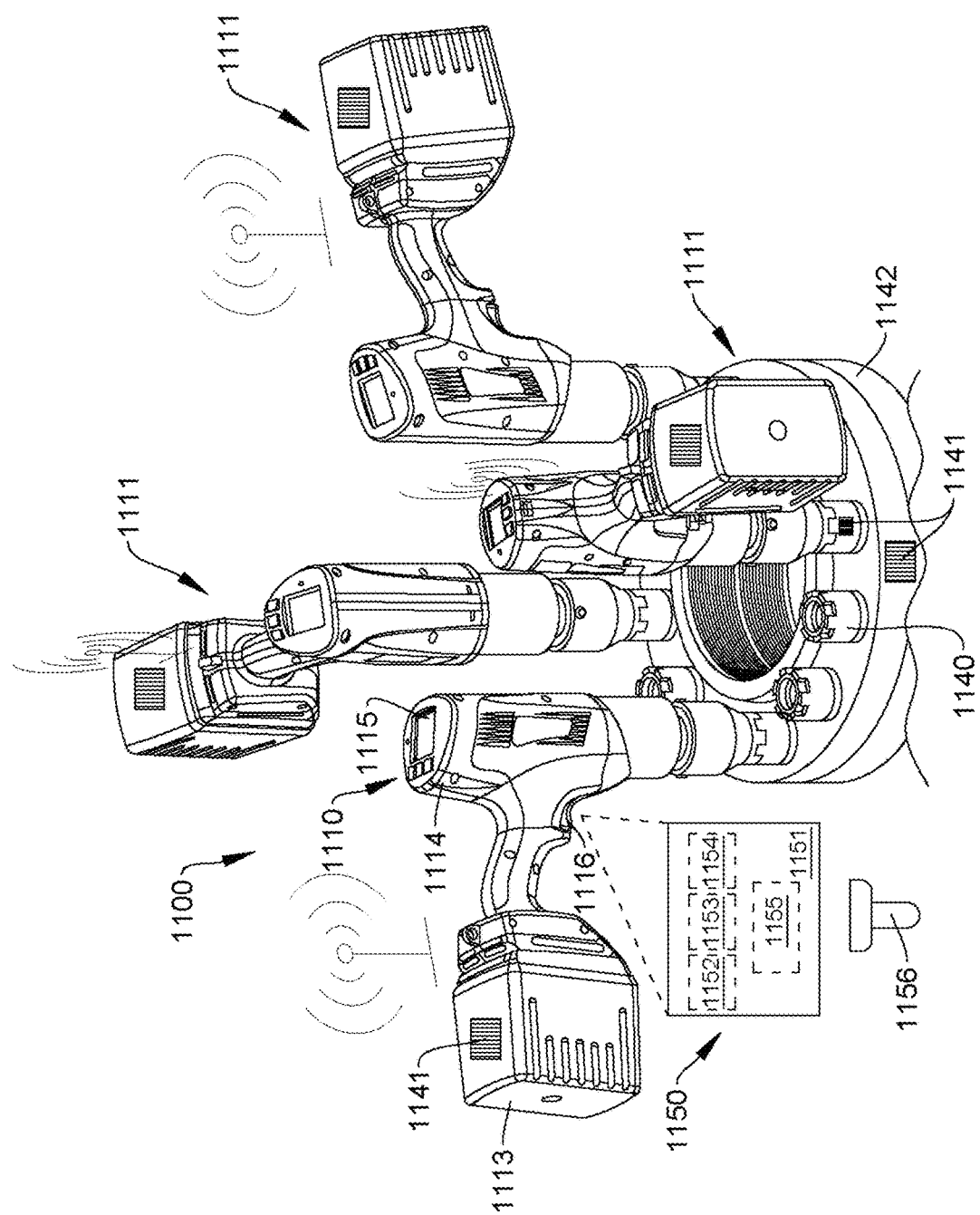
FIG. 11 shows a perspective view of an industrial bolting system 1100 for simultaneous tightening of industrial threaded fasteners including a plurality of networked electrically powered torque tools 1111 controlled by an electrically powered torque tool 1110 having an operation parameter regulation unit 1150.

Referring to FIG. 11, it shows a perspective representation as a sketch of an industrial bolting system 1100 for simultaneous tightening of industrial threaded fasteners 1140 including a plurality of networked electrically powered torque tools 1111 controlled by an electrically powered torque tool 1110 having an operation parameter regulation unit 1150. Tool 1110 may be formed as tool A, tool B and/or variants thereof. Tool 1110 acts as the master and networked tools 1111 act as the slaves in this embodiment. For ease of explanation, operation parameter regulation unit 1150 is shown exterior to tool 1110 enclosed within a cover 1151, however in practice the whole of unit 1150 and/or parts thereof are formed within or adjacent tool 1110. Tool 1110 receives power via an electrical power supply 1113, preferably in the form of an on-board lithium ion battery. Power supply 1113 may include any suitable source (e.g., solar cell, fuel cell, electrical wall socket, generator, motor, etc.). Generally, operation parameter regulation unit 1150, activates an electronic power unit 1114 of tool 1110 and controls the torque output level (or other operation or setting parameter) set on an operation unit 1115. Electronic power unit 1114 and operation unit 1115 are shown separate from each other and external from operation parameter regulation unit 1150. Electronic power unit 1114 and/or operation unit 1115, however, may be formed as a single unit and/or may be formed integral with or adjacent operation parameter regulation unit 1150.

Operation parameter regulation unit 1150, in this case, regulates/monitors/measures etc. torque output of tool 1110 and tools 1111, as the target value. In order to set the target value required for a fastener connection, operation parameter regulation unit 1150 has an input unit 1152. A data capturing unit 1156, in this case a mobile barcode scanner, captures fastener connection process parameters 1141 from the operating personnel, tool 1110 and/or tools 1111, a fastener connection instance, or bolting application, 1142 and fastener connection equipment 1140. Bolting application 1142 may include, for example, a flange to be closed. Fastener connection equipment 1140 may include, for example, threaded studs, bolts and/or nuts, washers and/or any other suitable items.

Data capturing unit 1156 is shown external to operation parameter regulation unit 1150, however the whole of unit 1156 or parts thereof may be found within tool 1110 or operation parameter regulation unit 1150. Fastener connection process parameters 1141 are transferred wirelessly to a processing unit 1153. Processing unit 1153 indicates the compression torque to be set via the display, or output, unit 1151, which may be formed as or part of an operating panel 1115 on tool 1110 after accessing the data, perhaps saved on a storage unit (not shown). After setting the shown compression torque on input unit 1152 either manually, semi-manually or automatically, the fastening process can be started and stopped via an activation unit 1155, either manually, semi-manually or automatically. If manually, activation unit 1155 may be formed as a trigger 1116 of tool 1110, which the operator pulls to start the fastening process. Note that the compression torque or the screw pretensioning force is the force necessary to tighten and/or loosen the screw connection. Note that each of tool 1110 and/or tools 1111 may be structurally similar to each other containing similar components such that embedded software commands in operation parameter regulation unit 1150 perform a minority, majority and/or all of the steps of the SIMULTORC® bolting operations disclosed.

Note that each of the plurality of networked electrically powered torque tool(s) 1110 and/or 1111 are arranged equally distantly from one another on threaded fasteners 1140 around fastener connection instance, or bolting application, 1142. SIMULTORC® is the proprietary bolting method of Applicant to ensure Parallel Joint Closure® and joint integrity, which minimizes risk of operator injury, property damage and/or production loss by joint leakage, joint failure and/or crushing a gasket (not shown) buffering closure of bolting application 1142. Note that a sensing unit (not shown) may be included with operation parameter regulation unit 1150 and/or tool 10 and/or tools 1111 to determine when the plurality of networked electrically powered torque tools 1110 and 1111 are available to tighten and/or loosen threaded fasteners 1140. In other words, electronic power unit(s) 1114, operation unit(s) 1115, trigger(s) 1116, operation parameter regulation unit(s) 1150, and/or parts thereof, may not be activatable unless tool 1110 and/or tools 1111 are correctly positioned about and safely engaged with threaded fasteners 1140 and bolting application 1142. Such a sensing unit acts as a safety mechanism to reduce and/or eliminate risk of operator injury and a quality mechanism to ensure Parallel Joint Closure® and joint integrity.

During a SIMULTORC® bolting operation, as shown, for example, in FIG. 11, a control unit 1154 controls operation parameter(s), in this case tool torque output value(s), of each of the plurality of networked electrically powered torque tools 1110 and/or 1111 to maintain a difference between the operation parameter(s) within a predetermined value. If the difference in the operation parameter(s) exceeds the predetermined value, control unit 1154 regulates the operation parameter(s) of tools 1110 and/or 1111 until the difference in operation parameter(s) returns to within the predetermined value.

Figure 12:
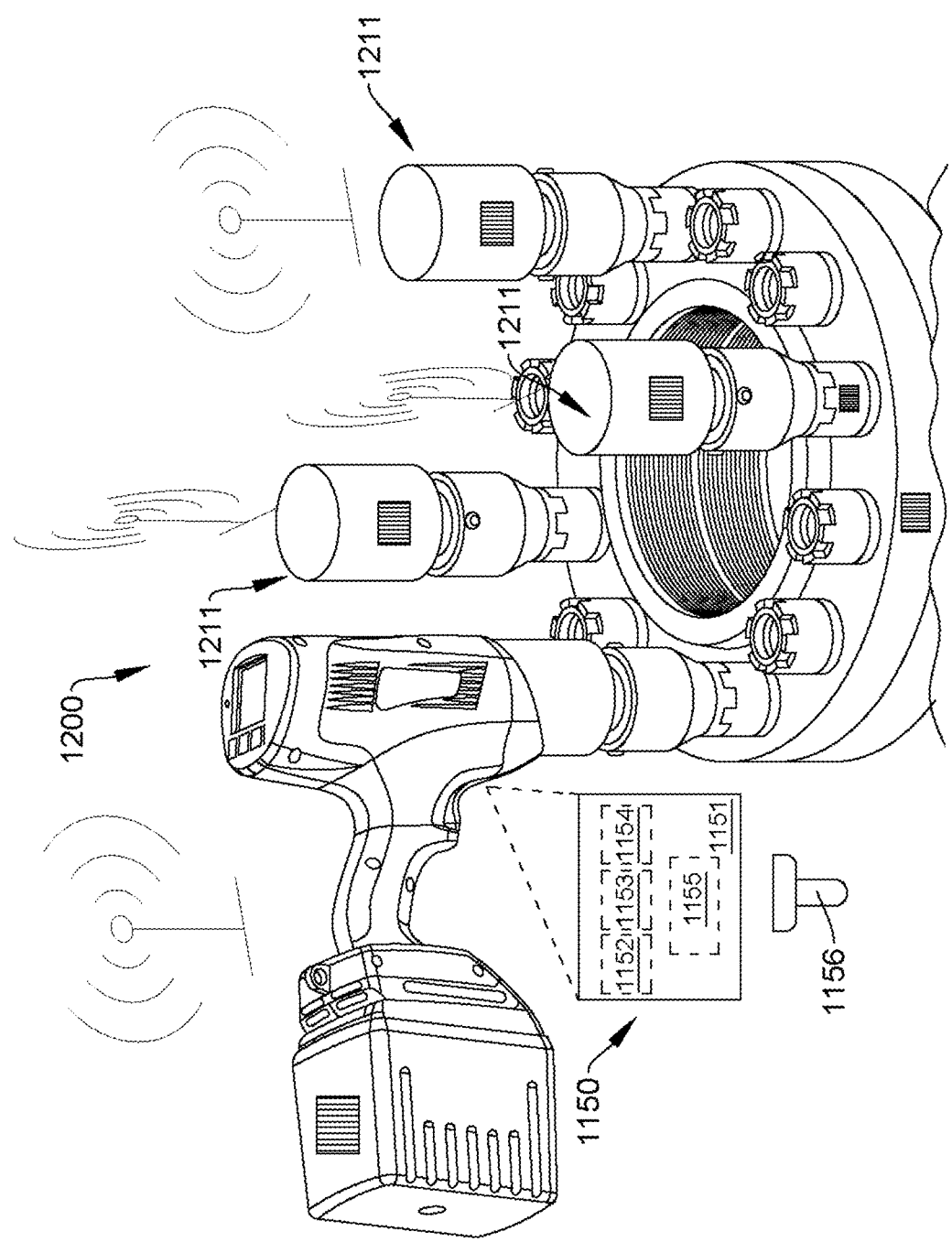
FIG. 12 shows a perspective view of an industrial bolting system 1200 for simultaneous tightening of industrial threaded fasteners including a plurality of networked drive portions of electrically powered torque tools 1211 controlled by electrically powered torque tool 1110 having operation parameter regulation unit 1150.

Another exemplary embodiment of the invention is explained in more detail below with reference to FIG. 12. Previous general discussion and specific discussion related to FIGS. 1-11 applies to the embodiment shown in FIG. 12. Referring to FIG. 12, it shows a perspective representation as a sketch of an industrial bolting system 1200 for simultaneous tightening of industrial threaded fasteners 1140 including a plurality of networked drive portions of electrically powered torque tools 1211 controlled by electrically powered torque tool 1110 having operation parameter regulation unit 1150. Tool 1110 acts as the master and networked drive portions 1211 act as the slaves in this embodiment.

Figure 13:
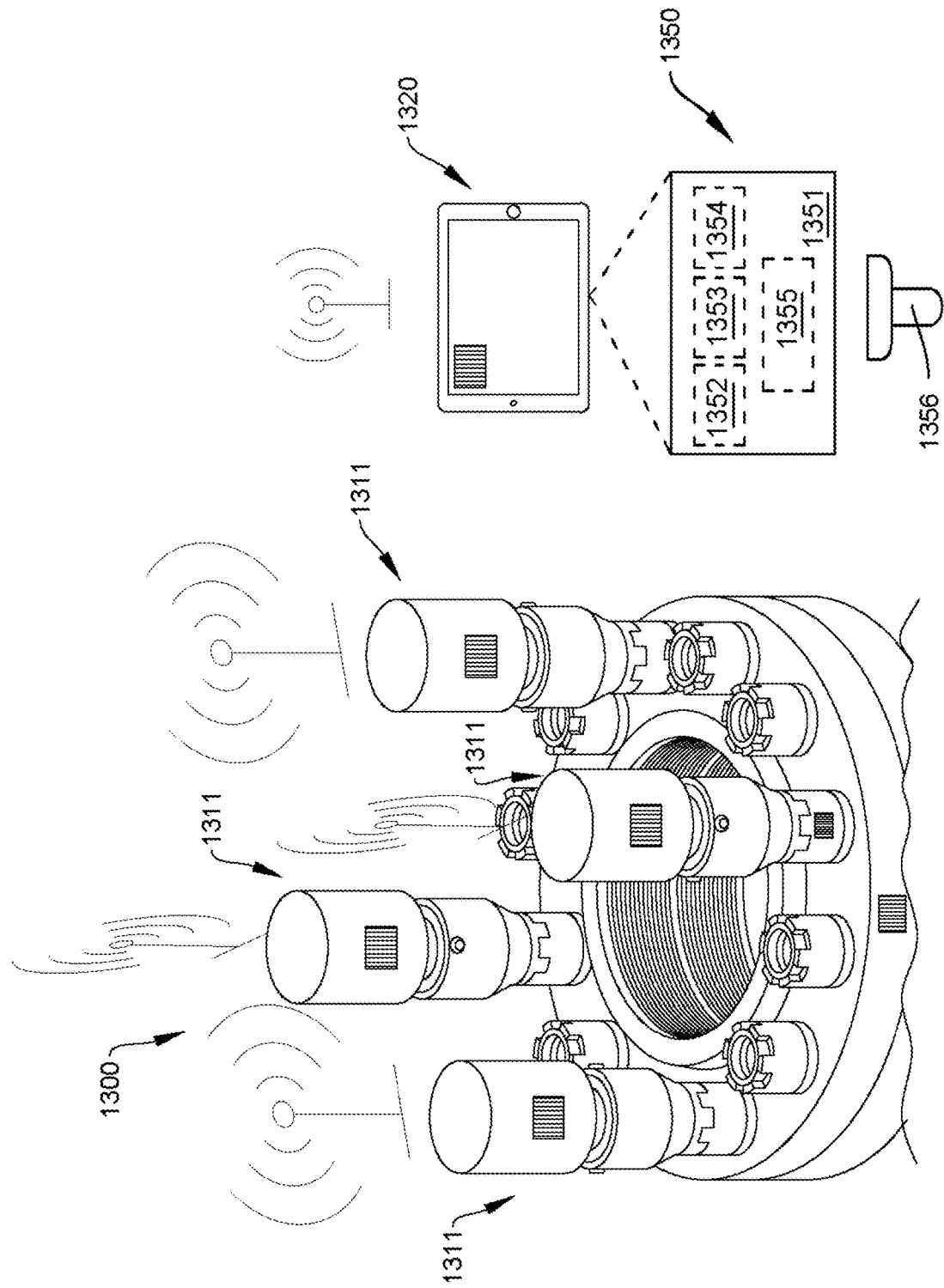
FIG. 13 shows a perspective view of an industrial bolting system 1300 for simultaneous tightening of industrial threaded fasteners including a plurality of networked drive portions of electrically powered torque tools 1311 controlled by a mobile device 1320 having operation parameter regulation unit 1150.

Another exemplary embodiment of the invention is explained in more detail below with reference to FIG. 13. Previous general discussion and specific discussion related to FIGS. 1-12 applies to the embodiment shown in FIG. 13. Referring to FIG. 13, it shows a perspective representation as a sketch of an industrial bolting system 1300 for simultaneous tightening of industrial threaded fasteners 1140 including a plurality of networked drive portions of electrically powered torque tools 1311 controlled by a mobile device 1320 having operation parameter regulation unit 1350. Mobile device 1320 acts as the master and networked drive portions 1311 act as the slaves in this embodiment.

Another exemplary embodiment of the invention is explained in more detail below with reference to FIG. 14. Previous general discussion and specific discussion related to FIGS. 1-13 applies to the embodiment shown in FIG. 14. A fastener connection instance, or bolting application, 1442 is usable with tools A and B and industrial bolting systems 1100, 1200, 1300 and/or variants thereof. Bolting application separation (gap) sensors 1460 are arranged equally distantly from one another near the corresponding threaded fasteners. Bolting application separation (gap) sensors 1460 measure the relative distance between the two parts of the joint to be closed. During a SIMULTORC® bolting operation, as shown, for example, in FIG. 11, control unit 1154 controls operation parameter(s), in this case bolting application separation (gap) distance, of each of the bolting application separation (gap) sensors 1460 to maintain a difference between the operation parameter(s) within a predetermined value. If the difference in the operation parameter(s) exceeds the predetermined value, control unit 1154 regulates the operation parameter(s) of tools A, B, 1110, 1111, 1211, 1311 and/or variants thereof until the difference in operation parameter(s) returns to within the predetermined value. As shown, gap sensors 1460 are networked sensor wands. Note that any suitable gap (or displacement) sensor may be used including 1D or 2D, thrubeam/reflective, laser, eddy current, ultrasonic, contact-type, inductive, capacitive, magnetic, optical, fiber, spring, etc. sensors.

Another exemplary embodiment of the invention is explained in more detail below with reference to FIG. 15. Previous general discussion and specific discussion related to FIGS. 1-14 applies to the embodiment shown in FIG. 15. A fastener connection instance, or bolting application, 1542 is usable with tool A, tool B, industrial bolting systems 100, 200, 300, and/or variants thereof. Bolting application fastener load cells 1570 are arranged adjacent a plurality of threaded fasteners. Bolting application fastener load cells 1570 are shown adjacent and measure the tension in each fastener. During a SIMULTORC® bolting operation, as shown, for example, in FIG. 11, control unit 54 controls operation parameter(s), in this case fastener tension values, of each of then actively engaged fasteners and load cells 1570 to maintain a difference between the operation parameter(s) within a predetermined value. If the difference in the operation parameter(s) exceeds the predetermined value, control unit 1154 regulates the operation parameter(s) of tools A, B, 1110, 1111, 1211, 1311 and/or variants thereof until the difference in operation parameter(s) returns to within the predetermined value. Note that any suitable load cell may be used including strain gauge, piezoelectric, hydraulic, pneumatic, vibratory, capacitive, etc. load cells.

In an alternative embodiment not shown in the drawings, monitoring and controlling of: electrically powered torque tool A, B, and/or 1110; plurality of networked electrically powered torque tools 1111; plurality of networked drive portions of electrically powered torque tools 1211; plurality of networked drive portions of electrically powered torque tools 1311; one thereof; a plurality thereof; one subset thereof; a plurality of subsets thereof; or any combination thereof, can occur as part of a cell, line, plant-wide, entity-wide or collaboration-wide manufacturing execution system (MES). In other words, torque tools and drive portions of torque tools of the present invention are intelligent devices that can be integrated with other devices and equipment, in manual, automated or semi-automated processes, to combine all aspects of manufacturing, to digitize all processes and records, and to tightly control all output of operations.

In a further embodiment not shown in the drawings, monitoring and controlling of: electrically powered torque tool A, B, and/or 1110; plurality of networked electrically powered torque tools 1111; plurality of networked drive portions of electrically powered torque tools 1211; plurality of networked drive portions of electrically powered torque tools 1311; one thereof; a plurality thereof; one subset thereof; a plurality of subsets thereof; or any combination thereof, can occur in a closed-loop, wired system, especially in critical bolting applications.

Advantageously, innovations disclosed in this application include operation parameter regulation units for bolting systems having a plurality of networked electrically powered torque tools and/or drive portions of torque tools for simultaneous tightening of industrial threaded fasteners. Indeed SIMULTORC® is achievable with a plurality of networked electrically powered torque tools and/or drive portions of torque tools, particularly those of the handheld and/or mobile variety. SIMULTORC® is a proprietary bolting method of Applicant, to ensure Parallel Joint Closure® and joint integrity, which minimizes risk of operator injury, property damage and/or production loss by joint leakage, joint failure and/or crushing a gasket buffering closure of a flange.

Note that discussion of wireless connectivity includes all possible forms of wireless connection, including: wireless connection with the plurality of networked electrically powered torque tools and/or drive portions of torque tools by any suitable means including Satellite, LAN, WI-FI, WI-FI Direct, WiMAX, Bluetooth, ZigBee, Microwave, Infrared, and/or Radio.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. Note that there may be slight differences in descriptions of numbered components in the specification.

The present invention has been generally described with reference to the accompanying figures, in the form of Tools A, B, 1110, 1111, 1211, 1311 and/or variants thereof. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments. The term "about" refers to +/−variations of less than 20%, typically +/−10%. The term "substantially" refers to +/−variations of less than 10%, typically +/−5%.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The term "cordless" or "handheld" or "portable" power tool refers to power tools that do not require plug-in, hard wired electrical connections to an external power source to operate. Rather, the cordless power tools have electric motors that are powered by on-board batteries, such as rechargeable batteries. A range of batteries may fit a range of cordless tools. Embodiments of the present invention are particularly suitable for industrial fastening tools such as for example, screwdrivers, ratchets, and nutrunners. Embodiments of the invention may be particularly suitable for precision industrial fastening power tools that can be used for applications where more exact control of the applied output is desired.

While the invention has been illustrated and described as embodied in a battery operated tool, it is not intended to be limited to the details shown, since various modifications and structural changes may be made without departing in any way from the spirit of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A portable torque power tool comprising: a motor to generate a turning force; a drive to transfer the turning force; a turning force multiplication mechanism assembly to multiply the turning force; a shifter assembly to shift the tool between a lower speed/higher torque (LSHT) mode and a higher speed/lower torque (HSLT) mode; a torque transducer to measure torque output; wherein torque output is controlled by the torque transducer in LSHT mode; wherein torque output is controlled by motor current in HSLT mode; and wherein a sensing portion of the torque transducer is formed at or near an output of a housing of the turning force multiplication assembly, an output reaction spline, a square drive, an output shaft, and/or an output spline, for improved measurement of torque output.

2. A portable torque power tool according to claim 1 including selectable bolting operational parameters and/or configurations.

3. A portable torque power tool according to claim 2 wherein the selectable bolting operational parameters and/or configurations include basic bolting operations, advanced bolting operations, jobs, settings, administrative, service and/or any combination thereof.

4. A portable torque power tool according to claim 2 wherein the selectable bolting operational parameters and/or configurations include torque, snug, angle, release, fastener, turn angle, torque check, rotations, torque in angle, angle in torque, 1-n sequence, PCC1 sequence, wheel sequence, torque to yield, tighten on torque, tighten on angle and/or any combination thereof.

5. A portable torque power tool according to claim 4 wherein the selectable bolting operational parameters and/or configurations can be performed in any predetermined arrangement.

6. A portable torque power tool according to claim 1 including a motor control circuit in communication with the motor and the torque transducer.

7. A portable torque power tool according to claim 6 including the motor control circuit having a Kelvin resistor in communication with the motor for measuring motor current.

8. A portable torque power tool according to claim 6 including the motor control circuit having digital hall switches in communication with the motor for measuring motor speed.

9. A portable torque power tool according to claim 6 including the motor control circuit having: a Kelvin resistor in communication with the motor for measuring motor current; and digital hall switches in communication with the motor for measuring motor speed.

10. A portable torque power tool according to claim 1 including a display in communication with an User Interface to allow a user to select one or more bolting operational parameters and/or configurations.

11. A portable torque power tool according to claim 10 wherein the display and/or the User Interface is either onboard or remote from the tool.

12. A portable torque power tool according to claim 1 wherein the shifter assembly includes a yoke-style shifter assembly having: a mode shifter switch; a shifter yoke; and a shifter ring gear.

13. A portable torque power tool according to claim 12 wherein the yoke-style shifter assembly includes a shifter rod formed between the mode selector switch and the shifter yoke.

14. A portable torque power tool according to claim 13 wherein the yoke-style shifter assembly includes: a shifter clevis pin formed between the shifter rod and the shifter yoke; and a shifter yoke pin formed between the shifter yoke and the shifter ring gear.

15. A portable torque power tool according to claim 1 electronically driven and powered by a releasable battery pack.

16. A portable torque power tool according to claim 1 wherein a sensing portion of the torque transducer measures torque output from a portion of the turning force multiplication mechanism assembly.

17. A portable torque power tool according to claim 16 wherein the torque transducer connects wirelessly to the motor control circuit.

18. A portable torque power tool according to claim 17 wherein the torque transducer includes: a battery; a strain gauge or the like; a signal conditioner; a microprocessor; a wireless module; an antenna; all formed within a housing.

19. A system for fastening objects including: a threaded fastener; and a torque power tool of claim 1.

20. An operation parameter regulation unit for use with a bolting system having a plurality of networked electrically powered torque tools of claim 1 and/or drive portions of torque tools of claim 1 for simultaneous tightening of industrial threaded fasteners, the operation parameter regulation unit including:
a processing unit;
an output unit connected and/or integrated with the processing unit;
an input unit connected and/or integrated with the processing unit;
an activation unit connected and/or integrated with the processing unit for activating operation units of the plurality of networked electrically powered torque tools and/or drive portions of torque tools; and
a control unit for controlling operation parameters of each of the plurality of networked electrically powered torque tools and/or drive portions of torque tools to maintain a difference between the operation parameters within a predetermined value.

21. An operation parameter regulation unit according to claim 20 wherein the operation parameters include either: tool electrical circuit parameters including current, voltage and/or magnetic field; tool torque output values; fastener rotation speeds; fastener pretensioning force; fastener rotation angle; fastener elongation; fastener and/or tool torsion; reaction fixture side load; fastener frictional resistance; and/or any combination thereof.

22. An operation parameter regulation unit according to claim 20 wherein during operation if the difference in the operation parameters of the plurality of networked electrically powered torque tools and/or drive portions of torque tools exceeds the predetermined value the control unit regulates the operation parameters of each tool and/or drive portion until the difference in operation parameter(s) returns to within the predetermined value by either:
ceasing operation parameter(s) of tool(s) and/or drive portions with increased operation parameter(s);

lowering operation parameter(s) of tool(s) and/or drive portions with increased operation parameter(s);

raising operation parameter(s) of tool(s) and/or drive portions with decreased operation parameter(s); or performing any one or more of such actions to any one or more such tool(s) and/or drive portions either causally, simultaneously and/or in predetermined order.

23. An operation parameter regulation unit according to claim 20 including a data capturing unit connected and/or integrated with the processing unit, wherein the processing unit is designed for the output of the value to be set on the operation parameter regulation unit based on fastener connection process parameters determined with the data capturing unit.

24. An operation parameter regulation unit according to claim 23, characterized in that the data capturing unit is designed as a mobile code reading device and/or RFID receiver and/or write unit.

25. An operation parameter regulation unit according to claim 23 characterized in that the data capturing unit is designed for wireless connection with the processing unit.

26. An operation parameter regulation unit according to claim 23, characterized in that the fastener connection process parameters are determined from an operating personnel, a power operated tool, a fastener connection instance and fastener connection equipment.

27. An operation parameter regulation unit according to claim 20 including a storage unit.

28. An operation parameter regulation unit according to claim 20 designed for wireless connection with the plurality of networked electrically powered torque tools and/or drive portions of torque tools by any suitable means including Satellite, WI-FI, WiMAX, Bluetooth, ZigBee, Microwave, Infrared, and/or Radio.

29. An operation parameter regulation unit according to claim 20 including one or more sensor units for direct and/or indirect measurement of the operation parameters of either: the plurality of networked electrically powered torque tools and/or drive portions of torque tools; the plurality of parts of a joint to be closed; or the plurality of networked threaded fasteners.

30. An operation parameter regulation unit according to claim 29 wherein the one or more sensor units are bolting application separation (gap) sensors.

31. An operation parameter regulation unit according to claim 29 wherein the one or more sensor units are bolting application fastener load cells.

32. An operation parameter regulation unit according to claim 20 designed for the documentation of realized bolting connections.

33. An electrically powered torque tool including an operation parameter regulation unit according to claim 20.

34. An electrically powered torque tool according to claim 33 of the handheld and/or mobile variety.

35. An industrial bolting system for simultaneous tightening of industrial threaded fasteners including an operation parameter regulation unit according to claim 20.

36. An industrial bolting system according to claim 35 including a plurality of networked drive portions of electrically powered torque tools controlled by an electrically powered torque tool according to claim 33.

37. An industrial bolting system according to claim 35 including a plurality of networked electrically powered torque tools and/or drive portions of torque tools controlled by an electrically powered torque tool according to claim 33.

38. An industrial bolting system according to claim 35 wherein the operation parameter regulation unit is formed within a mobile device, the industrial bolting system including either:
a plurality of networked electrically powered torque tools;
a plurality of networked electrically powered drive portions of torque tools; or
any combination thereof.

39. An industrial bolting system according to claim 38 wherein the networked electrically powered torque tools and/or the networked electrically powered drive portions of torque tools of the handheld and/or mobile variety.

40. An industrial bolting system according to claim 39 wherein the operation parameter regulation unit automatically controls the plurality of networked electrically powered torque tools and/or drive portions of torque tools.

41. An industrial bolting system according to claim 39 wherein the activation unit of at least one of the plurality of networked electrically powered torque tools and/or drive portions of torque tools is formed as a trigger which is manually controlled by an operator.

42. An industrial bolting system according to claim 35 to achieve SIMULTORC®, a proprietary bolting method of HYTORC® Division UNEX Corporation, to ensure Parallel Joint Closure® and joint integrity which minimizes risk of operator injury, property damage and/or production loss by joint leakage, joint failure and/or crushing a gasket buffering closure of a flange.

43. An industrial bolting system according to claim 35 wherein each of the plurality of networked electrically powered torque tools and/or drive portions of torque tools are arranged equally distantly from one another on threaded fasteners around the fastener connection instance.

44. An industrial bolting system according to claim 35 wherein the plurality of networked electrically powered torque tools and/or drive portions of torque tools includes time and/or position capturing unit(s).

45. An industrial bolting system according to claim 44 wherein the time and/or position capturing unit(s) include automation enhancements such as drone flight capabilities, which allow for remote, unsupervised and/or automatic performance of bolting operations.

46. An industrial bolting system according to claim 35 including a sensing unit which determines when the plurality of networked electrically powered torque tools and/or drive portions of torque tools are available to tighten and/or loosen the threaded fasteners thereby rendering the operation unit activatable.

47. A method of automatically controlling an industrial bolting system according to claim 35 including maintaining a difference between operation parameters of each of the plurality of networked electrically powered torque tools and/or drive portions of torque tools within a predetermined value.

48. A method according to claim 47 including arranging each of the plurality of networked electrically powered torque tools and/or drive portions of torque tools equally distantly from one another on threaded fasteners around the fastener connection instance.

49. A method according to claim 47 wherein each of the plurality of networked electrically powered torque tools and/or drive portions of torque tools include time and/or position capturing unit(s) having automation enhancements such as drone flight capabilities, which allow for remote, unsupervised and/or automatic placement and movement for performance of bolting operations.

\* \* \* \* \*